US008474315B2

(12) United States Patent
Ohshima et al.

(10) Patent No.: US 8,474,315 B2
(45) Date of Patent: Jul. 2, 2013

(54) CAPACITIVE LIQUID-LEVEL SENSOR

(75) Inventors: Mikihiro Ohshima, Fukui (JP); Motoki Ogata, Fukui (JP); Yoshinori Takashima, Fukui (JP); Takeshi Kashiwagi, Fukui (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 13/054,645

(22) PCT Filed: Jul. 21, 2009

(86) PCT No.: PCT/JP2009/003397
§ 371 (c)(1),
(2), (4) Date: Jan. 18, 2011

(87) PCT Pub. No.: WO2010/010683
PCT Pub. Date: Jan. 28, 2010

(65) Prior Publication Data
US 2011/0113878 A1    May 19, 2011

(30) Foreign Application Priority Data

| Jul. 22, 2008 | (JP) | 2008-188111 |
| Nov. 13, 2008 | (JP) | 2008-290546 |
| Nov. 13, 2008 | (JP) | 2008-290547 |
| Nov. 13, 2008 | (JP) | 2008-290548 |
| Mar. 3, 2009 | (JP) | 2009-048780 |

(51) Int. Cl.
*G01F 23/26* (2006.01)
(52) U.S. Cl.
USPC ........................................................ 73/304 C
(58) Field of Classification Search
USPC ............ 73/304 C; 340/620; 361/284; 702/55
See application file for complete search history.

(56) References Cited

U.S. PATENT DOCUMENTS

| 5,042,299 A * | 8/1991 | Wells .......................... 73/304 C |
| 2003/0000303 A1 * | 1/2003 | Livingston et al. ......... 73/304 C |

FOREIGN PATENT DOCUMENTS

| JP | 63-079016 A | 4/1988 |
| JP | 06-135001 A | 5/1994 |
| JP | 2007-042332 A | 2/2007 |

OTHER PUBLICATIONS

International Search Report for PCT/JP2009/003397 dated Nov. 2, 2009.

* cited by examiner

*Primary Examiner* — Hezron E Williams
*Assistant Examiner* — Nathaniel Kolb
(74) *Attorney, Agent, or Firm* — Pearne & Gordon LLP

(57) ABSTRACT

In a liquid level sensor according to the present invention, a first detecting electrode being always in a liquid to be measured, a second detecting electrode which measures a level of the liquid to be measured, and a third detecting electrode being always out of the liquid to be measured are arranged, an operation of charging capacitor 45 for a time being in proportion to a ratio of a length of a part of the second detecting electrode in the liquid to be measured to a total length of the second detecting electrode and an operation of discharging the electric charge of the capacitor for a time being in proportion to a ratio of a length of a part of the second detecting electrode being out of the liquid to be measured to the total length of the second detecting electrode is repeated. With this configuration, the liquid level can be precisely detected without arranging a complex operational device even though a dielectric constant or a temperature of the liquid to be measured changes.

7 Claims, 27 Drawing Sheets

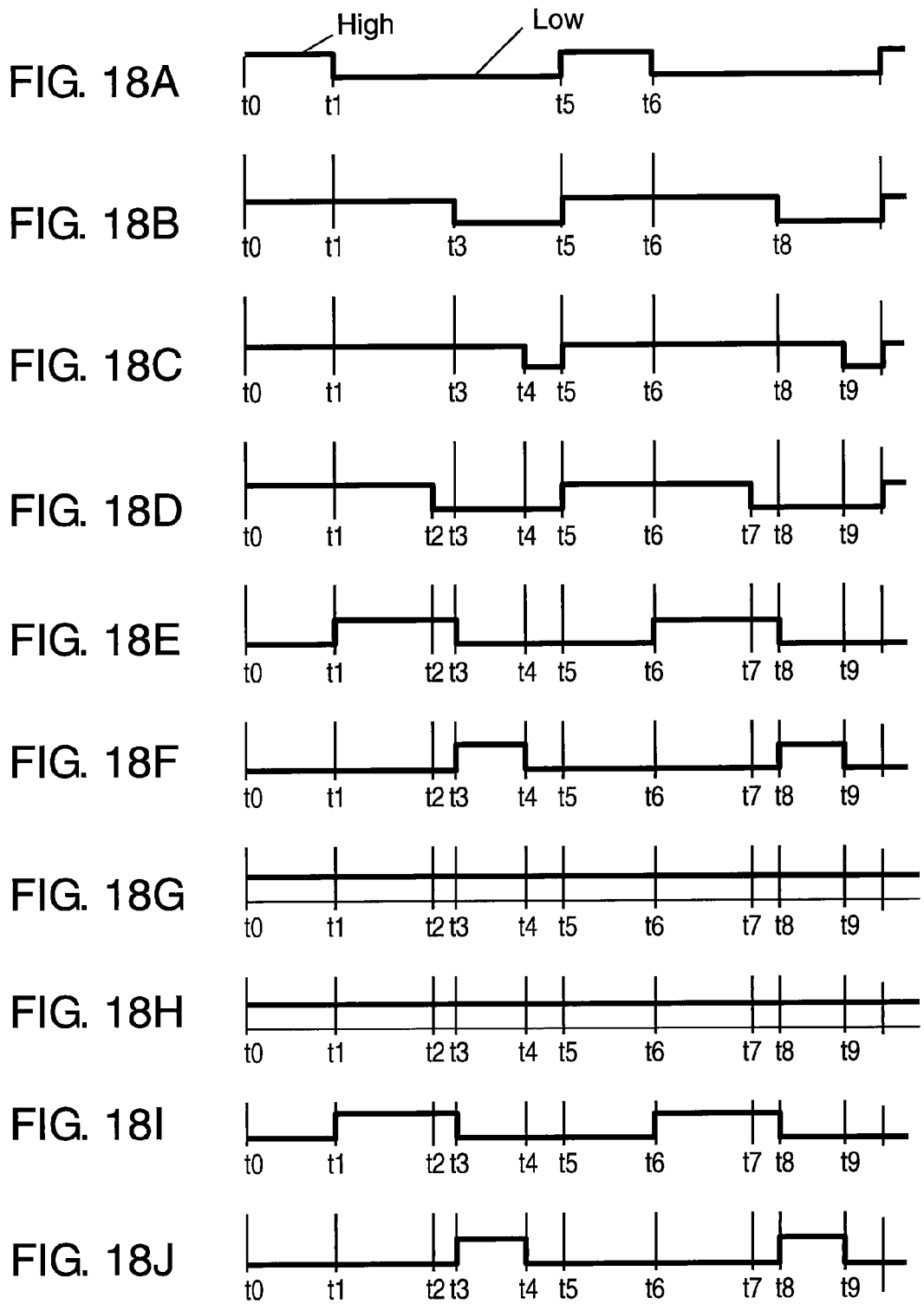

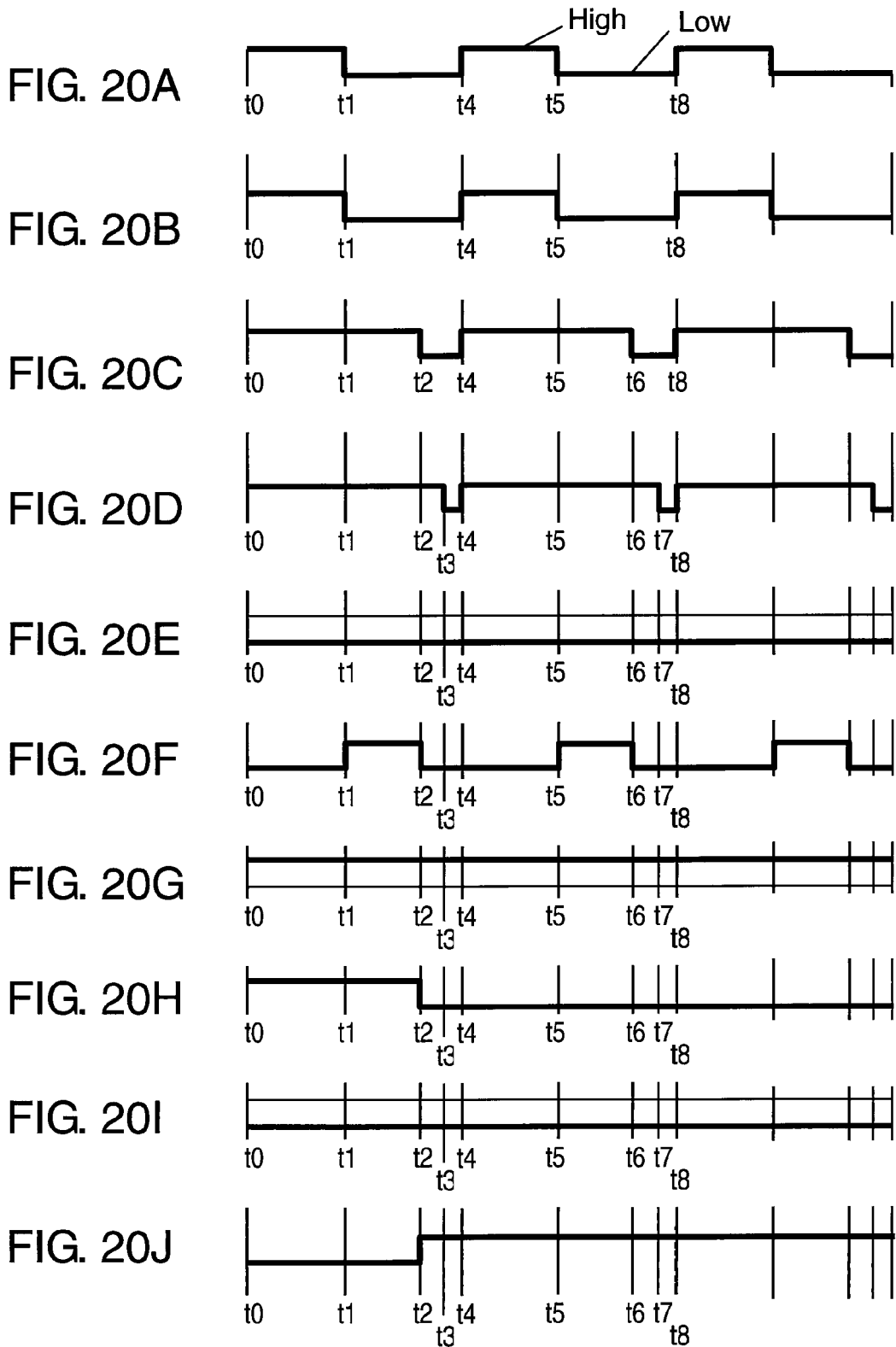

CAPACITIVE LIQUID-LEVEL SENSOR

THIS APPLICATION IS A U.S. NATIONAL PHASE APPLICATION OF PCT INTERNATIONAL APPLICATION PCT/JP2009/003397.

TECHNICAL FIELD

The present invention relates to a liquid level sensor which detects a liquid level of a liquid stored in a vessel and, in particular, to a liquid level sensor which detects a liquid level of an engine oil or a fuel for an automobile, a construction machine, or the like.

BACKGROUND ART

As a liquid level sensor which detects a liquid level of an engine oil or a fuel in an automobile, a construction machine, or the like, a liquid level sensor as shown in FIG. 33 or 34 is known (see Patent Document 1).

FIG. 33 is a front view of a detecting unit of a conventional liquid level sensor. In FIG. 33, first comb-shaped detecting electrode unit 2 is arranged on a lower end portion of rectangular substrate 1 which vertically extends. Second comb-shaped detecting electrode unit 3 is arranged on a central portion of substrate 1.

First detecting electrode unit 2 is configured by a plurality of linear electrodes 4 vertically arranged at predetermined intervals. Linear electrodes 4 are alternately connected to extraction lines 5 and 6 which vertically extend along both side edges of substrate 1.

Second detecting electrode unit 3 is configured by a plurality of linear electrodes 7 which are arranged to extend from an upper end portion to a lower end portion at predetermined intervals from side to side. Linear electrodes 7 have upper ends alternately connected to extraction lines 8 and 9.

In liquid level measurement, the detecting unit is dipped in a liquid to be measured. More specifically, first detecting electrode unit 2 is arranged to be always dipped in the liquid to be measured. On the other hand, second detecting electrode unit 3 crosses to the liquid level to be measured, and a part dipped in the liquid increases or decreases in size with rising and falling of the liquid level.

FIG. 34 is a detecting circuit diagram of a conventional liquid level sensor. In FIG. 34, a detecting circuit is configured by oscillating circuit 10 and processing circuit 17. Oscillating circuit 10 has inverters 11, 12, and 13 and resistor 14. First and second detecting electrode units 2 and 3 which configure the detecting unit in FIG. 33 are connected between inverters 12 and 13 through analog switches 15 and 16.

Processing circuit 17 having a microcomputer closes analog switch 15 first calculates a dielectric constant of the liquid to be measured from an oscillation frequency determined by resistor 14 and a capacitance of first detecting electrode unit 2 to store the dielectric constant. Processing circuit 17 closes other analog switch 16 in place of analog switch 15. A liquid level is calculated based on an oscillation frequency determined by resistor 14 and a capacitance of second detecting electrode unit 3 and the dielectric constant of the liquid to be measured.

As information of prior art document related to the invention of the application, for example, Patent Document 1 is known.

However, in the conventional liquid level sensor, a dielectric constant of a liquid to be measured is calculated from an oscillation frequency of oscillating circuit 10 determined by a capacitance between the electrodes of first detecting electrode unit 2 always dipped in the liquid to be measured and the dielectric constant is stored. Thereafter, the level of the liquid to be measured is calculated from the oscillation frequency of oscillating circuit 10 determined by a capacitance between the electrodes of second detecting electrode unit 3 crossing to the liquid level to be measured and having a part which is dipped in the liquid and increases or decreases in size with rising and falling of the liquid level, and the dielectric constant of the liquid to be measured. Therefore, an operational device to calculate the liquid level becomes complex and has a large scale.

PRIOR ART DOCUMENT

[Patent Document]
[Patent Document 1] Unexamined Japanese Patent Publication No. 63-79016

DISCLOSURE OF THE INVENTION

The present invention provides a liquid level sensor which can accurately detect a liquid level without a complex operational device even though a dielectric constant or a temperature of a liquid to be measured changes.

A liquid level sensor according to the present invention includes a detecting unit having a first detecting electrode always being in a liquid to be measured, a second detecting electrode which measures a liquid level of the liquid to be measured, and a third detecting electrode always being out of the liquid to be measured; and a circuit which repeats an operation of charging for a time which is in proportion to a ratio of a length of a part of the second detecting electrode dipped in the liquid to be measured to a total length of the second detecting electrode and an operation of discharging the charged electric charge for a time which is in proportion to a ratio of a length of a part of the second detecting electrode being out of the liquid to be measured to the total length of the second detecting electrode. With this configuration, a voltage being in proportion to a liquid level can be always outputted without arranging a complex operational device even though a dielectric constant, a temperature, or the like of the liquid to be measured changes. For this reason, a highly sensitive liquid level sensor can be easily provided.

BRIEF DESCRIPTION OF THE DRAWINGS

FIG. 18A is a voltage waveform chart in each unit of the liquid level sensor according to Embodiment 3 of the present invention.

FIG. 18B is a voltage waveform chart in each unit of the liquid level sensor according to Embodiment 3 of the present invention.

FIG. 18C is a voltage waveform chart in each unit of the liquid level sensor according to Embodiment 3 of the present invention.

FIG. 18D is a voltage waveform chart in each unit of the liquid level sensor according to Embodiment 3 of the present invention.

FIG. 18E is a voltage waveform chart in each unit of the liquid level sensor according to Embodiment 3 of the present invention.

FIG. 18F is a voltage waveform chart in each unit of the liquid level sensor according to Embodiment 3 of the present invention.

FIG. 18G is a voltage waveform chart in each unit of the liquid level sensor according to Embodiment 3 of the present invention.

FIG. 18H is a voltage waveform chart in each unit of the liquid level sensor according to Embodiment 3 of the present invention.

FIG. 18I is a voltage waveform chart in each unit of the liquid level sensor according to Embodiment 3 of the present invention.

FIG. 18J is a voltage waveform chart in each unit of the liquid level sensor according to Embodiment 3 of the present invention.

FIG. 20A is a voltage waveform chart of each unit of the liquid level sensor when a liquid level of a liquid to be measured exceeds a lower end of the second detecting electrode and falls to a center of a first detecting electrode in the liquid level sensor according to Embodiment 3 of the present invention.

FIG. 20B is a voltage waveform chart of each unit of the liquid level sensor when the liquid level of the liquid to be measured exceeds the lower end of the second detecting electrode and falls to the center of the first detecting electrode in the liquid level sensor according to Embodiment 3 of the present invention.

FIG. 20C is a voltage waveform chart of each unit of the liquid level sensor when the liquid level of the liquid to be measured exceeds the lower end of the second detecting electrode and falls to the center of the first detecting electrode in the liquid level sensor according to Embodiment 3 of the present invention.

FIG. 20D is a voltage waveform chart of each unit of the liquid level sensor when the liquid level of the liquid to be measured exceeds the lower end of the second detecting electrode and falls to the center of the first detecting electrode in the liquid level sensor according to Embodiment 3 of the present invention.

FIG. 20E is a voltage waveform chart of each unit of the liquid level sensor when the liquid level of the liquid to be measured exceeds the lower end of the second detecting electrode and falls to the center of the first detecting electrode in the liquid level sensor according to Embodiment 3 of the present invention.

FIG. 20F is a voltage waveform chart of each unit of the liquid level sensor when the liquid level of the liquid to be measured exceeds the lower end of the second detecting electrode and falls to the center of the first detecting electrode in the liquid level sensor according to Embodiment 3 of the present invention.

FIG. 20G is a voltage waveform chart of each unit of the liquid level sensor when the liquid level of the liquid to be measured exceeds the lower end of the second detecting electrode and falls to the center of the first detecting electrode in the liquid level sensor according to Embodiment 3 of the present invention.

FIG. 20H is a voltage waveform chart of each unit of the liquid level sensor when the liquid level of the liquid to be measured exceeds the lower end of the second detecting electrode and falls to the center of the first detecting electrode in the liquid level sensor according to Embodiment 3 of the present invention.

FIG. 20I is a voltage waveform chart of each unit of the liquid level sensor when the liquid level of the liquid to be measured exceeds the lower end of the second detecting electrode and falls to the center of the first detecting electrode in the liquid level sensor according to Embodiment 3 of the present invention.

FIG. 20J is a voltage waveform chart of each unit of the liquid level sensor when the liquid level of the liquid to be measured exceeds the lower end of the second detecting electrode and falls to the center of the first detecting electrode in the liquid level sensor according to Embodiment 3 of the present invention.

PREFERRED EMBODIMENTS FOR CARRYING OUT OF THE INVENTION

Embodiment 1

A liquid level sensor according to Embodiment 1 of the present invention will be described below with reference to the accompanying drawings.

Figure 1:
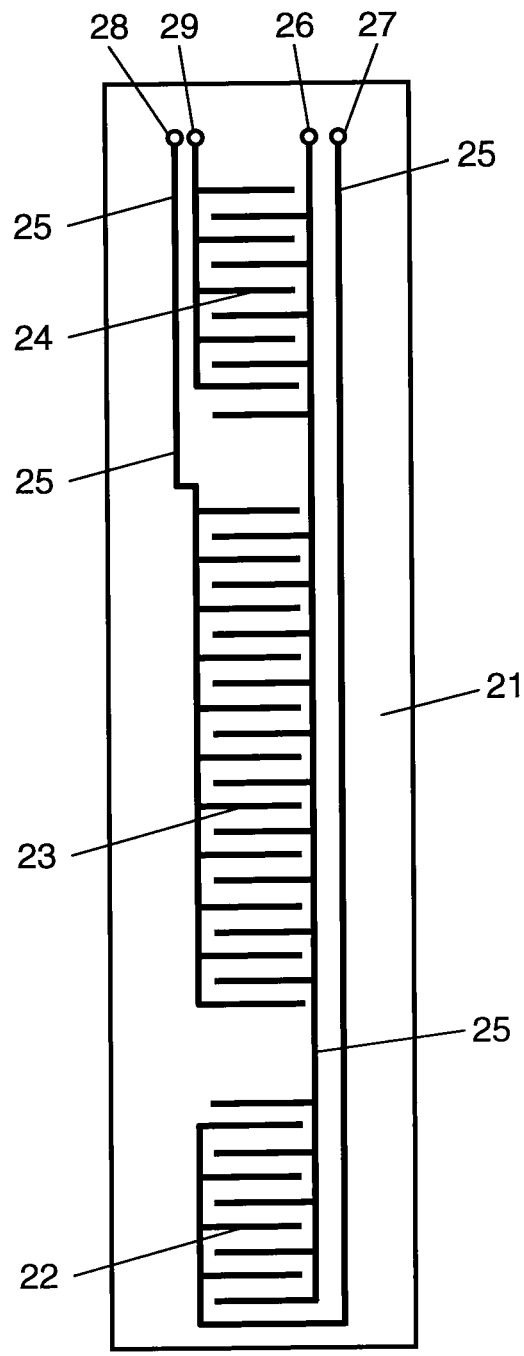
FIG. 1 is a front view of a detecting unit in a liquid level sensor according to Embodiment 1 of the present invention.

FIG. 1 is a front view of a detecting unit in the liquid level sensor according to Embodiment 1 of the present invention. In FIG. 1, a pair of first comb-shaped detecting electrodes 22 made of carbon are arranged on a lower end portion of vertically extending rectangular detecting unit 21 made of a polyimide film or the like. A pair of second comb-shaped detecting electrodes 23 made of carbon are arranged at the center of detecting unit 21. Furthermore, similarly, a pair of third comb-like detecting electrodes 24 made of carbon are arranged on an upper end portion of detecting unit 21. First, second, and third detecting electrodes 22, 23, and 24 are connected to terminals 26, 27, 28, and 29 with vertically extending extraction lines 25.

Figure 2:
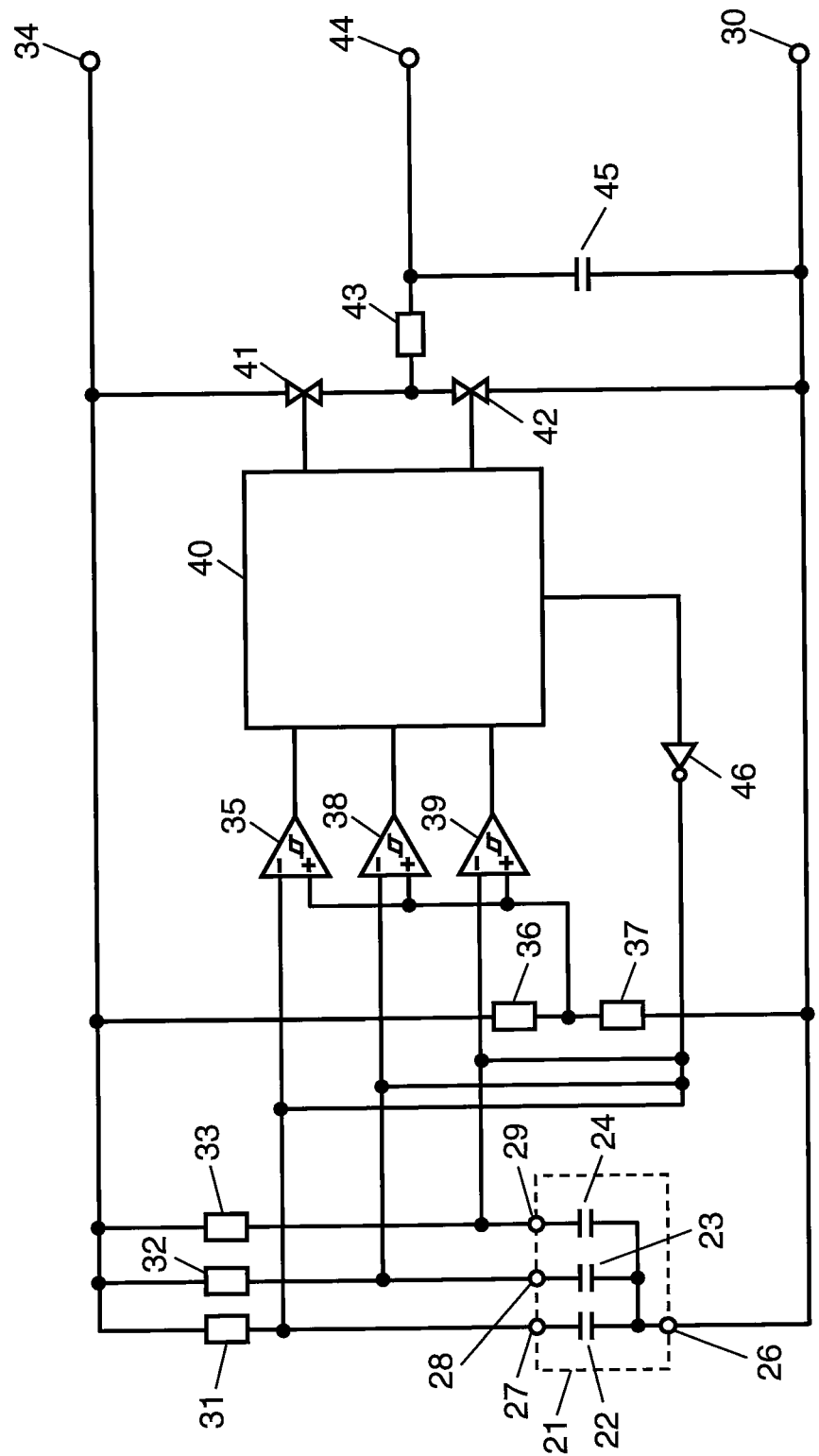
FIG. 2 is a detecting circuit diagram of the liquid level sensor according to Embodiment 1 of the present invention.

FIG. 2 is a detecting circuit diagram of the liquid level sensor according to Embodiment 1 of the present invention. In FIG. 2, terminal 26 of detecting unit 21 is connected to first potential 30 configured by a GND potential. Terminals 27, 28, and 29 of detecting unit 21 are connected to second potential 34 configured by a 5-V power supply potential through resistors 31, 32, and 33, respectively. In this manner, first detecting electrodes 22, second detecting electrodes 23, and third detecting electrodes 24 are connected to resistors 31, 32, and 33, respectively. At this time, in a state in which first, second, and third detecting electrodes 22, 23, and 24 are out of a liquid to be measured, a time constant determined by an inter-electrode capacitance of first detecting electrodes 22 and resistor 31, a time constant determined by an inter-electrode capacitance of second detecting electrodes 23 and resistor 32, and a time constant determined by an inter-electrode capacitance of third detecting electrodes 24 and resistor 33 are set to be substantially equal to one another.

A first midpoint potential between resistor 31 and first detecting electrode 22 is compared with a threshold value given by resistors 36 and 37 in first comparing unit 35 configured by a comparator. Similarly, a second midpoint potential between resistor 32 and second detecting electrode 23 and a third midpoint potential between resistor 33 and third detecting electrode 24 is compared with a threshold value given by resistors 36 and 37 in second comparing unit 38 and third comparing unit 39 which are configured by comparators, respectively.

Output signals from first, second, and third comparing units 35, 38, and 39 are inputted to logic circuit 40 configured by a logic element or a flip-flop. At a subsequent stage of logic circuit 40, first analog switch 41 and second analog switch 42 which are open-and-close-controlled by an output signal from logic circuit 40 are arranged. One end of fourth resistor 43 is connected to a midpoint between first analog switch 41 and second analog switch 42, and the other end is connected to output terminal 44. Furthermore, one end of capacitor 45 is connected to first potential 30, and the other end is connected between fourth resistor 43 and output terminal 44.

In this manner, an electronic circuit of the liquid level sensor according to Embodiment 1 of the present invention is configured.

A circuit operation of the liquid level sensor according to Embodiment 1 of the present invention will be described below with reference to FIGS. 3A to 3H.

FIGS. 3A to 3H show voltage waveforms of each unit of the liquid level sensor according to Embodiment 1 of the present invention. Detecting unit 21 of the liquid level sensor shown in FIG. 1 is dipped in a liquid to be measured such as an engine oil in an oil pan (not shown). At this time, first detecting electrodes 22 are always dipped in the liquid to be measured, and third detecting electrodes 24 are arranged out of the liquid to be measured. Second detecting electrodes 23 cross to a level of the liquid to be measured, and a part dipped in the liquid increases or decreases in size with rising and falling of the liquid level.

In an initial state (t0) before power supply is turned on, electric charges are not present between first, second, and third detecting electrodes 22, 23, and 24. Therefore, all the first midpoint potential between resistor 31 and first detecting electrode 22, the second midpoint potential between resistor 32 and second detecting electrode 23, and the third midpoint potential between resistor 33 and third detecting electrode 24 are equal to first potential 30 ($V_1$).

Figure 3A:
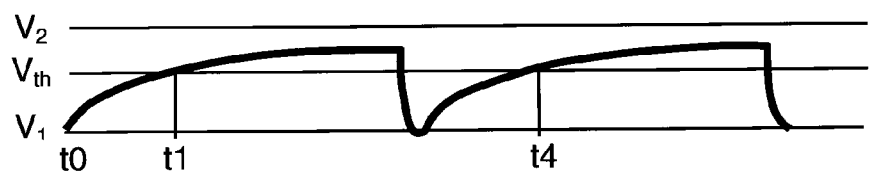
FIG. 3A is a waveform chart for explaining a circuit operation of the liquid level sensor according to Embodiment 1 of the present invention.

In FIG. 3A, when the power supply is turned on, the third midpoint potential between resistor 33 and third detecting electrode 24 exponentially increases from first potential 30 ($V_1$) to second potential 34 ($V_2$) at the time constant determined by resistor 33 and the inter-electrode capacitance of third detecting electrodes 24.

Figure 3B:
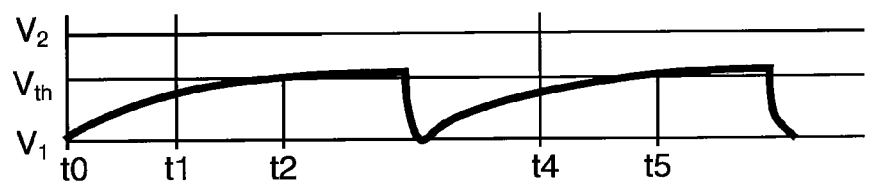
FIG. 3B is a waveform chart for explaining a circuit operation of the liquid level sensor according to Embodiment 1 of the present invention.

In FIG. 3B, the second midpoint potential between resistor 32 and second detecting electrode 23 exponentially increases from first potential 30 ($V_1$) to second potential 34 ($V_2$) at the time constant determined by resistor 32 and the inter-electrode capacitance of second detecting electrodes 23. At this time, since the part of second detecting electrode 23 is in the liquid to be measured, the time constant determined by resistor 32 and the electrostatic capacitance of second detecting electrodes 23 is larger than the time constant determined by resistor 33 and third detecting electrode 24.

Figure 3C:
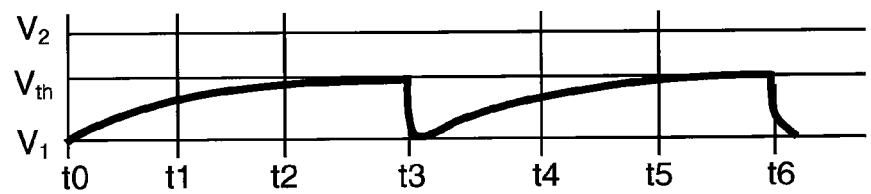
FIG. 3C is a waveform chart for explaining a circuit operation of the liquid level sensor according to Embodiment 1 of the present invention.

In FIG. 3C, the first midpoint potential between resistor 31 and first detecting electrode 22 exponentially increases from first potential 30 ($V_1$) to second potential 34 ($V_2$) at the time constant determined by resistor 31 and the inter-electrode capacitance of first detecting electrodes 22. At this time, since first detecting electrodes 22 are always dipped in the liquid to be measured, the time constant determined by resistor 31 and the electrostatic capacitance of first detecting electrodes 22 is larger than the time constant determined by resistor 32 and second detecting electrodes 23.

Figure 3D:
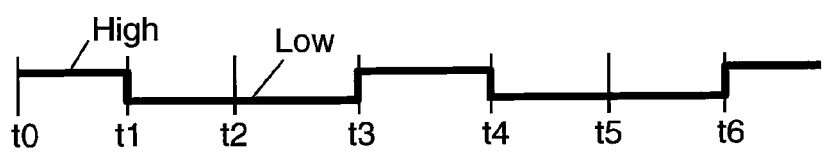
FIG. 3D is a waveform chart for explaining a circuit operation of the liquid level sensor according to Embodiment 1 of the present invention.

In FIG. 3D, when the third midpoint potential between resistor 33 and third detecting electrode 24 reaches threshold voltage $V_{th}$ determined by resistors 36 and 37, an output from third comparing unit 39 configured by a comparator shifts from high to low (t1).

Figure 3E:
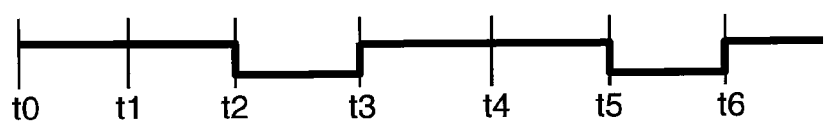
FIG. 3E is a waveform chart for explaining a circuit operation of the liquid level sensor according to Embodiment 1 of the present invention.

In FIG. 3E, when the second midpoint potential between resistor 32 and second detecting electrode 23 reaches threshold voltage $V_{th}$ determined by resistors 36 and 37, an output from second comparing unit 38 configured by a comparator shifts from high to low (t2).

Figure 3F:
FIG. 3F is a waveform chart for explaining a circuit operation of the liquid level sensor according to Embodiment 1 of the present invention.

In FIG. 3F, when the first midpoint potential between resistor 31 and first detecting electrode 22 reaches threshold voltage $V_{th}$ determined by resistors 36 and 37, an output from first comparing unit 35 configured by a comparator shifts from high to low. At the same time, electric charges accumulated in first, second, and third detecting electrodes 22, 23 and 24 are discharged to first potential 30 ($V_1$) through element 46 having an open-collector configuration. Therefore, all the first midpoint potential between resistor 31 and first detecting electrode 22, the second midpoint potential between resistor 32 and second detecting electrode 23, and the third midpoint potential between resistor 33 and third detecting electrode 24 return to first potential 30 ($V_1$). Furthermore, each of outputs from first, second, and third comparing units 35, 38, and 39 shifts from low to high (t3) as shown in FIGS. 3F, 3E, and 3D.

Thereafter, the third midpoint potential between resistor 33 and third detecting electrode 24, the second midpoint potential between resistor 32 and second detecting electrode 23, and the first midpoint potential between resistor 31 and first detecting electrode 22 exponentially increase again from first potential 30 ($V_1$) to second potential 34 ($V_2$), as shown in FIGS. 3A, 3B, and 3C, at the time constants determined by resistor 33 and the inter-electrode capacitance of third detecting electrodes 24, resistor 32 and inter-electrode capacitance of second detecting electrodes 23, and resistor 31 and inter-electrode capacitance of first detecting electrodes 22.

When the third midpoint potential between resistor 33 and third detecting electrode 24 reaches threshold voltage $V_{th}$ determined by resistors 36 and 37, an output from third comparing unit 39 configured by a comparator shifts from high to low (t4) as shown in FIG. 3D.

In the same manner as described above, when the second midpoint potential between resistor 32 and second detecting electrode 23 reaches threshold voltage $V_{th}$ determined by resistors 36 and 37, an output from second comparing unit 38 configured by a comparator shifts from high to low (t5) as shown in FIG. 3E.

When the first midpoint potential between resistor 31 and first detecting electrode 22 reaches threshold voltage $V_{th}$ determined by resistors 36 and 37, an output from first comparing unit 35 configured by a comparator shifts from high to low as show in FIG. 3F. At the same time, electric charges accumulated in first, second, and third detecting electrodes 22, 23, and 24 are discharged to first potential 30 through element 46 having an open-collector configuration. Therefore, all the first midpoint potential between resistor 31 and first detecting electrode 22, the second midpoint potential between resistor 32 and second detecting electrode 23, and the third midpoint potential between resistor 33 and third detecting electrode 24 return to first potential 30 ($V_1$). Furthermore, each of outputs from first, second, and third comparing units 35, 38, and 39 shifts from low to high (t6) as shown in FIGS. 3F, 3D, and 3E. The same operations as described above will be repeated subsequently.

Figure 3G:
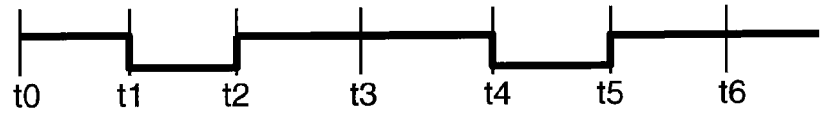
FIG. 3G is a waveform chart for explaining a circuit operation of the liquid level sensor according to Embodiment 1 of the present invention.
Figure 3H:
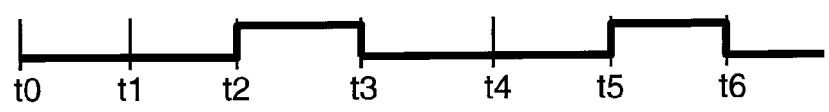
FIG. 3H is a waveform chart for explaining a circuit operation of the liquid level sensor according to Embodiment 1 of the present invention.

Output signals from first, second, and third comparing units 35, 38, and 39 are inputted to logic circuit 40 configured by a logic element or a flip-flop. A signal shown in FIG. 3G is outputted to first analog switch 41. A signal shown in FIG. 3H is outputted to second analog switch 42.

In this case, when a signal inputted to first analog switch 41 is at high, first analog switch 41 is "opened". When the signal is at low, first analog switch 41 is "closed". When a signal inputted to second analog switch 42 is at high, second analog switch 42 is "closed". When the signal is at low, second analog switch 42 is "opened".

In this manner, for times t1 to t2 and times t4 to t5, first analog switch 41 is "closed", and second analog switch 42 is "opened". For this reason, capacitor 45 is charged from second potential 34 through fourth resistor 43. For times t2 to t3 and times t5 to t6, first analog switch 41 is "opened", and second analog switch 42 is "closed". For this reason, electric charges accumulated in capacitor 45 are discharged to first potential 30 ($V_1$) through fourth resistor 43.

For times t0 to t1 and times t3 to t4, both first analog switch 41 and second analog switch 42 are "opened", electric charges accumulated in capacitor 45 are stored. In this manner, first analog switch 41 and second analog switch 42 are alternately opened and closed for a period determined by a length of a part of second detecting electrode 23 dipped in the liquid to be measured and a length of a part being out of the liquid to be measured to discharge capacitor 45 so as to make it possible to output a liquid level of the liquid to be measured to output terminal 44 as an analog voltage.

The above circuit operations will be further described by using numerical expressions. In order to briefly describe the circuit operations, electrostatic capacitances per unit length obtained when first, second, third detecting electrodes 22, 23, and 24 are out of a liquid to be measured are represented by $C_0$, resistances of resistors 31 and 33 are represented by $r_1$, a resistance of resistor 32 is represented by $r_2$, lengths of first and third detecting electrodes 22 and 24 are represented by A, a length of second detecting electrode 23 is represented by B, a relative dielectric constant of the liquid to be measured is represented by $\in_r$, a length of second detecting electrode 23 dipped in the liquid to be measured is represented by αB, and a length of second detecting electrode 23 being out of the liquid to be measured is represented by (1−α)B. Note that α denotes an arbitrary positive number in the range of 0 to 1. First potential 30 ($V_1$) is represented by 0 [V], and second potential 34 ($V_2$) is represented by $V_{dd}$ [V]. At this time, the time constant determined by first detecting electrode 22 and resistor 31 is expressed by Equation 1.

[Numerical Expression 1]

$$C_0 A r_1 \in_{2S_r} \quad \text{Equation 1}$$

A time constant determined by second detecting electrode 23 and resistor 32 is expressed by Equation 2.

[Numerical Expression 2]

$$C_0 B r_2 [\alpha \in_r + (1-\alpha)] \quad \text{Equation 2}$$

A time constant determined by third detecting electrode 24 and resistor 33 is expressed by Equation 3.

[Numerical Expression 3]

$$C_0 A r_1 \quad \text{Equation 3}$$

As described above, in a state in which all first, second, and third detecting electrodes 22, 23, and 24 are out of a liquid to be measured, the time constant determined by an inter-electrode capacitance of first detecting electrodes 22 and resistor 31, the time constant determined by an inter-electrode capacitance of second detecting electrodes 23 and resistor 32, and the time constant determined by an inter-electrode capacitance of third detecting electrodes 24 and resistor 33 are set to be substantially equal to one another. Therefore, $$C_0 A r_1 = C_0 B r_2$$

is given. This value is newly defined as D.

When the power supply is turned on, third midpoint potential $V_{n3}$ between resistor 33 and third detecting electrode 24 is expressed by Equation 4.

[Numerical Expression 4]

$$V_{n3} = V_{dd}(1 - e^{-\frac{t}{D}}) \quad \text{Equation 4}$$

According to this equation, t1 in FIGS. 3A to 3H is expressed by Equation 5.

[Numerical Expression 5]

$$t1 = -D\ln\left(1 - \frac{V_{th}}{V_{dd}}\right) \quad \text{Equation 5}$$

Second midpoint potential $V_{n2}$ between resistor 32 and second detecting electrode 23 is expressed by Equation 6.

[Numerical Expression 6]

$$V_{n2} = V_{dd}\left(1 - e^{-\frac{t}{D(\alpha \varepsilon_r + 1 - \alpha_r)}}\right) \quad \text{Equation 6}$$

According to Equation 6, t2 in FIGS. 3A to 3H is expressed by Equation 7.

[Numerical Expression 7]

$$t2 = -D(\alpha \varepsilon_r + 1 - \alpha)\ln\left(1 - \frac{V_{th}}{V_{dd}}\right) \quad \text{Equation 7}$$

In this manner, time $T_c$ for which capacitor 45 is charged is expressed by Equation 8.

[Numerical Expression 8]

$$T_c = t2 - t1 = -D\alpha(\varepsilon_r - 1)\ln\left(1 - \frac{V_{th}}{V_{dd}}\right) \quad \text{Equation 8}$$

Time $T_d$ for which capacitor 45 is discharged is expressed by Equation 9.

[Numerical Expression 9]

$$T_d = t3 - t2 = -D(1-\alpha)(\varepsilon_r - 1)\ln\left(1 - \frac{V_{th}}{V_{dd}}\right) \quad \text{Equation 9}$$

According to Equation 8 and Equation 9 described above, it is understood that charging time $T_c$ is in proportion to length $\alpha B$ of a part of second detecting electrode 23 dipped in a liquid to be measured and that discharging time $T_d$ is determined by a length of a part of second detecting electrode 23 being out of the liquid to be measured. Furthermore, it is understood that, even though dielectric constant of the liquid to be measured is changed by a change in temperature, deterioration and denaturation of the liquid to be measured, and the like, or even though $C_0$, i.e., D is changed by a change in vapor pressure of the liquid to be measured with a change in temperature or the like, although $T_c$ and $T_d$ change, a ratio of $T_c$ to $T_d$ does not change.

Output voltage $V_0$ generated at output terminal 44 is expressed by a numerical expression. In the circuit shown in FIG. 2, as described in FIGS. 3A to 3H, for the periods of t0 to t1, t3 to t4, and the like, both first and second analog switches 41 and 42 are "opened". Therefore, an electric charge accumulated in capacitor 45 does not change, and output voltage $V_0$ does not also change.

In the following description, these periods are ignored, and a change in output voltage when charging time $T_c$ and discharging time $T_d$ are repeated will be considered. An output voltage obtained immediately after the power supply is turned on is set to 0 [V]. When a resistance of fourth resistor 43 is represented by R and when a capacitance of capacitor 45 is represented by C, output voltage $V_{1c}$ obtained after the first charge is expressed by Equation 10.

[Numerical Expression 10]

$$V_{1c} = V_{dd}(1 - e^{\frac{T_c}{CR}}) \quad \text{Equation 10}$$

Output voltage $V_{1d}$ obtained after the first discharge is expressed by Equation 11.

[Numerical Expression 11]

$$V_{1d} = V_{1c}e^{-\frac{T_d}{CR}} \quad \text{Equation 11}$$

Output voltage $V_{2c}$ obtained after the second charge is expressed by Equation 12.

[Numerical Expression 12]

$$V_{2c} = V_{1d} + (V_{dd} - V_{1d})(1 - e^{-\frac{T_c}{CR}}) \quad \text{Equation 12}$$

Output voltage $V_{2d}$ obtained after the second discharge is expressed by Equation 13.

[Numerical Expression 13]

$$V_{2d} = V_{2c}e^{-\frac{T_d}{CR}} \quad \text{Equation 13}$$

Output voltage $V_{3c}$ obtained after the third charge and output voltage $V_{3d}$ obtained after discharge are expressed by Equation 14 and Equation 15, respectively.

[Numerical Expression 14]

$$V_{3c} = V_{2d} + (V_{dd} - V_{2d})(1 - e^{-\frac{T_c}{CR}}) \quad \text{Equation 14}$$

[Numerical Expression 15]

$$V_{3d} = V_{3c}e^{-\frac{T_d}{CR}} \quad \text{Equation 15}$$

By the same manner as described above, output voltages obtained after charge and discharge can be calculated. FIGS. 4 to 7 are obtained by calculating output voltage $V_0$ when resistance R of fourth resistor 43 and capacitance C of capacitor 45 are set to 500 kΩ and 100 pF, respectively.

Figure 4:
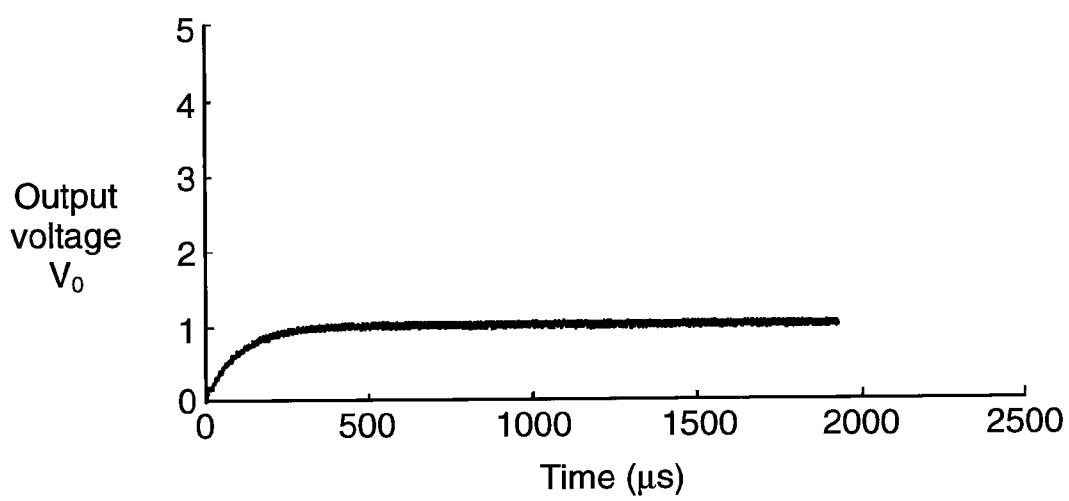
FIG. 4 is a characteristic graph showing a change of output voltage with time when a ratio of a length of a part of a second detecting electrode dipped in a liquid to be measured to a length of a part being out of the liquid to be measured is 1:4 in the liquid level sensor according to Embodiment 1 of the present invention.

FIG. 4 is a characteristic graph showing a change of output voltage $V_0$ with time when a ratio of a length of a part of the second detecting electrode dipped in the liquid to be measured to a length of a part being out of the liquid to be measured is 1:4 in the liquid level sensor according to Embodiment 1 of the present invention. FIG. 4 shows a change of output voltage $V_0$ with time when charging time $T_c$ and discharging time $T_d$ are set to 1 μsec and 4 μsec, respectively, more specifically, a ratio of $T_c$ to $T_d$, i.e., a ratio of a length of a part of second detecting electrodes 23 dipped in the liquid to be measured to a length of a part being out of the liquid to be measured is 1:4. It is understood that output voltage $V_0$ made by superposing a ripple having an amplitude of about ±0.04 [V] on a DC component of 1 [V] is obtained after about 500 μsec have elapsed. This ripple can be removed by using an appropriate low-pass filter.

Figure 5:
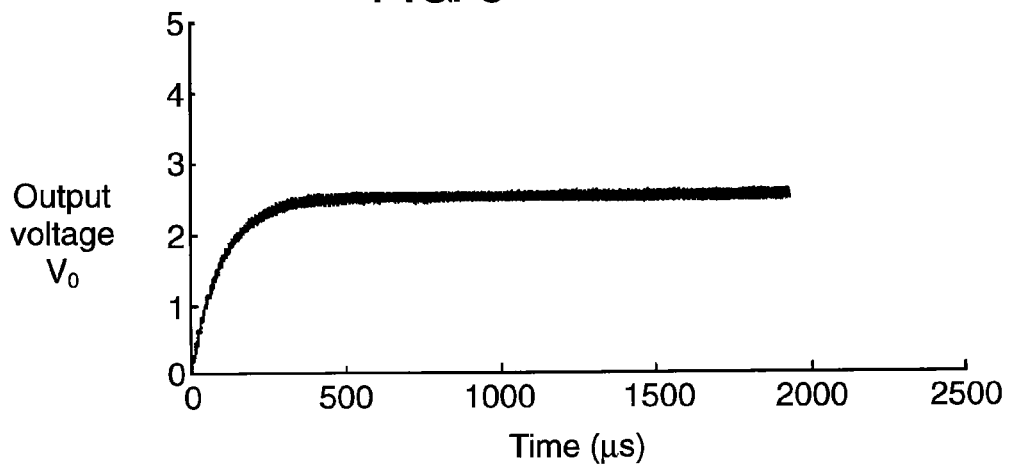
FIG. 5 is a characteristic graph showing a change of output voltage with time when a ratio of a length of a part of the second detecting electrode dipped in a liquid to be measured to a length of a part being out of the liquid to be measured is 1:1 in the liquid level sensor according to Embodiment 1 of the present invention.

FIG. 5 is a characteristic graph showing a change of output voltage $V_0$ with time when a ratio of a length of a part of the second detecting electrode dipped in a liquid to be measured to a length of a part being out of the liquid to be measured is 1:1 in the liquid level sensor according to Embodiment 1 of the present invention. FIG. 5 shows a change of output voltage $V_0$ with time when charging time $T_c$ and discharging time $T_d$ are set to 2.5 μsec and 2.5 μsec, respectively, more specifically, a ratio of $T_c$ to $T_d$, i.e., a ratio of a length of a part of second detecting electrode 23 dipped in the liquid to be measured to a length of a part being out of the liquid to be measured is 1:1. It is understood that output voltage $V_0$ made by superposing a ripple having an amplitude of about ±0.06 [V] on a DC component of 2.5 [V] is obtained after about 500 μsec have elapsed.

Figure 6:
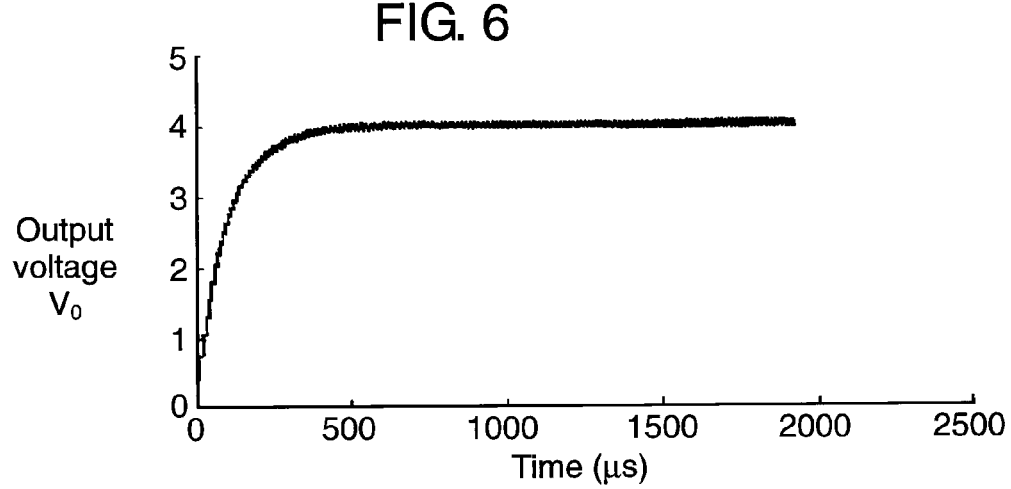
FIG. 6 is a characteristic graph showing a change of output voltage with time when a ratio of a length of a part of the second detecting electrode dipped in a liquid to be measured to a length of a part being out of the liquid to be measured is 4:1 in the liquid level sensor according to Embodiment 1 of the present invention.

FIG. 6 is a characteristic graph showing a change of output voltage with time when a ratio of a length of a part of the second detecting electrode dipped in a liquid to be measured to a length of a part being out of the liquid to be measured is 4:1 in the liquid level sensor according to Embodiment 1 of the present invention. FIG. 6 shows a change of output voltage $V_0$ with time when charging time $T_c$ and discharging time $T_d$ are set to 4 μsec and 1 μsec, respectively, more specifically, a ratio of $T_c$ to $T_d$, i.e., a ratio of a length of a part of second detecting electrode 23 dipped in the liquid to be measured to a length of a part being out of the liquid to be measured is 4:1. It is understood that output voltage $V_0$ made by superposing a ripple having an amplitude of about ±0.04 [V] on a DC component of 4 [V] is obtained after about 500 μsec have elapsed. In this manner, output voltage $V_O$ which is in proportion to the ratio of the length of the part of second detecting electrode 23 dipped in the liquid to be measured to the length of the part dipped in the liquid to be measured is generated at output terminal 44.

Figure 7:
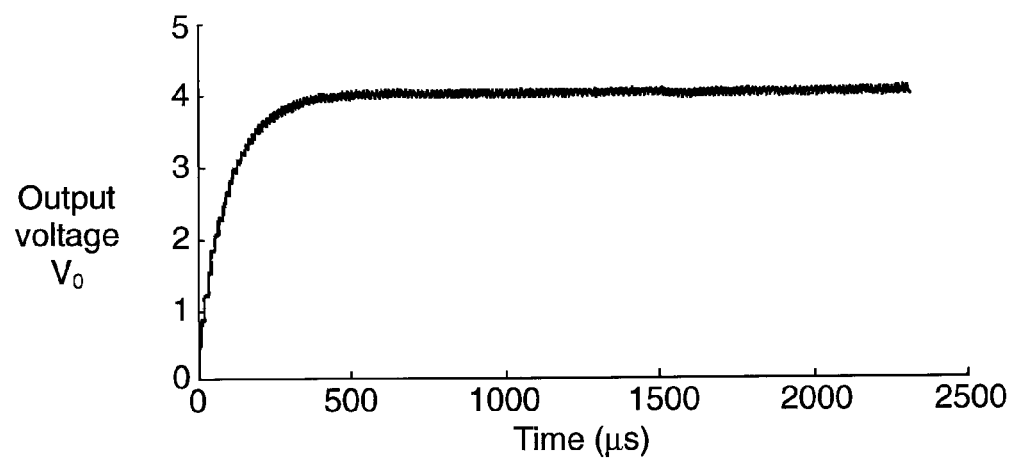
FIG. 7 is a characteristic graph showing a change of output voltage with time when a ratio of a length of a part of the second detecting electrode dipped in a liquid to be measured to a length of a part being out of the liquid to be measured is 1:4 in the liquid level sensor according to Embodiment 1 of the present invention and when a charging time and a discharging time are elongated by 20%.

FIG. 7 is a characteristic graph showing a change of output voltage $V_O$ with time when a ratio of a length of a part of the second detecting electrode dipped in a liquid to be measured to a length of a part being out of the liquid to be measured is 1:4 in the liquid level sensor according to Embodiment 1 of the present invention and when a charging time and a discharging time are elongated by 20%. FIG. 7 shows a change of output voltage $V_O$ with time when charging time $T_c$ and discharging time $T_d$ are set to 4.8 μsec and 1.2 μsec, respectively, i.e., $T_c$ and $T_d$ are each longer than those in FIG. 6 by 20%. In FIG. 7, it is understood that output voltage $V_O$ made by superposing a ripple having an amplitude of about ±0.05 [V] on a DC component of 4 [V] is obtained after about 500 μsec have elapsed. More specifically, it is understood that, even though dielectric constant $\in_r$ of the liquid to be measured is changed by a change in temperature, deterioration and denaturation of the liquid to be measured, and the like, or even though $C_0$, i.e., D is changed by a change in vapor pressure of the liquid to be measured with a change in temperature or the like to change $T_c$ and $T_d$, if the ratio of $T_c$ to $T_d$, i.e., the ratio of the length of the part of second detecting electrode 23 dipped in the liquid to be measured to the length of the part being out of the liquid to be measured is constant, a DC component of output voltage $V_O$ does not change.

As described above, the liquid level sensor according to Embodiment 1 of the present invention can always automatically output a voltage which is in proportion to a liquid level of the liquid to be measured without arranging a complex operational device in the liquid level sensor even though the dielectric constant or temperature of the liquid to be measured changes. In this manner, a highly sensitive liquid level sensor can be easily provided.

Embodiment 2

A liquid level sensor according to Embodiment 2 of the present invention will be described below with reference to the accompanying drawings.

Figure 8:
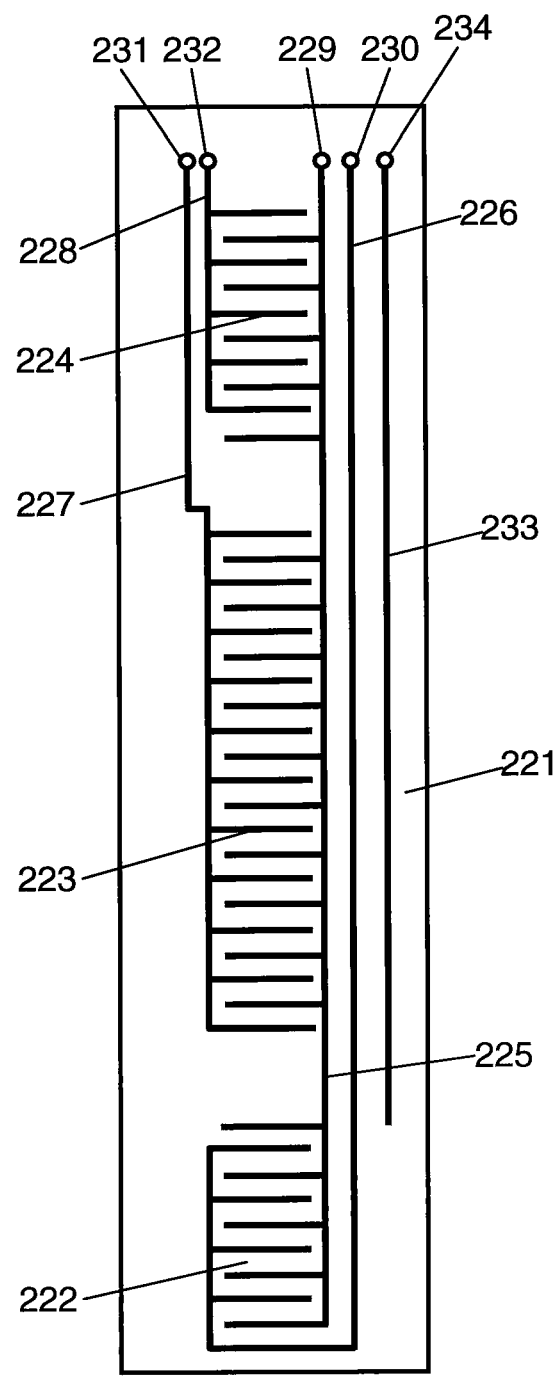
FIG. 8 is a front view of a detecting unit of a liquid level sensor according to Embodiment 2 of the present invention.

FIG. 8 is a front view of a detecting unit of the liquid level sensor according to Embodiment 2 of the present invention. In FIG. 8, a pair of first comb-shaped detecting electrodes 222 made of carbon are arranged on a lower end portion of vertically extending rectangular detecting unit 221 made of a polyimide film or the like. A pair of second comb-shaped detecting electrodes 223 made of carbon are arranged at the center of detecting unit 221. Furthermore, similarly, a pair of third comb-shaped detecting electrodes 224 made of carbon are arranged on an upper end portion of detecting unit 221. First, second, and third detecting electrodes 222, 223, and 224 are connected to terminals 229, 230, 231, and 232 by common extraction line 225 and extraction lines 226, 227, and 228 which vertically extend. First cancel electrode 233 arranged in the same direction as that of extraction line 226 of first detecting electrode 222 is arranged to extend from the upper end portion of detecting unit 221 to the upper end portion of first detecting electrode 222. The distance between first cancel electrode 233 and extraction line 226 of first detecting electrode 222 is made substantially equal to that between common extraction line 225 and extraction line 226 of the first detecting electrode. Furthermore, first cancel electrode 233 is connected to terminal 234.

Figure 9:
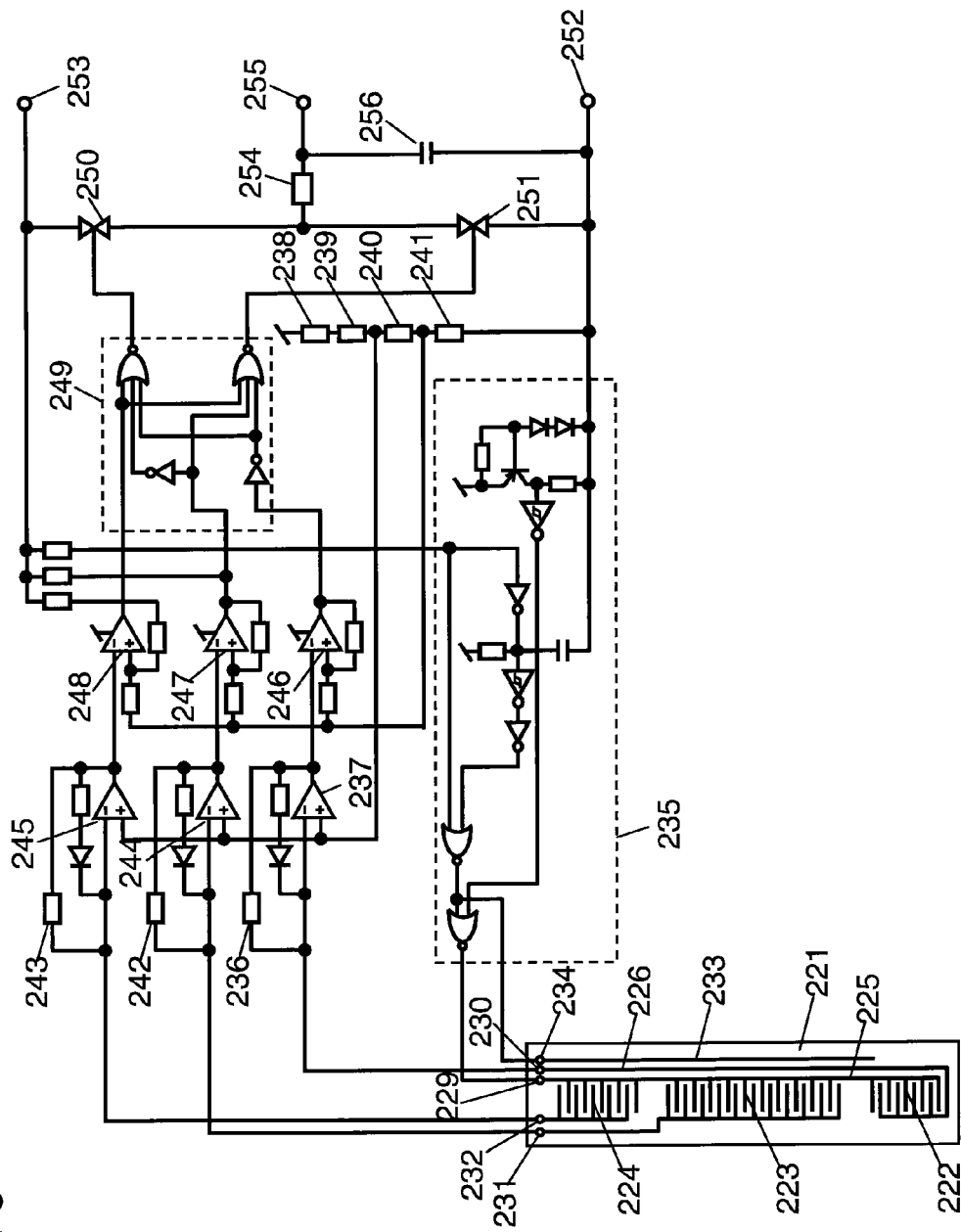
FIG. 9 is a detecting circuit diagram of the liquid level sensor according to Embodiment 2 of the present invention.

FIG. 9 is a detecting circuit diagram of the liquid level sensor according to Embodiment 2 of the present invention. In FIG. 9, a pulse from pulse generating circuit 235 is inputted to terminal 229 of detecting unit 221. Terminal 230 of detecting unit 221 is connected to one end of first resistor 236. A signal obtained by inverting a pulse is inputted to terminal 234 of detecting unit 221. In the detecting circuit, a signal branched from an input of a NOR gate in the final stage of pulse generating circuit 235 is inputted to terminal 234 of detecting unit 221. The other end of first resistor 236 is connected to an output side of first differential amplifier 237. A first node potential between terminal 230 and first resistor 236 is inputted to a negative terminal of first differential amplifier 237. A first threshold value determined by resistors 238, 239, 240, and 241 is inputted to a positive terminal. Similarly, terminals 231 and 232 of detecting unit 221 are connected to one ends of second and third resistors 242 and 243, respectively. Further, other ends of second and third resistors 242 and 243 are connected to output sides of second and third differential amplifiers 244 and 245, respectively. A second node potential between terminal 231 and second resistor 242 and a third node potential between terminal 232 and third resistor 243 are inputted to negative terminals of second and third differential amplifiers 244 and 245. A first threshold value determined by resistors 238, 239, 240, and 241 is inputted to positive terminals of second and third differential amplifiers 244 and 245. In Embodiment 2 of the present invention, the first threshold value is set to ½ of a power supply voltage. Furthermore, a diode and a resistor are connected in series between an input and an output of each of the differential amplifiers.

With this configuration, first detecting electrode 222, second detecting electrode 223, and third detecting electrode 224 are connected to first resistor 236, second resistor 242, third resistor 243, first differential amplifier 237, second differential amplifier 244, and third differential amplifier 245, respectively. At this time, in a state in which all first, second, and third detecting electrodes 222, 223, and 224 are out of the liquid to be measured, a time constant determined by an inter-electrode capacitance of first detecting electrodes 222 and first resistor 236, a time constant determined by an inter-electrode capacitance of second detecting electrodes 223 and second resistor 242, and a time constant determined by an inter-electrode capacitance of third detecting electrodes 224 and third resistor 243 are set to be substantially equal to one another.

An output potential from first differential amplifier 237 is compared with a second threshold value determined by resistors 238, 239, 240, and 241 in first comparing unit 246. Similarly, an output potential from second differential amplifier 244 and an output potential from third differential amplifier 245 are compared with a second threshold value determined by resistors 238, 239, 240, and 241 in second comparing unit 247 and third comparing unit 248 which are each configured by comparators. In Embodiment 2 of the present invention, the second threshold value is set to ¼ of the power supply voltage.

Output signals from first, second, and third comparing units 246, 247, and 248 are inputted to logic circuit 249 configured by a logic element and a flip-flop. First analog switch 250 and second analog switch 251 which are open/close-controlled based on the output signal from logic circuit 249 are arranged on the subsequent stage of logic circuit 249 between first potential 252 and second potential 253. Fourth resistor 254 has one end connected to a midpoint between first analog switch 250 and second analog switch 251. The other end of fourth resistor 254 is connected to output terminal 255.

Capacitor 256 has one end connected to first potential 252 and the other end connected between fourth resistor 254 and output terminal 255.

A circuit operation of the liquid level sensor according to Embodiment 2 of the present invention will be described below. FIGS. 10A to 10I are voltage waveform charts of each unit in the liquid level sensor according to Embodiment 2 of the present invention. Detecting unit 221 of the liquid level sensor shown in FIG. 8 is dipped in a liquid to be measured such as an engine oil in an oil pan (not shown). At this time, first detecting electrodes 222 are always dipped in the liquid to be measured, and third detecting electrodes 224 are always arranged out of the liquid to be measured. Second detecting electrodes 223 cross to the level of the liquid to be measured, and a part dipped in the liquid to be measured increases or decreases in size with rising and falling of the liquid level.

In an initial state (t0) before power supply is turned on, electric charges are not present between first, second, and third detecting electrodes 222, 223, and 224. Therefore, all a first node potential between resistor 236 and first detecting electrode 222, a second node potential between resistor 242 and second detecting electrode 223, and a third node potential between resistor 243 and third detecting electrode 224 are equal to first potential 52 ($V_1$).

Figure 10A:
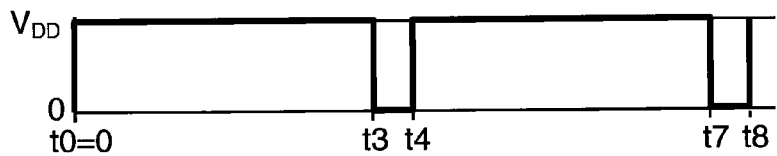
FIG. 10A is a voltage waveform chart in each unit of the liquid level sensor according to Embodiment 2 of the present invention.

In FIG. 10A, when the power supply is turned on (t0), a pulse from pulse generating circuit 235 is inputted to terminal 229 of detecting unit 221.

Figure 10B:
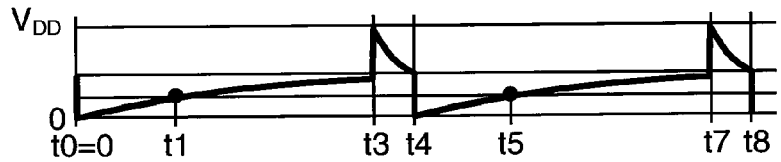
FIG. 10B is a voltage waveform chart in each unit of the liquid level sensor according to Embodiment 2 of the present invention.

In FIG. 10B, due to the pulse, an output potential from third differential amplifier 245 exponentially increases from first potential 252 ($V_1$) to second potential 253 ($V_2$) at the time constant determined by third resistor 243 and an inter-electrode capacitance of third detecting electrodes 224.

Figure 10C:
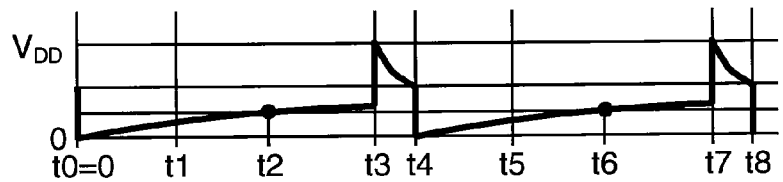
FIG. 10C is a voltage waveform chart in each unit of the liquid level sensor according to Embodiment 2 of the present invention.

In FIG. 10C, an output potential from second differential amplifier 244 exponentially increases from first potential 252 ($V_1$) to second potential 253 ($V_2$) at the time constant determined by second resistor 242 and an inter-electrode capacitance of second detecting electrodes 223. At this time, since a part of second detecting electrode 223 is in the liquid to be measured, the time constant determined by second resistor 242 and an electrostatic capacitance of second detecting electrodes 223 is larger than the time constant determined by third resistor 243 and third detecting electrode 224.

Figure 10D:
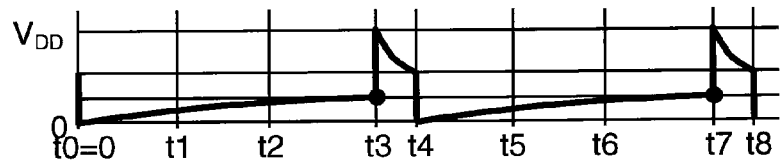
FIG. 10D is a voltage waveform chart in each unit of the liquid level sensor according to Embodiment 2 of the present invention.

In FIG. 10D, an output potential from first differential amplifier 237 exponentially increases from first potential 252 ($V_1$) to second potential 253 ($V_2$) at the time constant determined by first resistor 236 and an inter-electrode capacitance of first detecting electrodes 222. At this time, first detecting electrodes 222 are always dipped in the liquid to be measured. Therefore, the time constant determined by first resistor 236 and an electrostatic capacitance of first detecting electrodes 222 is larger than the time constant determined by second resistor 242 and second detecting electrode 223.

In this case, between terminals 229 and 230 of detecting unit 221, an electric charge accumulated in an electrostatic capacitance by first detecting electrode 222 and an electric charge accumulated in an electrostatic capacitance by common extraction line 225 and extraction line 226 of first detecting electrode 222 are present. Since an electrostatic capacitance obtained by common extraction line 225 and extraction line 226 of first detecting electrode 222 changes depending on a level of the liquid to be measured, the electrostatic capacitance of first detecting electrodes 222 is apparently measured as if the electrostatic capacitance increases. As a result, measurement of the level of the liquid to be measured has an error.

In Embodiment 2 of the present invention, a distance between first cancel electrode 233 and extraction line 226 of first detecting electrode 222 is made substantially equal to a distance between common extraction line 225 and extraction line 226 of first detecting electrode 222 to make the electrostatic capacitances substantially equal to each other. A signal obtained by inverting an output signal from pulse generating circuit 235 is inputted to terminal 234 of detecting unit 221.

With this configuration, an electric charge the amount of which is substantially equal to an electric charge accumulated between extraction line 226 of first detecting electrode 222 and common extraction line 225 and the sign of which is opposite to the electric charge is accumulated between extraction line 226 of first detecting electrode 222 and first cancel electrode 233. Therefore, electric charges accumulated between extraction line 226 of first detecting electrode 222 and common extraction line 225 are canceled. This eliminates that an electrostatic capacitance of the liquid to be measured that is detected by first detecting electrodes 222 is influenced by the level of the liquid to be measured.

Figure 10E:
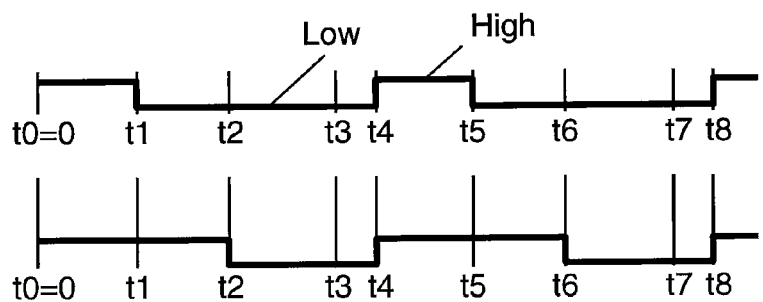
FIG. 10E is a voltage waveform chart in each unit of the liquid level sensor according to Embodiment 2 of the present invention.

In FIG. 10E, when the third node potential between third resistor 243 and third detecting electrode 224 reaches first threshold voltage $V_{th}$ determined by resistors 238, 239, 240, and 241, an output from third comparing unit 248 configured by a comparator shifts from high to low (t1).

Figure 10F:
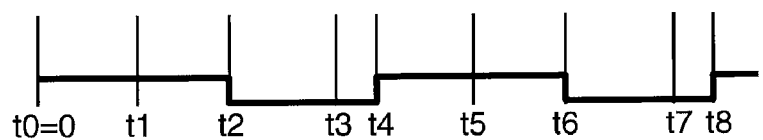
FIG. 10F is a voltage waveform chart in each unit of the liquid level sensor according to Embodiment 2 of the present invention.

In FIG. 10F, when the second node potential between second resistor 242 and second detecting electrode 223 reaches first threshold voltage $V_{th}$ determined by resistors 238, 239, 240, and 241, an output from second comparing unit 247 configured by a comparator shifts from high to low (t2).

Figure 10G:
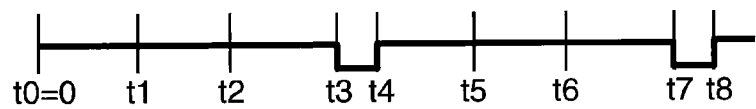
FIG. 10G is a voltage waveform chart in each unit of the liquid level sensor according to Embodiment 2 of the present invention.

In FIG. 10G, when the first node potential between first resistor 236 and first detecting electrode 222 reaches first threshold voltage $V_{th}$ determined by resistors 238, 239, 240, and 241, an output from first comparing unit 246 configured by a comparator shifts from high to low. At the same time, pulse generation from pulse generating circuit 235 is stopped. Therefore, output voltages from first differential amplifier 237, second differential amplifier 244, and third differential amplifier 245 increase to second potential ($V_1$) (t3).

Thereafter, diodes connected between the inputs and the outputs of first differential amplifier 237, second differential amplifier 244, and third differential amplifier 245 are turned on. At this time, output voltages from the differential amplifiers rapidly decrease. When the output voltages reach first threshold potentials given to the positive inputs of the differential amplifiers, outputs from the differential amplifiers return to first potential 252 ($V_1$). At the same time, each of outputs from first, second, and third comparing units 246, 247, and 248 shifts from low to high as shown in FIGS. 10G, 10F, and 10E. As shown in FIG. 10A, a pulse is generated from pulse generating circuit 235 and inputted to terminal 229 of detecting unit 221 (t4).

Furthermore, thereafter, output potentials from first differential amplifier 237, second differential amplifier 244, and third differential amplifier 245 increase again from first potential 252 ($V_1$) to second potential 253 ($V_2$). More specifically, as shown in FIGS. 10D, 10C, and 10B, the output potentials exponentially increase at time constants determined between third resistor 243 the inter-electrode capacitance of third detecting electrodes 224, between second resistor 242 and the inter-electrode capacitance of second detecting electrodes 223, and between first resistor 236 and the inter-electrode capacitance of first detecting electrodes 222. Subsequently, the same operations as those for a period of t0 to t4 are repeated.

Figure 10H:
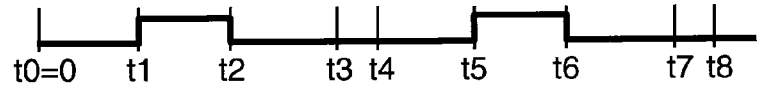
FIG. 10H is a voltage waveform chart in each unit of the liquid level sensor according to Embodiment 2 of the present invention.
Figure 10I:
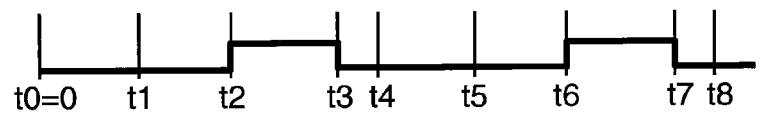
FIG. 10I is a voltage waveform chart in each unit of the liquid level sensor according to Embodiment 2 of the present invention.

In FIGS. 10H and 10I, output signals from first, second, and third comparing units 246, 247, and 248 are inputted to logic circuit 249 configured by a logic element and a flip-flop.

A signal shown in FIG. 10H is outputted to first analog switch 250. A signal shown in FIG. 10I is outputted to second analog switch 251.

When a signal inputted to first analog switch 250 is at high, second analog switch 251 is "closed". When a signal inputted to first analog switch 250 is at low, second analog switch 251 is "opened".

When a signal inputted to second analog switch 251 is at high, second analog switch 251 is "closed". When a signal inputted to second analog switch 251 is at low, second analog switch 251 is "opened".

In this manner, for times t1 to t2 and times t5 to t6, first analog switch 250 is "closed", and second analog switch 251 is "opened". Therefore, capacitor 256 is charged from second potential 253 through fourth resistor 254. For times t2 to t3 and times t6 to t7, first analog switch 250 is "opened", and second analog switch 251 is "closed". Therefore, an electric charge accumulated in capacitor 256 is discharged to first potential 252 ($V_1$) through fourth resistor 253.

For times t0 to t1, times t3 to t5, and the like, both first analog switch 250 and second analog switch 251 are "opened". Therefore an electric charge accumulated in capacitor 256 is stored.

In this manner, first analog switch 250 and second analog switch 251 are alternately opened and closed for a time determined by a length of a part of second detecting electrode 223 dipped in the liquid to be measured and a length of a part being out of the liquid to be measured to charge and discharge capacitor 256, so that a level of the liquid to be measured can be outputted to output terminal 255 as an analog voltage.

The above circuit operations will be further described by using numerical expressions. An electrostatic capacitance per unit length obtained when first, second, third detecting electrodes 222, 223, and 224 are out of a liquid to be measured is represented by $C_0$, resistances of first resistor 236 and third resistor 243 are represented by $r_1$, a resistance of second resistor 242 is represented by $r_2$, lengths of first detecting electrode 222 and third detecting electrode 224 are represented by A, a length of second detecting electrode 223 is represented by B, and a relative dielectric constant of the liquid to be measured is represented by $\varepsilon_r$. A length of second detecting electrode 223 dipped in the liquid to be measured is represented by $\alpha B$, and a length of second detecting electrode 223 being out of the liquid to be measured is represented by $(1-\alpha)B$.

Note that $\alpha$ is an arbitrary positive number in the range of 0 to 1. First potential 252 ($V_1$) is represented by 0 [V], and second potential 253 ($V_2$) is represented by $V_{dd}$ [V]. At this time, the time constant determined by first detecting electrode 222 and first resistor 236 is expressed by Equation 16.

[Numerical Expression 16]

$$C_0 A r_1 \varepsilon_r^{25} \qquad \text{Equation 16}$$

A time constant determined by second detecting electrode 223 and resistor 242 is expressed by Equation 17.

[Numerical Expression 17]

$$C_0 B r_2 [\alpha \varepsilon_r + (1-\alpha)] \qquad \text{Equation 17}$$

A time constant determined by third detecting electrode 224 and resistor 243 is expressed by Equation 18.

[Numerical Expression 18]

$$C_0 A r_1 \qquad \text{Equation 18}$$

In this case, as described above, in a state in which all first, second, and third detecting electrodes 222, 223, and 224 are out of the liquid to be measured, the time constant determined by an inter-electrode capacitance of first detecting electrodes 222 and resistor 236, the time constant determined by an inter-electrode capacitance of second detecting electrodes 223 and resistor 242, and the time constant determined by an inter-electrode capacitance of third detecting electrodes 224 and resistor 243 are set to be substantially equal to one another. Therefore, $$C_0 A r_1 = C_0 B r_2$$

is given. This value is newly defined as D.

When the power supply is turned on, third node potential $V_{n3}$ between resistor 243 and third detecting electrode 224 is expressed by Equation 19.

[Numerical Expression 19]

$$V_{n3} = V_{dd}\left(1 - e^{-\frac{t}{D}}\right) \qquad \text{Equation 19}$$

According to this equation, t1 is expressed by Equation 20.

[Numerical Expression 20]

$$t1 = -D\ln\left(1 - \frac{V_{th}}{V_{dd}}\right) \qquad \text{Equation 20}$$

Similarly, second node potential $V_{n2}$ between resistor 242 and second detecting electrode 223 is expressed by Equation 21.

[Numerical Expression 21]

$$V_{n2} = V_{dd}\left(1 - e^{-\frac{t}{D(\alpha \varepsilon_r + 1 - \alpha_r)}}\right) \qquad \text{Equation 21}$$

According to the equation, t2 is expressed by Equation 22.

[Numerical Expression 22]

$$t2 = -D(\alpha \varepsilon_r + 1 - \alpha)\ln\left(1 - \frac{V_{th}}{V_{dd}}\right) \qquad \text{Equation 22}$$

In this manner, time $T_c$ for which capacitor 256 is charged is expressed by Equation 23.

[Numerical Expression 23]

$$T_c = t2 - t1 = -D\alpha(\varepsilon_r - 1)\ln\left(1 - \frac{V_{th}}{V_{dd}}\right) \qquad \text{Equation 23}$$

By the same manner as described above, time $T_d$ for which capacitor 256 is discharged is expressed by Equation 24.

[Numerical Expression 24]

$$T_d = t3 - t2 = -D(1-\alpha)(\varepsilon_r - 1)\ln\left(1 - \frac{V_{th}}{V_{dd}}\right) \qquad \text{Equation 24}$$

According to Equation 23 and Equation 24 described above, it is found that charging time $T_c$ is in proportion to length αB of a part of second detecting electrode 223 dipped in a liquid to be measured and that discharging time $T_d$ is determined by a length of a part of second detecting electrode 223 being out of the liquid to be measured. Furthermore, it is understood that, even though dielectric constant $\in_r$ of the liquid to be measured is changed by a change in temperature, deterioration and denaturation of the liquid to be measured, and the like, or even though $C_0$, i.e., D is changed by a change in vapor pressure of the liquid to be measured with a change in temperature or the like, although $T_c$ and $T_d$ change, a ratio of $T_c$ to $T_d$ does not change.

Output voltage $V_O$ generated at output terminal 255 is expressed by a numerical expression. In the circuit shown in FIG. 9, as described in FIGS. 10A to 10I, for the periods of t0 to t1, t3 to t6, and the like, both first and second analog switches 250 and 251 are "opened". Therefore, an electric charge accumulated in capacitor 256 does not change, and output voltage $V_O$ does not also change.

Therefore, in the following description, these periods are ignored, and a change in output voltage when charging time $T_c$ and discharging time $T_d$ are repeated will be considered. An output voltage obtained immediately after the power supply is turned on is set to 0 [V]. When a resistance of fourth resistor 254 is represented by R and when a capacitance of capacitor 256 is represented by C, output voltage $V_{1c}$ obtained after the first charge is expressed by Equation 25.

[Numerical Expression 25]

$$V_{1c} = V_{dd}\left(1 - e^{-\frac{T_c}{CR}}\right) \qquad \text{Equation 25}$$

Output voltage $V_{1d}$ obtained after the first discharge is expressed by Equation 26.

[Numerical Expression 26]

$$V_{1d} = V_{1c} e^{-\frac{T_d}{CR}} \qquad \text{Equation 26}$$

Output voltage $V_{2c}$ obtained after the second charge is expressed by Equation 27.

[Numerical Expression 27]

$$V_{2c} = V_{1d} + (V_{dd} - V_{1d})\left(1 - e^{-\frac{T_c}{CR}}\right) \qquad \text{Equation 27}$$

Output voltage $V_{2d}$ obtained after the second discharge is expressed by Equation 28.

[Numerical Expression 28]

$$V_{2d} = V_{2c} e^{-\frac{T_d}{CR}} \qquad \text{Equation 28}$$

Output voltage $V_{3c}$ obtained after the third charge and output voltage $V_{3d}$ obtained after discharge are expressed by Equation 29 and Equation 30, respectively.

[Numerical Expression 29]

$$V_{3c} = V_{2d} + (V_{dd} - V_{2d})\left(1 - e^{-\frac{T_c}{CR}}\right) \qquad \text{Equation 29}$$

[Numerical Expression 30]

$$V_{3d} = V_{3c} e^{-\frac{T_d}{CR}} \qquad \text{Equation 30}$$

By the same manner as described above, output voltages obtained after charge and discharge can be calculated. FIGS. 11 to 14 are obtained by calculating output voltage $V_O$ when resistance R of fourth resistor 254 and capacitance C of capacitor 256 are set to 500 kΩ and 100 pF, respectively.

Figure 11:
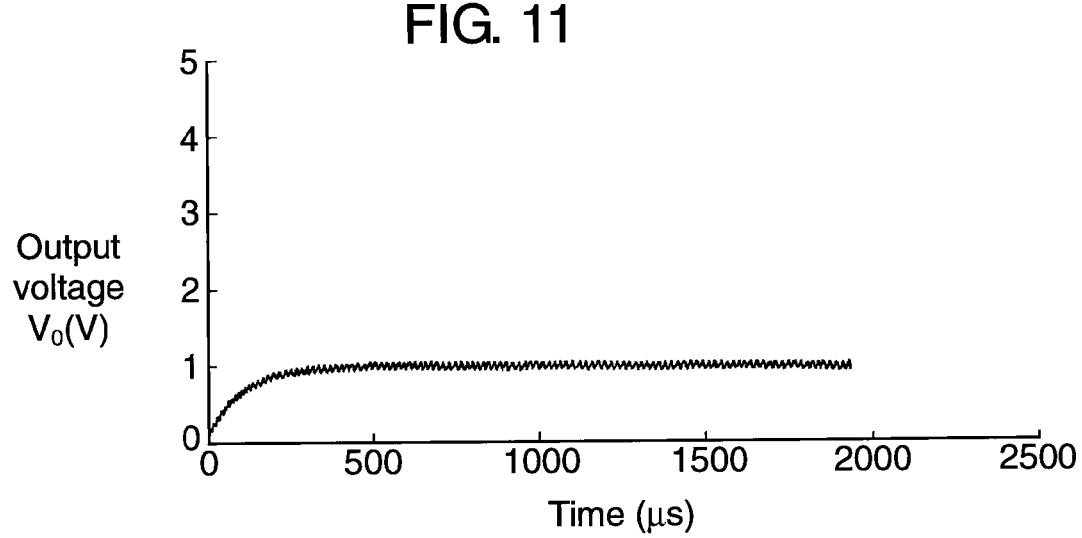
FIG. 11 is a characteristic graph showing a change of output voltage with time when a ratio of a length of a part of a second detecting electrode dipped in a liquid to be measured to a length of a part being out of the liquid to be measured is 1:4 in the liquid level sensor according to Embodiment 2 of the present invention.

FIG. 11 is a characteristic graph showing a change of output voltage $V_O$ with time when a ratio of a length of a part of the second detecting electrode dipped in the liquid to be measured to a length of a part being out of the liquid to be measured is 1:4 in the liquid level sensor according to Embodiment 2 of the present invention. FIG. 11 shows a change of output voltage $V_O$ with time when charging time $T_c$ and discharging time $T_d$ are set to 1 μsec and 4 μsec, respectively, more specifically, a ratio of $T_c$ to $T_d$, i.e., a ratio of a length of a part of second detecting electrode 223 dipped in the liquid to be measured to a length of a part being out of the liquid to be measured is 1:4. It is understood that output voltage $V_O$ made by superposing a ripple having an amplitude of about ±0.04 [V] on a DC component of 1 [V] is obtained after about 500 μsec have elapsed. This ripple can be removed by using an appropriate low-pass filter.

Figure 12:
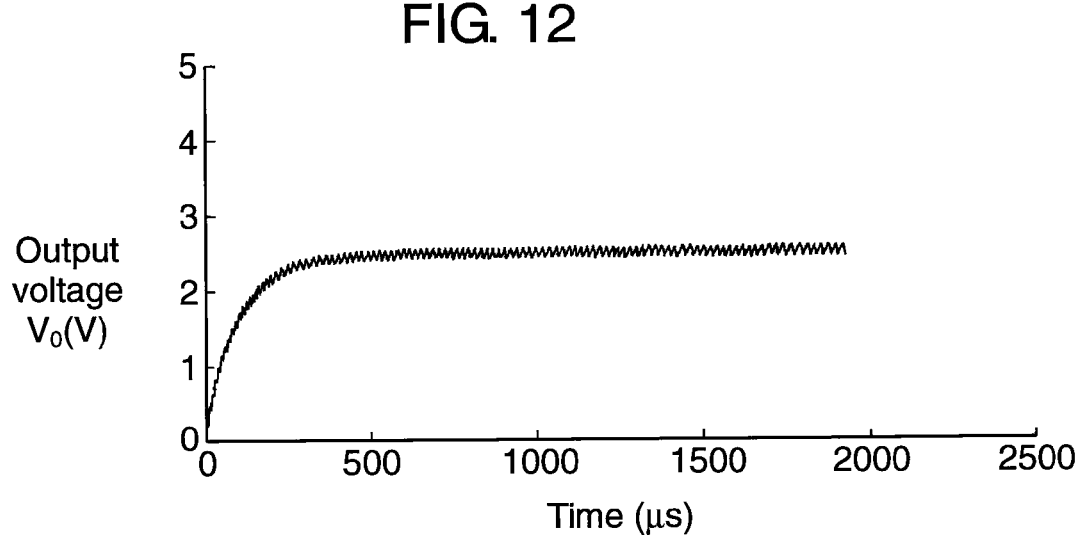
FIG. 12 is a characteristic graph showing a change of output voltage with time when a ratio of a length of a part of the second detecting electrode dipped in a liquid to be measured to a length of a part being out of the liquid to be measured is 1:1 in the liquid level sensor according to Embodiment 2 of the present invention.

FIG. 12 is a characteristic graph showing a change of output voltage $V_O$ with time when a ratio of a length of a part of the second detecting electrode dipped in a liquid to be measured to a length of a part being out of the liquid to be measured is 1:1 in the liquid level sensor according to Embodiment 2 of the present invention. FIG. 12 shows a change of output voltage $V_O$ with time when charging time $T_c$ and discharging time $T_d$ are set to 2.5 μsec and 2.5 μsec, respectively, more specifically, a ratio of $T_c$ to $T_d$, i.e., a ratio of a length of a part of second detecting electrode 223 dipped in the liquid to be measured to a length of a part being out of the liquid to be measured is 1:1. Output voltage $V_O$ made by superposing a ripple having an amplitude of about ±0.06 [V] on a DC component of 2.5 [V] is obtained after about 500 μsec have elapsed.

Figure 13:
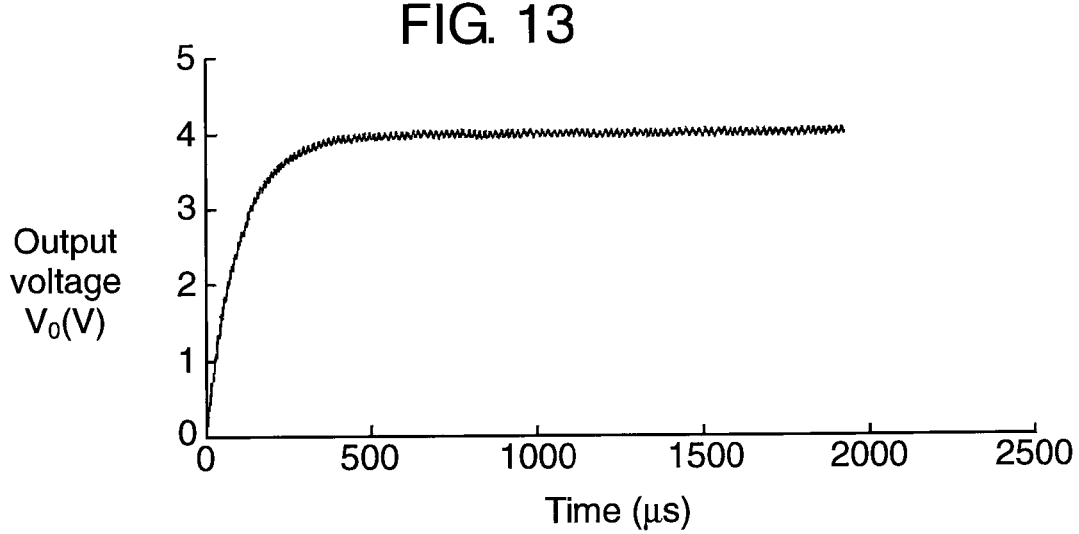
FIG. 13 is a characteristic graph showing a change of output voltage with time when a ratio of a length of a part of the second detecting electrode dipped in a liquid to be measured to a length of a part being out of the liquid to be measured is 4:1 in the liquid level sensor according to Embodiment 2 of the present invention.

FIG. 13 is a characteristic graph showing a change of output voltage $V_O$ with time when a ratio of a length of a part of the second detecting electrode dipped in a liquid to be measured to a length of a part being out of the liquid to be measured is 4:1 in the liquid level sensor according to Embodiment 2 of the present invention. FIG. 13 shows a change of output voltage $V_O$ with time when charging time $T_c$ and discharging time $T_d$ are set to 4 μsec and 1 sec, respectively, more specifically, a ratio of $T_c$ to $T_d$, i.e., a ratio of a length of a part of second detecting electrode 223 dipped in the liquid to be measured to a length of a part being out of the liquid to be measured is 4:1. Output voltage $V_O$ made by superposing a ripple having an amplitude of about ±0.04 [V] on a DC component of 4 [V] is obtained after about 500 μsec have elapsed.

In this manner, output voltage $V_O$ which is in proportion to the ratio of the length of the part of second detecting electrode 223 dipped in the liquid to be measured to the length of the part being out of the liquid to be measured is generated at output terminal 255.

Figure 14:
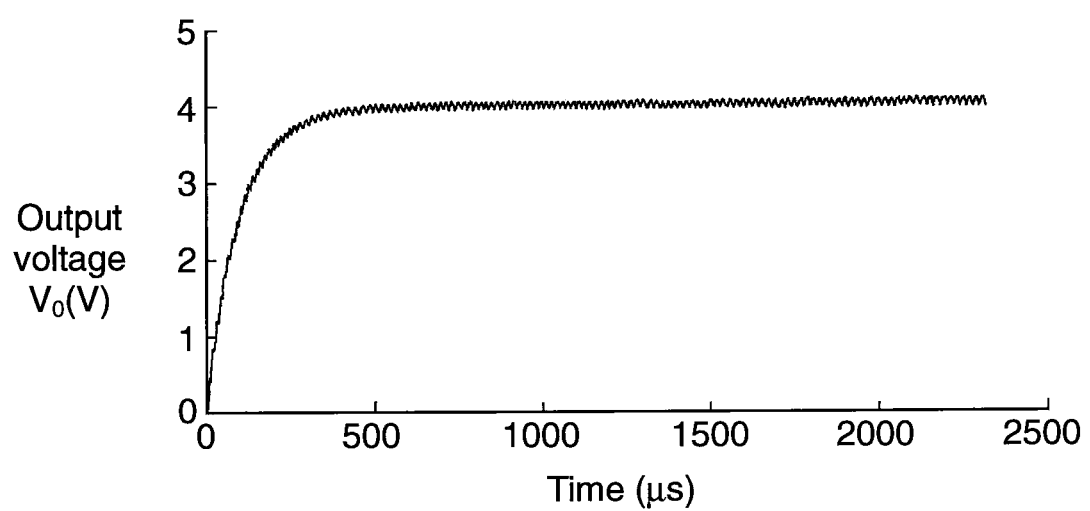
FIG. 14 is a characteristic graph showing a change of output voltage with time when a ratio of a length of a part of the second detecting electrode dipped in a liquid to be measured to a length of a part being out of the liquid to be measured is 1:4 in the liquid level sensor according to Embodiment 2 of the present invention and when a charging time and a discharging time are elongated by 20%.

FIG. 14 is a characteristic graph showing a change of output voltage $V_O$ with time when a ratio of a length of a part of the second detecting electrode dipped in a liquid to be measured to a length of a part being out of the liquid to be measured is 1:4 in the liquid level sensor according to Embodiment 2 of the present invention and when a charging time and a discharging time are elongated by 20%. FIG. 14 shows a change of output voltage $V_O$ with time when charging time $T_c$ and discharging time $T_d$ are set to 4.8 μsec and 1.2 μsec, respectively, i.e., $T_c$ and $T_d$ are each longer than those in FIG. 13 by 20%. Output voltage $V_O$ made by superposing a ripple having an amplitude of about ±0.05 [V] on a DC component of 4 [V] is obtained after about 500 μsec have elapsed.

More specifically, even though dielectric constant $\in_r$ of the liquid to be measured is changed by a change in temperature, deterioration and denaturation of the liquid to be measured, and the like, or even though $C_0$, i.e., D is changed by a change in vapor pressure of the liquid to be measured with a change in temperature or the like to change $T_c$ and $T_d$, if the ratio of $T_c$ to $T_d$, i.e., the ratio of the length of the part of second detecting electrode 223 is dipped in the liquid to be measured to the length of the part being out of the liquid to be measured is constant, a DC component of output voltage $V_O$ does not change.

Embodiment 3

A liquid level sensor according to Embodiment 3 of the present invention will be described below.

Figure 15:
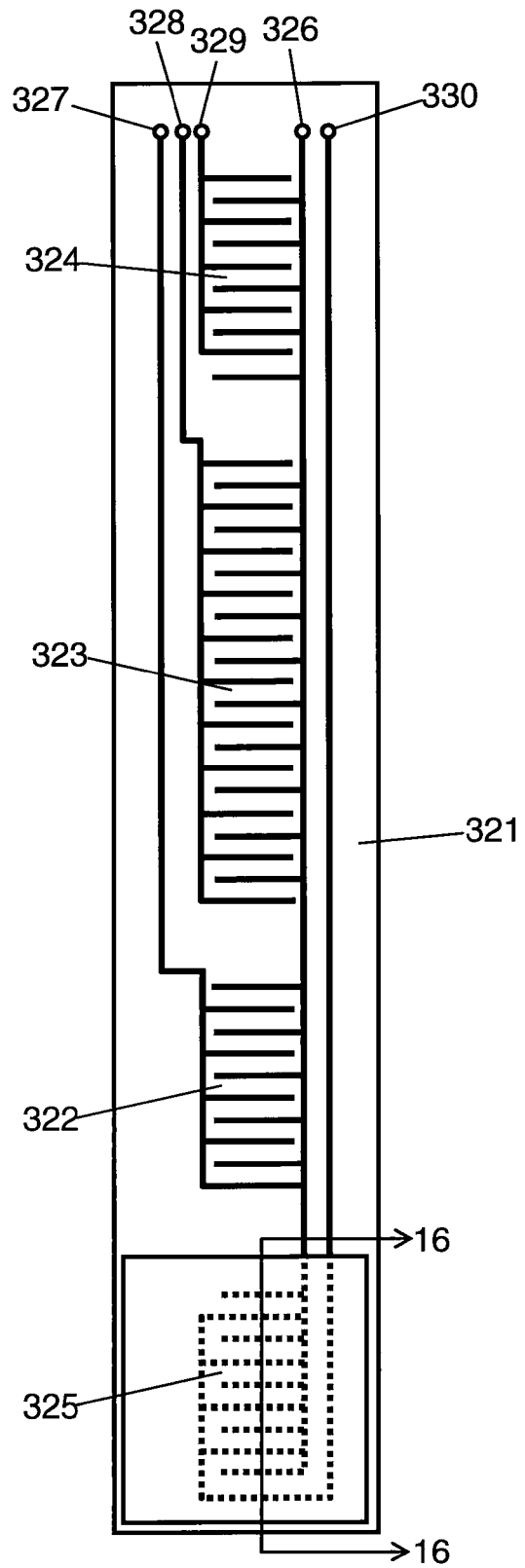
FIG. 15 is a front view of a detecting unit in a liquid level sensor according to Embodiment 3 of the present invention.

FIG. 15 is a front view of a detecting unit in the liquid level sensor according to Embodiment 3 of the present invention. In FIG. 15, a pair of first comb-shaped detecting electrodes 322 made of carbon are arranged on a lower portion of vertically extending rectangular detecting unit 321 made of a polyimide film or the like. Above first detecting electrodes 322, a pair of second comb-shaped detecting electrodes 323 made of carbon are arranged. Above second detecting electrodes 323, similarly a pair of third comb-shaped detecting electrodes 324 made of carbon are similarly arranged. Further, a pair of fourth comb-shaped detecting electrodes 325 made of carbon are similarly arranged on a lower end portion of detecting unit 321. First, second, third, and fourth detecting electrodes 322, 323, 324, and 325 are connected to terminals 326, 327, 328, 329, and 330 with vertically extending extraction lines.

Figure 16:
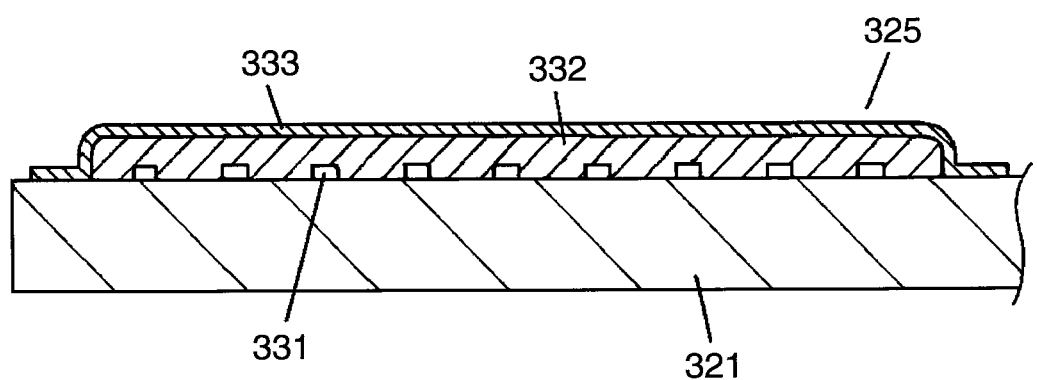
FIG. 16 is a sectional view of fourth detecting electrodes in FIG. 15.

FIG. 16 is a sectional view of fourth detecting electrodes 325 taken along line 16-16 in FIG. 15. In FIG. 16, fourth detecting electrode 325 is configured by covering an entire area of opposite electrodes 331 with metal layer 333 through insulator 332.

With this configuration, since electric flux lines generated between opposite electrodes 331 do not pass through an liquid to be measured, an electrostatic capacitance between the electrodes 331 measured by first detecting electrode 322 is not influenced by a level of the liquid to be measured and a dielectric constant held by the liquid to be measured.

Figure 17:
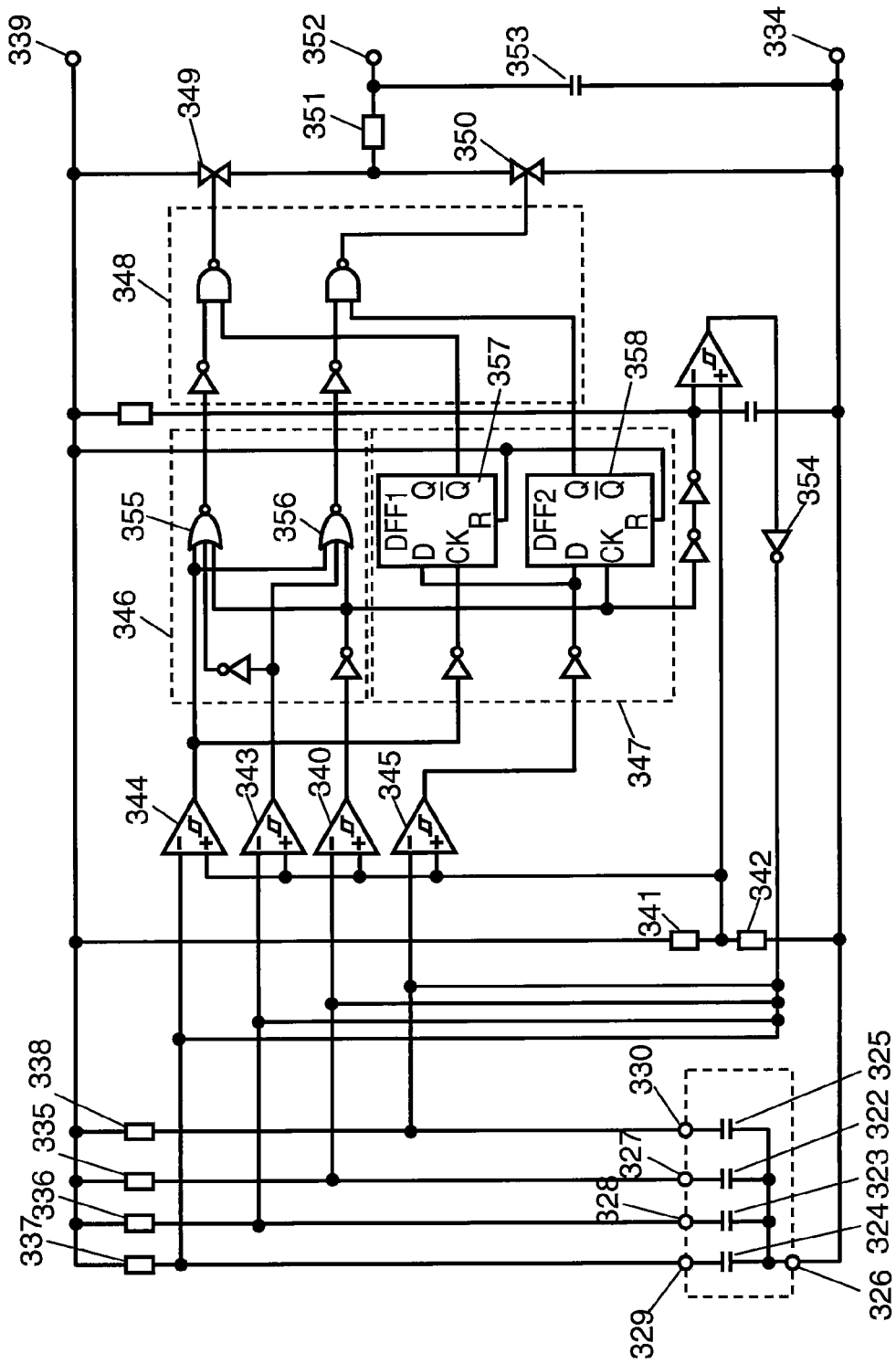
FIG. 17 is a detecting circuit diagram of a liquid level sensor according to Embodiment 3 of the present invention.

FIG. 17 is a detecting circuit diagram of the liquid level sensor according to Embodiment 3 of the present invention. In FIG. 17, terminal 326 of detecting unit 321 is connected to, for example, first potential 334 configured by a GND potential. Terminals 327, 328, 329, and 330 of detecting unit 321 are connected to, for example, second potential 339 configured by a 5-V power supply potential through first resistor 335, second resistor 336, third resistor 337, and fourth resistor 338, respectively. In this manner, first detecting electrode 322, second detecting electrode 323, third detecting electrode 324, and fourth detecting electrode 325 are connected to first resistor 335, second resistor 336, third resistor 337, and fourth resistor 338, respectively.

At this time, in a state in which all first, second, and third detecting electrodes 322, 323, and 324 are out of the liquid to be measured, a time constant determined by an inter-electrode capacitance of first detecting electrodes 322 and first resistor 335, a time constant determined by an inter-electrode capacitance of second detecting electrodes 323 and second resistor 336, and a time constant determined by an inter-electrode capacitance of third detecting electrodes 324 and third resistor 337 are set to be substantially equal to one another. A time constant determined by an inter-electrode capacitance of fourth detecting electrodes 325 and fourth resistor 338 is set to be smaller than the time constant determined by the inter-electrode capacitance of first detecting electrodes 322 and first resistor 335 in a state in which first detecting electrodes 322 are dipped in the liquid to be measured and to be larger than the time constant determined by the inter-electrode capacitance of third detecting electrodes 324 and third resistor 337 in a state in which third detecting electrodes 324 are out of the liquid to be measured.

A first midpoint potential between first resistor 335 and first detecting electrode 322 is compared with a threshold value determined by resistors 341 and 342 in first comparing unit 340 configured by a comparator. Similarly, a second midpoint potential between second resistor 336 and second detecting electrode 323, a third midpoint potential between third resistor 337 and third detecting electrode 324, and a fourth midpoint potential between fourth resistor 338 and fourth detecting electrode 325 are compared with a threshold value determined by resistors 341 and 342 in second comparing unit 343, third comparing unit 344, and fourth comparing unit 345 which are configured by comparators, respectively.

Output signals from first, second, third comparing units 340, 343, and 344 are inputted to first logic circuit 346 configured by a logic element. Furthermore, output signals from first, third, and fourth comparing units 340, 344, and 345 are inputted to second logic circuit 347 configured by a logic element and a D flip-flop. Output signals from first logic circuit 346 and second logic circuit 347 are inputted to third logic circuit 348 configured by a logic element.

First analog switch 349 and second analog switch 350 which are open/close-controlled by an output signal from third logic circuit 348 are arranged on the subsequent stage of third logic circuit 348. Fifth resistor 351 has one end connected to a midpoint between first analog switch 349 and second analog switch 350, and the other end connected to output terminal 352. Capacitor 353 has one end connected to first potential 334, and the other end connected between fifth resistor 351 and output terminal 352.

A circuit operation of a liquid level sensor according to an embodiment of the present invention will be described below.

FIGS. 18A to 18J are voltage waveform charts of each unit of the liquid level sensor according to Embodiment 3 of the present invention. Detecting unit 321 of the liquid level sensor shown in FIG. 15 is dipped in a liquid to be measured such as an engine oil in an oil pan (not shown). At this time, first detecting electrodes 322 and fourth detecting electrodes 325 are always dipped in the liquid to be measured, third detecting electrodes 324 are always arranged out of the liquid to be measured, second detecting electrodes 323 cross to a level of the liquid to be measured, and a part of second detecting electrodes 323 dipped in the liquid increases or decreases with rising or falling of the liquid level.

In an initial state (t0) before the power supply is turned on, electric charges are not present between the electrode pairs of first, second, third, and fourth detecting electrodes 322, 323, 324, and 325. Therefore, all the first midpoint potential between first resistor 335 and first detecting electrode 322, the second midpoint potential between second resistor 336 and second detecting electrode 323, the third midpoint potential between third resistor 337 and third detecting electrode 324, and the fourth midpoint potential between fourth resistor 338 and fourth detecting electrode 325 are equal to first potential 334.

When the power supply is turned on, the third midpoint potential between third resistor 337 and third detecting electrode 324 exponentially increases from first potential 334 to second potential 339 at the time constant determined by third resistor 337 and the inter-electrode capacitance of third detecting electrodes 324. The second midpoint potential between second resistor 336 and second detecting electrode 323 exponentially increases from first potential 334 to second potential 339 at the time constant determined by second resistor 336 and an inter-electrode capacitance of second detecting electrodes 323. At this time, since the part of second detecting electrode 323 is in the liquid to be measured, the time constant determined by the second resistor 336 and the electrostatic capacitance of second detecting electrodes 323 is larger than the time constant determined by third resistor 337 and third detecting electrode 324. The first midpoint potential between first resistor 335 and first detecting electrodes 322 exponentially increases from first potential 334 to second potential 339 at the time constant determined by first resistor 335 and an inter-electrode capacitance of first detecting electrodes 322. At this time, first detecting electrode 322 is always dipped in the liquid to be measured. Therefore, the time constant determined by first resistor 335 and the electrostatic capacitance of first detecting electrodes 322 is larger than the time constant determined by second resistor 336 and second detecting electrode 323. Furthermore, the fourth midpoint potential between fourth resistor 338 and fourth detecting electrode 325 exponentially increases from first potential 334 to second potential 339 at the time constant determined by fourth resistor 338 and the inter-electrode capacitance of fourth detecting electrodes 325. At this time, the time constant determined by the inter-electrode capacitance of fourth detecting electrodes 325 and fourth resistor 338 is set to be smaller than the time constant determined by the inter-electrode capacitance of first detecting electrodes 322 and first resistor 335 in the state in which first detecting electrodes 322 are dipped in the liquid to be measured and to be larger than the time constant determined by the inter-electrode capacitance of third detecting electrodes 324 and third resistor 337 in the state in which third detecting electrodes 324 are out of the liquid to be measured.

In FIG. 18A, the third midpoint potential between third resistor 337 and third detecting electrode 324 reaches threshold voltage $V_{th}$ determined by resistors 341 and 342. At this time, an output from third comparing unit 344 configured by a comparator shifts from high to low (t1).

In FIG. 18B, the second midpoint potential between second resistor 336 and second detecting electrode 323 reaches threshold voltage $V_{th}$ determined by resistors 341 and 342. At this time, an output from second comparing unit 343 configured by a comparator shifts from high to low (t3).

In FIG. 18D, the fourth midpoint potential between fourth resistor 338 and fourth detecting electrode 325 reaches threshold voltage $V_{th}$ determined by resistors 341 and 342. At this time, an output from fourth comparing unit 345 configured by a comparator shifts from high to low (t2).

In FIG. 18C, the first midpoint potential between first resistor 335 and first detecting electrode 322 reaches threshold voltage $V_{th}$ determined by resistors 341 and 342. At this time, an output from first comparing unit 340 configured by a comparator shifts from high to low (t4). Since electric charges accumulated in first, second, third, and fourth detecting electrodes 322, 323, 324, and 325 are discharged to first potential 334 through element 354 having an open-collector configuration, all the first midpoint potential between first resistor 335 and first detecting electrode 322, the second midpoint potential between second resistor 336 and second detecting electrode 323, the third midpoint potential between third resistor 337 and third detecting electrode 324, and the fourth midpoint potential between fourth resistor 338 and fourth detecting electrode 325 return to first potential 334. At the same time, each of outputs from first, second, third, and fourth comparing units 340, 343, 344, and 345 shifts from low to high (t5).

Thereafter, the third midpoint potential between third resistor 337 and third detecting electrode 324, the second midpoint potential between second resistor 336 and second detecting electrode 323, the first midpoint potential between first resistor 335 and first detecting electrode 322, and the fourth midpoint potential between fourth resistor 338 and fourth detecting electrode 325 exponentially increase again from first potential 334 to second potential 339 at the time constants determined by third resistor 337 and the inter-electrode capacitance of third detecting electrodes 324, second resistor 336 and the inter-electrode capacitance of second detecting electrodes 323, first resistor 335 and the inter-electrode capacitance of first detecting electrodes 322, and fourth resistor 338 and the inter-electrode capacitance of fourth detecting electrodes 325.

Subsequently, an output from third comparing unit 344 shifts from high to low (t6), an output from second comparing unit 343 shifts from high to low (t8), an output from fourth comparing unit 345 shifts from high to low (t7), and an output from first comparing unit 340 shifts from high to low (t9), and the same operations as described above are repeated.

In FIGS. 18E and 18F, output signals from first, second, and third comparing units 340, 343, and 344 are inputted to first logic circuit 346 configured by a logic element. A signal shown in FIG. 18E is outputted to an output of first NOR element 355 in first logic circuit 346. A signal shown in FIG. 18F is outputted to an output of second NOR element 356.

In FIGS. 18G and 18H, output signals from first, third, and fourth comparing units 340, 344, and 345 are inputted to second logic circuit 347 configured by a logic element and a D flip-flop. An always-high signal is outputted to a Q negative output of first D flip-flop 357 in second logic circuit 347 as shown in FIG. 18G. An always-high signal is outputted to a Q output of second flip-flop 358 as shown in FIG. 18H.

In FIGS. 18I and 18J, an output signal from first logic circuit 346 and an output signal from second logic circuit 347 are inputted to third logic circuit 348. A signal shown in FIG. 18I is outputted to first analog switch 349. A signal shown in FIG. 18J is outputted to second analog switch 350.

In this case, when a signal inputted to first analog switch 349 is at high, first analog switch 349 is "closed". When the signal inputted to first analog switch 349 is at low, first analog switch 349 is "opened". When a signal inputted to second analog switch 350 is at high, second analog switch 350 is "closed". When the signal inputted to second analog switch 350 is at low, second analog switch 350 is "opened".

In this manner, for times t1 to t3 and times t6 to t8, i.e., for a period from when an output from third comparing unit 344 shifts to low to when an output from second comparing unit 343 shifts to low, first analog switch 349 is "closed", and second analog switch 350 is "opened". Therefore, capacitor 353 is charged from second potential 339 through fifth resistor 351. For times t3 to t4 and times t8 to t9, i.e., in a period from when an output from second comparing unit 343 shifts to low to when an output from first comparing unit 340 shifts to low, first analog switch 349 is "opened", and second analog switch 350 is "closed". Therefore, an electric charge accumulated in capacitor 353 is discharged to first potential 334 through fifth resistor 351.

For the other times, both first analog switch 349 and second analog switch 350 are "opened". Therefore, an electric charge accumulated in capacitor 353 is stored.

In this manner, for first analog switch 349 and second analog switch 350 are alternately opened and closed for a time determined by a length of a part of second detecting electrode 323 dipped in a liquid to be measured and a length of a part being out of the liquid to be measured to charge and discharge capacitor 353, so that a level of the liquid to be measured can be outputted to output terminal 352 as an analog voltage.

FIGS. 19A to 19J are voltage waveform charts of each unit of the liquid level sensor when a liquid level of a liquid to be measured exceeds an upper end of second detecting electrode 323 and rises to a center of third detecting electrode 324 in the liquid level sensor according to Embodiment 3 of the present invention.

In an initial state (t0) before power supply is turned on, electric charges are not present between the electrode pairs of first, second, third, and fourth detecting electrodes 322, 323, 324, and 325. Therefore, all the first midpoint potential between first resistor 335 and first detecting electrode 322, the second midpoint potential between second resistor 336 and second detecting electrode 323, the third midpoint potential between third resistor 337 and third detecting electrode 324, and a fourth midpoint potential between fourth resistor 338 and fourth detecting electrode 325 are equal to first potential 334.

When the power supply is turned on, the third midpoint potential between third resistor 337 and third detecting electrode 324 exponentially increases from first potential 334 to second potential 339 at the time constant determined by third resistor 337 and the inter-electrode capacitance of third detecting electrodes 324. The second midpoint potential between second resistor 336 and second detecting electrode 323 exponentially increases from first potential 334 to second potential 339 at the time constant determined by second resistor 336 and the inter-electrode capacitance of second detecting electrodes 323. The first midpoint potential between first resistor 335 and first detecting electrode 322 exponentially increases from first potential 334 to second potential 339 at the time constant determined by first resistor 335 and the inter-electrode capacitance of first detecting electrodes 322.

At this time, although only the part of third detecting electrode 324 is in the liquid to be measured, second detecting electrode 323 and first detecting electrode 322 are dipped in the liquid to be measured. Therefore, the time constant determined by third resistor 337 and the electrostatic capacitance of third detecting electrodes 324 is smaller than the time constant determined by second resistor 336 and second detecting electrode 323 and the time constant determined by first resistor 335 and first detecting electrode 322.

Figure 19A:
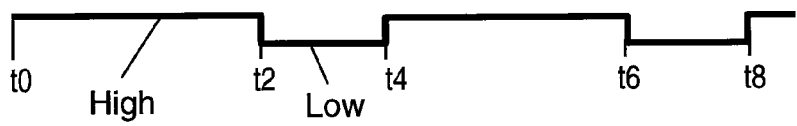
FIG. 19A is a voltage waveform chart of each unit of the liquid level sensor when a liquid level of a liquid to be measured exceeds an upper end of a second detecting electrode and rises to a center of a third detecting electrode in the liquid level sensor according to Embodiment 3 of the present invention.

In FIG. 19A, the third midpoint potential between third resistor 337 and third detecting electrode 324 reaches threshold voltage $V_{th}$ determined by resistors 341 and 342. At this time, an output from third comparing unit 344 configured by a comparator shifts from high to low (t2).

Figure 19B:
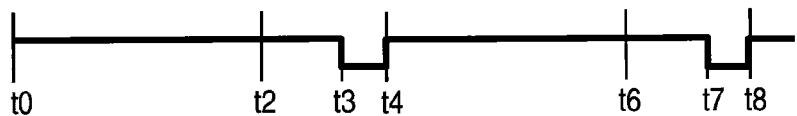
FIG. 19B is a voltage waveform chart of each unit of the liquid level sensor when the liquid level of the liquid to be measured exceeds the upper end of the second detecting electrode and rises to the center of the third detecting electrode in the liquid level sensor according to Embodiment 3 of the present invention.

In FIG. 19B, the second midpoint potential between second resistor 336 and second detecting electrode 323 reaches threshold voltage $V_{th}$ determined by resistors 341 and 342. At this time, an output from second comparing unit 343 configured by a comparator shifts from high to low (t3).

Figure 19C:
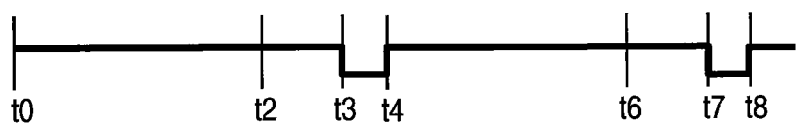
FIG. 19C is a voltage waveform chart of each unit of the liquid level sensor when the liquid level of the liquid to be measured exceeds the upper end of the second detecting electrode and rises to the center of the third detecting electrode in the liquid level sensor according to Embodiment 3 of the present invention.
Figure 19D:
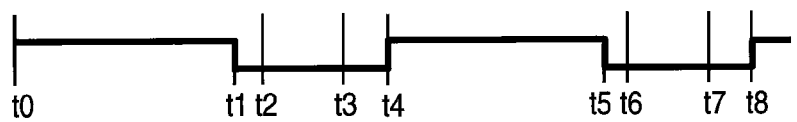
FIG. 19D is a voltage waveform chart of each unit of the liquid level sensor when the liquid level of the liquid to be measured exceeds the upper end of the second detecting electrode and rises to the center of the third detecting electrode in the liquid level sensor according to Embodiment 3 of the present invention.

In FIG. 19D, the fourth midpoint potential between fourth resistor 338 and fourth detecting electrode 325 reaches threshold voltage $V_{th}$ determined by resistors 341 and 342. At this time, an output from fourth comparing unit 345 configured by a comparator shifts from high to low (t1).

In FIG. 19C, the first midpoint potential between first resistor 335 and first detecting electrode 322 reaches threshold voltage $V_{th}$ determined by resistors 341 and 342. At this time, an output from first comparing unit 340 configured by a comparator shifts from high to low (t3).

Electric charges accumulated in first, second, third, and fourth detecting electrodes 322, 323, 324, and 325 are discharged to first potential 334 through element 354 having an open-collector configuration. For this reason, all the first midpoint potential between first resistor 335 and first detecting electrode 322, the second midpoint potential between second resistor 336 and second detecting electrode 323, the third midpoint potential between third resistor 337 and third detecting electrode 324, and the fourth midpoint potential between fourth resistor 338 and fourth detecting electrode 325 return to first potential 334. At the same time, each of outputs from first, second, third, and fourth comparing units 340, 343, 344, and 345 shifts from low to high (t4) as shown in FIGS. 19C, 19B, 19A, and 19D.

Subsequently, the same operations as described above are repeated (t5 to t9).

Figure 19E:
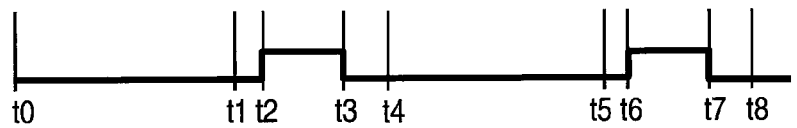
FIG. 19E is a voltage waveform chart of each unit of the liquid level sensor when the liquid level of the liquid to be measured exceeds the upper end of the second detecting electrode and rises to the center of the third detecting electrode in the liquid level sensor according to Embodiment 3 of the present invention.
Figure 19F:
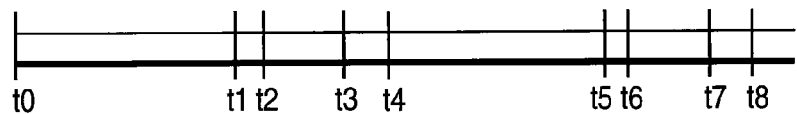
FIG. 19F is a voltage waveform chart of each unit of the liquid level sensor when the liquid level of the liquid to be measured exceeds the upper end of the second detecting electrode and rises to the center of the third detecting electrode in the liquid level sensor according to Embodiment 3 of the present invention.

In FIGS. 19E and 19F, output signals from first, second, and third comparing units 340, 343, and 344 are inputted to first logic circuit 346 configured by a logic element. A signal shown in FIG. 19E is outputted to an output of first NOR element 355 in first logic circuit 346. A signal shown in FIG. 19F is outputted to an output of second NOR element 356. Output signals from first, third, and fourth comparing units 340, 344, and 345 are inputted to second logic circuit 347 configured by a logic element and a D flip-flop. Furthermore, outputs from first logic circuit 346 and second logic circuit 347 are inputted to third logic circuit 348 configured by a logic element.

At this time, when time t2 at which the output from third comparing unit 344 shifts from high to low is before time t1 at which the output from fourth comparing unit 345 shifts from high to low, i.e., when the length of the part of third detecting electrodes 324 clipped in the liquid to be measured is short, a Q negative output from first D flip-flop 357 in second logic circuit 347 and a Q output from second flip-flop 358 are always at high as in FIGS. 18G and 18H.

In this manner, a signal in FIG. 19E is directly given to first analog switch 349, and a signal in FIG. 19F is directly given to second analog switch 350. At this time, for only times t2 to t3 and times t6 to t7, first analog switch 349 is "closed". For this reason, capacitor 353 is charged from second potential 339 through fifth resistor 351.

Since second analog switch 350 is always "open", an electric charge charged in capacitor 353 is not discharged to capacitor 353. Therefore, an output potential from output terminal 352 is equal to second potential 339.

Figure 19G:
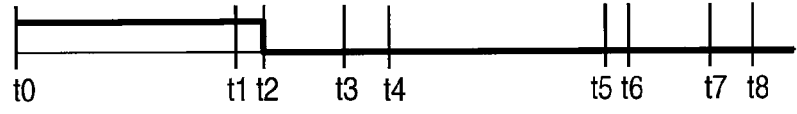
FIG. 19G is a voltage waveform chart of each unit of the liquid level sensor when the liquid level of the liquid to be measured exceeds an upper end of the second detecting electrode and rises to the center of the third detecting electrode in the liquid level sensor according to Embodiment 3 of the present invention.
Figure 19H:
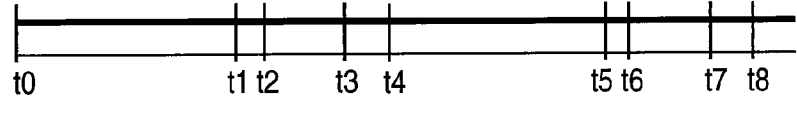
FIG. 19H is a voltage waveform chart of each unit of the liquid level sensor when the liquid level of the liquid to be measured exceeds the upper end of the second detecting electrode and rises to the center of the third detecting electrode in the liquid level sensor according to Embodiment 3 of the present invention.

As shown in FIGS. 19A and 19G, a case in which time t2 at which the output from third comparing unit 344 shifts from high to low is after time t1 at which the output from fourth comparing unit 345 shifts from high to low, i.e., the length of the part of third detecting electrode 324 dipped in the liquid to be measured becomes long will now be considered. In this case, an electrostatic capacitance measured by third detecting electrodes 324 increases. Therefore, a time constant determined by the electrostatic capacitance measured by third detecting electrodes 324 and third resistor 337 is larger than a time constant determined by an electrostatic capacitance measured by fourth detecting electrodes 325 and fourth resistor 338. In this case, as shown in FIGS. 19G and 19H, although a Q output of second flip-flop 358 in second logic circuit 347 is kept high, a Q negative output from first D flip-flop 357 shifts from high to low at t2.

Figure 19I:
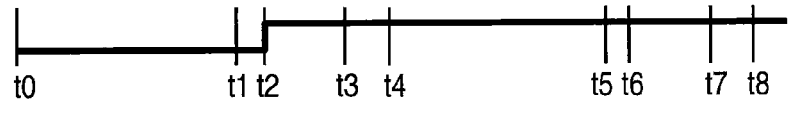
FIG. 19I is a voltage waveform chart of each unit of the liquid level sensor when the liquid level of the liquid to be measured exceeds the upper end of the second detecting electrode and rises to the center of the third detecting electrode in the liquid level sensor according to Embodiment 3 of the present invention.
Figure 19J:
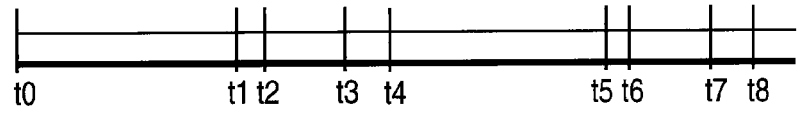
FIG. 19J is a voltage waveform chart of each unit of the liquid level sensor when the liquid level of the liquid to be measured exceeds the upper end of the second detecting electrode and rises to the center of the third detecting electrode in the liquid level sensor according to Embodiment 3 of the present invention.

A signal given from third logic circuit 348 to first analog switch 349 goes to high after t2 as shown in FIG. 19I. Therefore, first analog switch 349 is "closed", capacitor 353 is charged from second potential 339 through fifth resistor 351. A signal given from third logic circuit 348 to second analog switch 350 is kept low as shown in FIG. 19J. Therefore, second analog switch 350 is always "opened". In this manner, since an electric charge charged in capacitor 353 is not discharged, an output potential from output terminal 352 is equal to second potential 339.

FIGS. 20A to 20J are voltage waveform charts of each unit of the liquid level sensor when a liquid level of a liquid to be measured exceeds a lower end of second detecting electrode 323 and falls to a center of first detecting electrode 322 in the liquid level sensor according to Embodiment 3 of the present invention.

In an initial state (t0) before power supply is turned on, electric charges are not present between the electrode pairs of first, second, third, and fourth detecting electrodes 322, 323, 324, and 325. Therefore, all the first midpoint potential between first resistor 335 and first detecting electrode 322, the second midpoint potential between second resistor 336 and second detecting electrode 323, the third midpoint potential between third resistor 337 and third detecting electrode 324, and a fourth midpoint potential between fourth resistor 338 and fourth detecting electrode 325 are equal to first potential 334.

When the power supply is turned on, the third midpoint potential between third resistor 337 and third detecting electrode 324 exponentially increases from first potential 334 to second potential 339 at the time constant determined by third resistor 337 and the inter-electrode capacitance of third detecting electrodes 324. The second midpoint potential between second resistor 336 and second detecting electrode 323 exponentially increases from first potential 334 to second potential 339 at the time constant determined by second resistor 336 and the inter-electrode capacitance of second detecting electrodes 323. The first midpoint potential between first resistor 335 and first detecting electrode 322 exponentially increases from first potential 334 to second potential 339 at the time constant determined by first resistor 335 and the inter-electrode capacitance of first detecting electrodes 322.

At this time, although only the part of first detecting electrodes 322 is in the liquid to be measured, second detecting electrodes 323 and third detecting electrodes 324 are out of the liquid to be measured. Therefore, the time constant determined by first resistor 335 and the electrostatic capacitance of first detecting electrodes 322 is larger than the time constant determined by second resistor 336 and second detecting electrode 323 and the time constant determined by third resistor 337 and third detecting electrode 324.

In FIG. 20A, the third midpoint potential between third resistor 337 and third detecting electrode 324 reaches threshold voltage $V_{th}$ determined by resistors 341 and 342. At this time, an output from third comparing unit 344 configured by a comparator shifts from high to low (t1).

In FIG. 20B, the second midpoint potential between second resistor 336 and second detecting electrode 323 reaches threshold voltage $V_{th}$ determined by resistors 341 and 342. At this time, an output from second comparing unit 343 configured by a comparator shifts from high to low (t1).

In FIG. 20D, the fourth midpoint potential between fourth resistor 338 and fourth detecting electrode 325 reaches threshold voltage $V_{th}$ determined by resistors 341 and 342. At this time, an output from fourth comparing unit 345 configured by a comparator shifts from high to low (t3).

In FIG. 20C, the first midpoint potential between first resistor 335 and first detecting electrode 322 reaches threshold voltage $V_{th}$ determined by resistors 341 and 342. At this time, an output from first comparing unit 340 configured by a comparator shifts from high to low (t2).

Electric charges accumulated in first, second, third, and fourth detecting electrodes 322, 323, 324, and 325 are discharged to first potential 334 through element 354 having an open-collector configuration. For this reason, all the first midpoint potential between first resistor 335 and first detecting electrode 322, the second midpoint potential between second resistor 336 and second detecting electrode 323, the third midpoint potential between third resistor 337 and third detecting electrode 324, and the fourth midpoint potential between fourth resistor 338 and fourth detecting electrode 325 return to first potential 334. At the same time, each of outputs from first, second, third, and fourth comparing units 340, 343, 344, and 345 shifts from low to high (t4) as shown in FIGS. 20A, 20B, 20C, and 20D.

Subsequently, the same operations as described above are repeated (t4 to t8).

Output signals from first, second, and third comparing units 340, 343, and 344 are inputted to first logic circuit 346 configured by a logic element. A signal shown in FIG. 20E is outputted to an output of first NOR element 355 in first logic circuit 346. A signal shown in FIG. 20F is outputted to an output of second NOR element 356.

Output signals from first, third, and fourth comparing units 340, 344, and 345 are inputted to second logic circuit 347 configured by a logic element and a D flip-flop. Furthermore, outputs from first logic circuit 346 and second logic circuit 347 are inputted to third logic circuit 348 configured by a logic element.

At this time, when time t2 at which the output from first comparing unit 340 shifts from high to low is before time t3 at which the output from fourth comparing unit 345 shifts from high to low, i.e., when the length of the part of third detecting electrode 324 dipped in the liquid to be measured is long, a Q negative output from first D flip-flop 357 in second logic circuit 347 and a Q output from second flip-flop 358 are always at high as in FIGS. 18G and 18H.

In this manner, a signal in FIG. 20E is directly given to first analog switch 349, and a signal in FIG. 20F is directly given to second analog switch 350. For this reason, for only times t1 to t2 and times t5 to t6, second analog switch 350 is "closed", and fifth resistor 351 and capacitor 353 are connected to first potential 334. Since first analog switch 349 is always "opened", capacitor 353 is not charged with an electric charge. Therefore, a potential of output terminal 352 is equal to first potential 334.

As shown in FIGS. 20C and 20D, a case in which time t2 at which the output from first comparing unit 340 shifts from high to low is before time t3 at which the output from fourth comparing unit 345 shifts from high to low, i.e., the level of the liquid to be measured falls to shorten the length of the part of first detecting electrodes 322 dipped in the liquid to be measured will now be considered. In this case, an electrostatic capacitance measured by first detecting electrodes 322 decreases. Therefore, a time constant determined by the electrostatic capacitance measured by first detecting electrodes 322 and first resistor 335 is smaller than a time constant determined by an electrostatic capacitance measured by fourth detecting electrodes 325 and fourth resistor 338. In this case, as shown in FIGS. 20G and 20H, although a Q negative output of first D flip-flop 357 in second logic circuit 347 is kept high, a Q output from second flip-flop 358 shifts from high to low at t2. For this reason, a signal given from third logic circuit 348 to second analog switch 350 goes to high after t2 as shown in FIG. 20J. Therefore, second analog switch 350 is "closed", fifth resistor 351 and capacitor 353 are connected to first potential 334.

Since a signal given from third logic circuit 348 to first analog switch 349 is kept low as shown in FIG. 20I, first analog switch 349 is always "opened". In this manner, since capacitor 353 is not charged, an output potential from output terminal 352 is equal to first potential 334.

As is apparent from the above description, the liquid level sensor according to Embodiment 3 of the present invention can always output a voltage being in proportion to a level of a liquid to be measured without a complex operational device when the level of the liquid to be measured crosses to second detecting electrodes 323. Even though the level of the liquid to be measured crosses to first detecting electrodes 322 and third detecting electrodes 324 everywhere, a fixed voltage can be always outputted. Therefore, a highly sensitive liquid level sensor can be easily provided.

The liquid level sensor according to Embodiment 3 of the present invention in which fourth detecting electrodes 325 are arranged under first detecting electrodes 322 has been described. However, the present invention is not limited to the embodiment. Even though fourth detecting electrodes 325 are arranged at an arbitrary position such as a side or a backside of first detecting electrodes 322, the same operational advantage as that in Embodiment 3 of the present invention can be obtained.

Embodiment 4

A liquid level sensor according to Embodiment 4 of the present invention will be described below.

Figure 21:
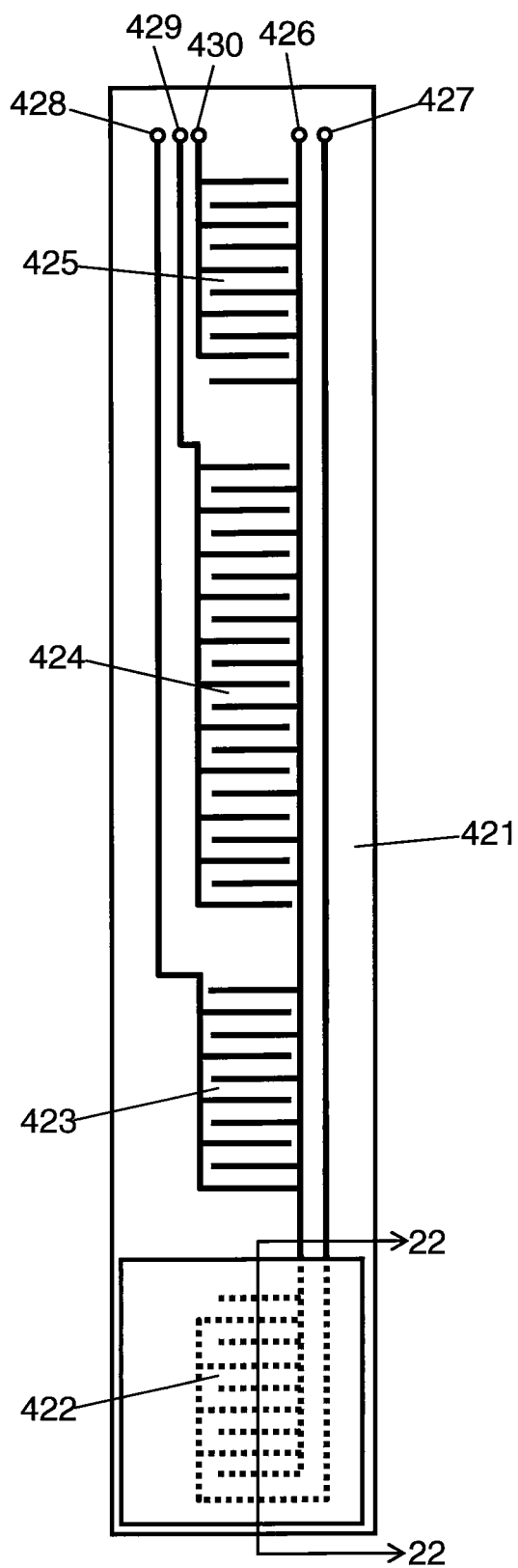
FIG. 21 is a front view of a detecting unit of a liquid level sensor according to Embodiment 4 of the present invention.

FIG. 21 is a front view of a detecting unit of the liquid level sensor according to Embodiment 4 of the present invention. In FIG. 21, a pair of first comb-shaped detecting electrodes 422 made of carbon are arranged on a lower end portion of vertically extending rectangular detecting unit 421 made of a polyimide film or the like. Above first detecting electrodes 422, a pair of second comb-shaped detecting electrodes 423 made of carbon are arranged. A pair of third comb-shaped detecting electrodes 424 are similarly arranged above second detecting electrodes 423, and a pair of fourth comb-shaped detecting electrodes 425 made of carbon are similarly arranged on an upper end portion of detecting unit 421. First, second, third, and fourth detecting electrodes 422, 423, 424, and 425 are connected to terminals 426, 427, 428, 429, and 430 by vertically extending extraction lines.

Figure 22:
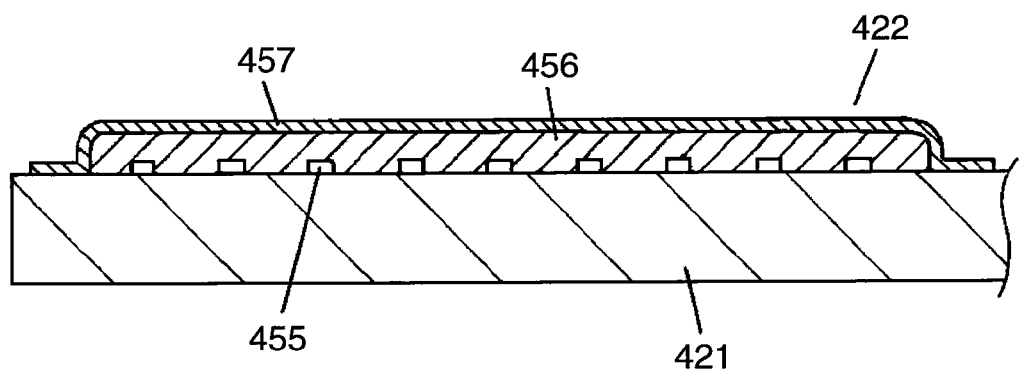
FIG. 22 is a sectional view of a first detecting electrode in FIG. 21.

FIG. 22 is a sectional view of first detecting electrodes 422 taken along line 22-22 in FIG. 21. In FIG. 22, first detecting electrode 422 is configured by covering an entire area of opposite electrodes 455 with metal layer 457 through insulator 456. With this configuration, since electric flux lines generated between opposite electrodes 455 do not pass through an liquid to be measured, an electrostatic capacitance between electrodes 455 measured by first detecting electrode 422 is not influenced by a dielectric constant held by the liquid to be measured.

As insulator 456, a liquid to be measured, a solid material which impregnates a liquid to be measured, or a material having substantially the same dielectric-constant-temperature characteristic as that of a liquid to be measured is desirably selected. In this manner, an influence of a change in temperature in liquid quality measurement can be removed.

In an operation of the liquid level sensor according to Embodiment 4 of the present invention, since first detecting electrodes 422 and second detecting electrodes 423 are always dipped in a liquid to be measured such as an oil having a high heat conductivity, temperatures of first detecting electrodes 422 and second detecting electrodes 423 are substantially equal to each other.

Figure 23:
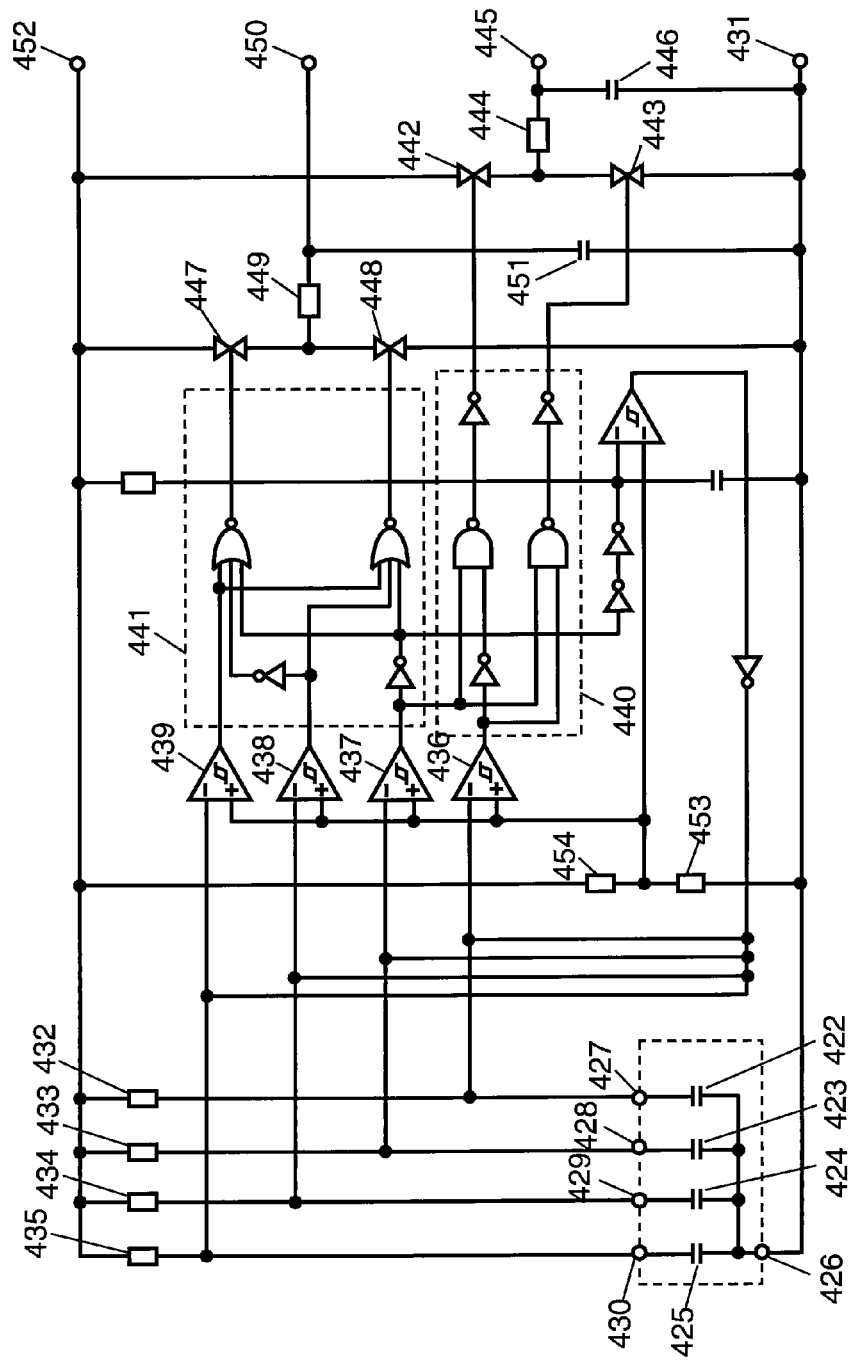
FIG. 23 is a detecting circuit diagram of the liquid level sensor according to Embodiment 4 of the present invention.

FIG. 23 is a detecting circuit diagram of the liquid level sensor according to Embodiment 4 of the present invention. In FIG. 23, terminal 426 of detecting unit 421 is connected to, for example, first potential 431 configured by a GND potential. Terminals 427, 428, 429, and 430 of detecting unit 421 are connected to second potential 452 configured by a 5-V power supply potential through first resistor 432, second resistor 433, third resistor 434, and fourth resistor 435, respectively. In this manner, first detecting electrode 422, second detecting electrode 423, third detecting electrode 424, and fourth detecting electrode 425 are connected to first resistor 432, second resistor 433, third resistor 434, and fourth resistor 435, respectively.

At this time, in a state in which all second, third, and fourth detecting electrodes 423, 424, and 425 are out of the liquid to be measured, a time constant determined by an inter-electrode capacitance of second detecting electrodes 423 and second resistor 433, a time constant determined by an inter-electrode capacitance of third detecting electrodes 424 and third resistor 434, and a time constant determined by an inter-electrode capacitance of fourth detecting electrodes 425 and fourth resistor 435 are set to be substantially equal to one another. A time constant determined by first detecting electrode 422 and first resistor 432 is set to be smaller than the time constant determined by the inter-electrode capacitance of second detecting electrodes 423 and second resistor 433 in a state of being dipped in the liquid to be measured.

A first midpoint potential between first resistor 432 and first detecting electrode 422 is compared with a threshold value determined by resistors 453 and 454 in first comparing unit 436 configured by a comparator. In the same manner as described above, a second midpoint potential between second resistor 433 and second detecting electrode 423, a third midpoint potential between third resistor 434 and third detecting electrode 424, and a fourth midpoint potential between fourth resistor 435 and fourth detecting electrode 425 are compared with a threshold value determined by resistors 453 and 454 in second comparing unit 437, third comparing unit 438, and fourth comparing unit 439 which are configured by comparators, respectively.

Output signals from first and second comparing units 436 and 437 are inputted to first logic circuit 440 configured by a logic element. Furthermore, output signals from second, third, and fourth comparing units 437, 438, and 439 are inputted to second logic circuit 441 configured by a logic element.

First analog switch 442 and second analog switch 443 which are open/close-controlled by an output signal from first logic circuit 440 are arranged on a subsequent stage of first logic circuit 440. Resistor 444 has one end connected to a midpoint between first analog switch 442 and second analog switch 443 and the other end connected to first output terminal 445. Capacitor 446 has one end connected to first potential 431 and the other end connected between fifth resistor 444 and first output terminal 445.

In the same manner as described above, third analog switch 447 and fourth analog switch 448 which are open/close-controlled by an output signal from second logic circuit 441 are arranged on a subsequent stage of second logic circuit 441. Sixth resistor 449 has one end connected to a midpoint between third analog switch 447 and fourth analog switch 448, and the other end connected to second output terminal 450. Capacitor 451 has one end connected to first potential 431 and the other end connected between sixth resistor 449 and second output terminal 450.

A circuit operation of the liquid level sensor according to Embodiment 4 of the present invention will be described below.

FIGS. 24A to 24L are voltage waveform charts of each unit of the liquid level sensor according to Embodiment 4 of the present invention. Detecting unit 421 shown in FIG. 21 is dipped in a liquid to be measured such as an engine oil in an oil pan (not shown). At this time, first detecting electrodes 422 and second detecting electrodes 423 are always dipped in the liquid to be measured, and fourth detecting electrodes 425 are always arranged out of the liquid to be measured. Third detecting electrodes 424 cross to a level of the liquid to be measured, and a part dipped in the liquid increases or decreases with rising and falling of the liquid level.

In an initial state (t0) before the power supply is turned on, since electric charges are not present between the electrode pairs of first, second, third, and fourth detecting electrodes 422, 423, 424, and 425, all the first midpoint potential between first resistor 432 and first detecting electrode 422, the second midpoint potential between second resistor 433 and second detecting electrode 423, the third midpoint potential between third resistor 434 and third detecting electrode 424, and a fourth midpoint potential between fourth resistor 435 and fourth detecting electrode 425 are equal to first potential 431 ($V_1$).

Figure 24A:
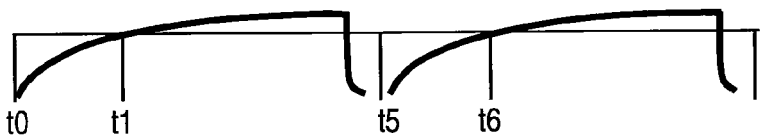
FIG. 24A is a voltage waveform chart in each unit of the liquid level sensor according to Embodiment 4 of the present invention.
Figure 24B:
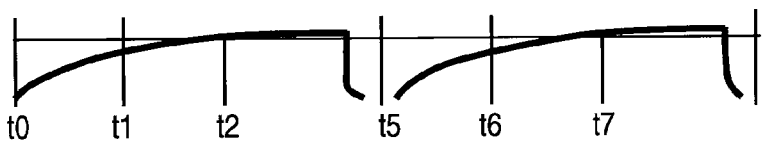
FIG. 24B is a voltage waveform chart in each unit of the liquid level sensor according to Embodiment 4 of the present invention.
Figure 24C:
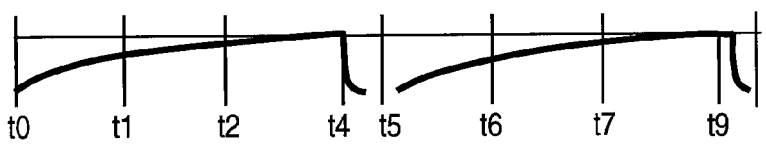
FIG. 24C is a voltage waveform chart in each unit of the liquid level sensor according to Embodiment 4 of the present invention.
Figure 24D:
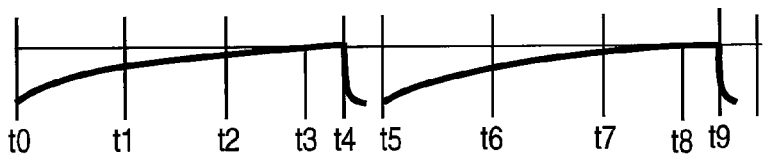
FIG. 24D is a voltage waveform chart in each unit of the liquid level sensor according to Embodiment 4 of the present invention.

When the power supply is turned on, the fourth midpoint potential between fourth resistor 435 and fourth detecting electrode 425 exponentially increases, as shown in FIG. 24A, from first potential 431 ($V_1$) to second potential 452 ($V_2$) at a time constant determined by fourth resistor 435 and an inter-electrode capacitance of fourth detecting electrodes 425. The third midpoint potential between third resistor 434 and third detecting electrode 424 exponentially increases, as shown in FIG. 24B, from first potential 431 ($V_1$) to second potential 452 ($V_2$) at a time constant determined by third resistor 434 and an inter-electrode capacitance of third detecting electrodes 424. Since a part of third detecting electrodes 424 is in the liquid to be measured, a time constant determined by third resistor 434 and an electrostatic capacitance of third detecting electrodes 424 is larger than a time constant determined by fourth resistor 435 and fourth detecting electrode 425. The second midpoint potential between second resistor 433 and second detecting electrode 423, as shown in FIG. 24C, exponentially increases from first potential 431 ($V_1$) to second potential 452 ($V_2$) at the time constant determined by second resistor 433 and the inter-electrode capacitance of second detecting electrodes 423. At this time, since second detecting electrodes 423 are always dipped in the liquid to be measured, a time constant determined by second resistor 433 and an inter-electrode capacitance of second detecting electrodes 423 is larger than a time constant determined by third resistor 434 and third detecting electrode 424. Furthermore, the first midpoint potential between first resistor 432 and first detecting electrode 422, as shown in FIG. 24D, exponentially increases from first potential 431 ($V_1$) to second potential 452 ($V_2$) at a time constant determined by first resistor 432 and an inter-electrode capacitance of first detecting electrodes 422. At this time, as described above, the time constant determined by first detecting electrode 422 and first resistor 432 is set to be smaller than a time constant determined by an inter-electrode capacitance of second detecting electrodes 423 and second resistor 433 in a state of being dipped in the liquid to be measured.

Figure 24E:
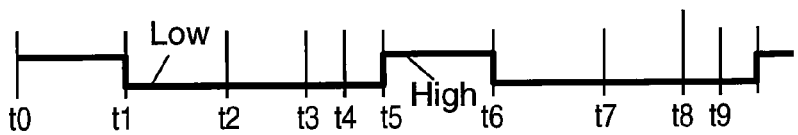
FIG. 24E is a voltage waveform chart in each unit of the liquid level sensor according to Embodiment 4 of the present invention.
Figure 24F:
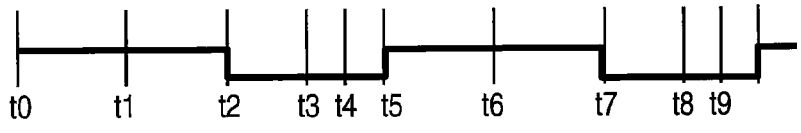
FIG. 24F is a voltage waveform chart in each unit of the liquid level sensor according to Embodiment 4 of the present invention.
Figure 24G:
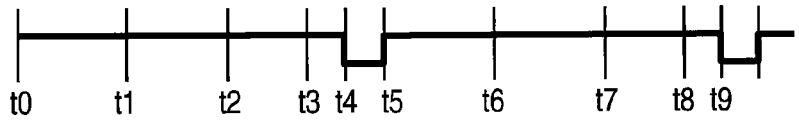
FIG. 24G is a voltage waveform chart in each unit of the liquid level sensor according to Embodiment 4 of the present invention.
Figure 24H:
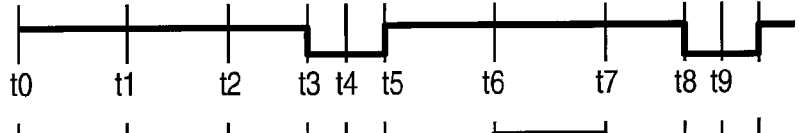
FIG. 24H is a voltage waveform chart in each unit of the liquid level sensor according to Embodiment 4 of the present invention.

Thereafter, when the fourth midpoint potential between fourth resistor 435 and fourth detecting electrode 425 reaches threshold voltage $V_{th}$ determined by resistors 453 and 454, an output from fourth comparing unit 439 configured by a comparator shifts from high to low (t1) as shown in FIG. 24E. In the same manner as described above, the third midpoint potential between third resistor 434 and third detecting electrode 424 reaches threshold voltage $V_{th}$ determined by resistors 453 and 454, an output from third comparing unit 438 configured by a comparator shifts from high to low (t2) as shown in FIG. 24F. When the first midpoint potential between first resistor 432 and first detecting electrode 422 reaches threshold voltage $V_{th}$ determined by resistors 453 and 454, an output from first comparing unit 436 configured by a comparator shifts from high to low (t3) as shown in FIG. 24H. Furthermore, when the second midpoint potential between second resistor 433 and second detecting electrode 423 reaches threshold voltage $V_{th}$ determined by resistors 453 and 454, an output from second comparing unit 437 configured by a comparator shifts from high to low (t4) as shown in FIG. 24G. Since electric charges accumulated in first, second, third, and fourth detecting electrodes 422, 423, 424, and 425 are discharged to first potential 431 ($V_1$) through element 451 having an open-collector configuration, all the first midpoint potential between first resistor 432 and first detecting electrode 422, the second midpoint potential between second resistor 433 and second detecting electrode 423, the third midpoint potential between third resistor 434 and third detecting electrode 424, and the fourth midpoint potential between fourth resistor 435 and fourth detecting electrode 425 return to first potential 431 ($V_1$). Each of outputs from first, second, third, and fourth comparing units 436, 437, 438, and 439 shifts from low to high (t5) as shown in FIGS. 24H, 24G, 24F, and 24E.

Thereafter, the fourth midpoint potential between fourth resistor 435 and fourth detecting electrode 425, the third midpoint potential between third resistor 434 and third detecting electrode 424, the second midpoint potential between second resistor 433 and second detecting electrode 423, and the first midpoint potential between first resistor 432 and first detecting electrode 422 exponentially increase again from resistor 431 ($V_1$) to second potential 452 ($V_2$), as shown in FIGS. 24A, 24B, 24C, and 24D, at the time constants determined by fourth resistor 435 and the inter-electrode capacitance of fourth detecting electrodes 425, third resistor 434 and the inter-electrode capacitance of third detecting electrodes 424, second resistor 433 and the inter-electrode capacitance of second detecting electrodes 423, and first resistor 432 and the inter-electrode capacitance of first detecting electrodes 422, respectively. Subsequently, an output from fourth comparing unit 439 shifts from high to low (t6), an output from third comparing unit 438 shifts from high to low (t7), an output from second comparing unit 437 shifts from high to low (t8), and an output from first comparing unit 436 shifts from high to low (t9), and the same operations as described above are repeated.

Figure 24I:
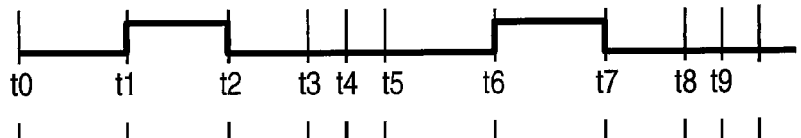
FIG. 24I is a voltage waveform chart in each unit of the liquid level sensor according to Embodiment 4 of the present invention.
Figure 24J:
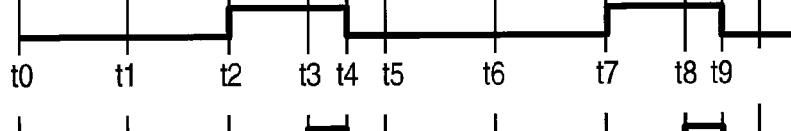
FIG. 24J is a voltage waveform chart in each unit of the liquid level sensor according to Embodiment 4 of the present invention.
Figure 24K:
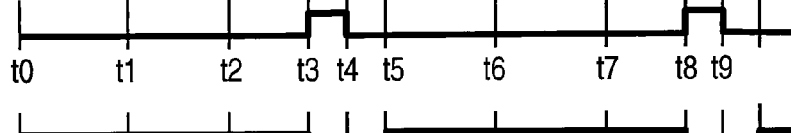
FIG. 24K is a voltage waveform chart in each unit of the liquid level sensor according to Embodiment 4 of the present invention.
Figure 24L:
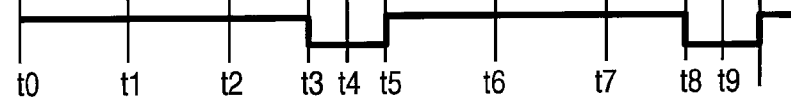
FIG. 24L is a voltage waveform chart in each unit of the liquid level sensor according to Embodiment 4 of the present invention.

Output signals from first and second comparing units 436 and 437 are inputted to logic circuit 440 configured by a logic element, a signal shown in FIG. 24K is outputted to first analog switch 442, and a signal shown in FIG. 24J is outputted to second analog switch 443.

In the same manner as described above, output signals from second, third, and fourth comparing units 437, 438, and 439 are inputted to logic circuit 441 configured by a logic element, a signal shown in FIG. 24I is outputted to third analog switch 447, and a signal shown in FIG. 24J is outputted to fourth analog switch 448.

In this case, when a signal inputted to each analog switch is at high, an analog switch is "closed". When the signal is at low, the analog switch is "opened". In this manner, for times t3 to t4 and times t8 to t9, first analog switch 442 is "closed", and second analog switch 443 is "opened". For this reason, capacitor 446 is charged from second potential 452 through fifth resistor 444. For times t0 to t3 and times t5 to t8, since first analog switch 442 is "opened", and second analog switch 443 is "closed". For this reason, an electric charge accumulated in capacitor 446 is discharged to first potential 431 ($V_1$) through fifth resistor 444.

In this manner, an operation of charging capacitor 446 for a time being in proportion to a difference between an electrostatic capacitance measured by first detecting electrodes 422 and an electrostatic capacitance measured by second detecting electrodes 423 and an operation of discharging an electric charge charged in capacitor 446 for a time being in proportion to the electrostatic capacitance measured by first detecting electrodes 422 is repeated to make it possible to output a voltage being in proportion to liquid quality of the liquid to be measured to first output terminal 445.

In the same manner as described above, for times t1 to t2 and times t6 to t7, third analog switch 447 is "closed", and fourth analog switch 448 is "opened". For this reason, capacitor 451 is charged from second potential 452 through sixth resistor 449. For times t2 to t4 and times t7 to t9, third analog switch 447 is "opened", and fourth analog switch 448 is "closed". For this reason, the electric charge accumulated in capacitor 451 is discharged to first potential 431 ($V_1$) through sixth resistor 449. In this manner, for times determined by a length of part of third detecting electrodes 424 dipped in the liquid to be measured and a length of a part being out of the liquid to be measured, third analog switch 447 and fourth analog switch 448 are alternately opened and closed to charge and discharge capacitor 451. For this reason, a level of the liquid to be measured can be outputted to second output terminal 450 as an analog voltage.

A circuit operation of a liquid quality measuring unit will be further described by using numerical expressions. An electrostatic capacitance of first detecting electrodes 422 is represented by $C_1$, an electrostatic capacitance obtained when second detecting electrodes 423 are out of a liquid to be measured is represented by $C_2$, resistances of first resistor 432 and second resistor 433 are represented by $r_0$, and a relative dielectric constant of the liquid to be measured is represented by $\in_L$. First potential 431 ($V_1$) is set to 0 [V], and second potential 452 ($V_2$) is represented by $V_{dd}$ [V]. When first detecting electrodes 422 and second detecting electrodes 423 are dipped in the liquid to be measured, the electrostatic capacitance of first detecting electrodes 422 is not influenced by a dielectric constant held by the liquid to be measured. For this reason, a time constant determined by first detecting electrode 422 and first resistor 432 is expressed by Equation 31.

[Numerical Expression 31]

$$C_1 r_0 \qquad \text{Equation 31}$$

Since the electrostatic capacitance of second detecting electrodes 423 is influenced by the dielectric constant held by the liquid to be measured, the time constant determined by second detecting electrode 423 and second resistor 433 is expressed by Numerical Expression 32.

[Numerical Expression 32]

$$\in_L C_2 r_0 \qquad \text{Equation 32}$$

When power supply is turned on, second midpoint potential $V_{n2}$ between second detecting electrode 423 and second resistor 433 is expressed by an equation shown in Equation 33.

[Numerical Expression 33]

$$V_{n2} = V_{dd}\left(1 - e^{-\frac{t}{\varepsilon_L C_2 r_0}}\right) \qquad \text{Equation 33}$$

In the same manner as described above, first midpoint potential $V_{n1}$ between first detecting electrode 422 and first resistor 432 is expressed by Equation 34.

[Numerical Expression 34]

$$V_{n1} = V_{dd}\left(1 - e^{-\frac{t}{C_1 r_0}}\right) \qquad \text{Equation 34}$$

According to this, time $T_c$ for which capacitor 446 is charged is expressed by Equation 35.

[Numerical Expression 35]

$$T_c = (\varepsilon_L C_2 - C_1)\ln\left(1 - \frac{V_{th}}{V_{dd}}\right) \qquad \text{Equation 35}$$

Similarly, time $T_d$ for which capacitor 446 is discharged is expressed by Equation 36.

[Numerical Expression 36]

$$T_c = -C_1 r_0 \ln\left(1 - \frac{V_{th}}{V_{dd}}\right) \qquad \text{Equation 36}$$

According to Equation 35 and Equation 36, it is understood that charging time $T_c$ is in proportion to a difference between an electrostatic capacitance of second detecting electrodes 423 and an electrostatic capacitance of first detecting electrodes 422 ($\in_L C_2 - C_1$) and that discharging time $T_d$ is determined by the electrostatic capacitance of first detecting electrodes 422.

Output voltage $V_O$ generated at first output terminal 445 is expressed by a numerical expression. In the circuit shown in FIG. 23, both first and second analog switches 442 and 443 are "opened" in a period of t4 to t5 or the like. For this reason, an electric charge accumulated in capacitor 446 does not change, and output voltage $V_O$ does not also change. Therefore, in the following description, these periods are ignored, a change in output voltage when charging time $T_c$ and discharging time $T_d$ are repeated will be considered. An output voltage obtained immediately after the power supply is turned on is set to 0 [V]. When a resistance of fifth resistor 444 and a capacitance of capacitor 446 are represented by R and C, respectively, output voltage $V_{1c}$ after the first charge is expressed by Equation 37.

[Numerical Expression 37]

$$V_{1c} = V_{dd}\left(1 - e^{-\frac{T_c}{CR}}\right)$$ Equation 37

Output voltage $V_{1d}$ obtained after the first discharge is expressed by Equation 38.

[Numerical Expression 38]

$$V_{1d} = V_{1c} e^{-\frac{T_d}{CR}}$$ Equation 38

Output voltage $V_{2c}$ obtained after the second charge is expressed by Equation 39.

[Numerical Expression 39]

$$V_{2c} = V_{1d} + (V_{dd} - V_{1d})\left(1 - e^{-\frac{T_c}{CR}}\right)$$ Equation 39

Output voltage $V_{2d}$ obtained after the second discharge is expressed by Equation 40.

[Numerical Expression 40]

$$V_{2d} = V_{2c} e^{-\frac{T_d}{CR}}$$ Equation 40

Furthermore, output voltage $V_{3c}$ obtained after the third charge and output voltage $V_{3d}$ obtained after discharge are expressed by Equation 41 and Equation 42.

[Numerical Expression 41]

$$V_{3c} = V_{2d} + (V_{dd} - V_{2d})\left(1 - e^{-\frac{T_c}{CR}}\right)$$ Equation 41

[Numerical Expression 42]

$$V_{3d} = V_{3c} e^{-\frac{T_d}{CR}}$$ Equation 42

In the same manner as described above, the output voltages obtained after the charge and the discharge can be calculated.

Figure 25:
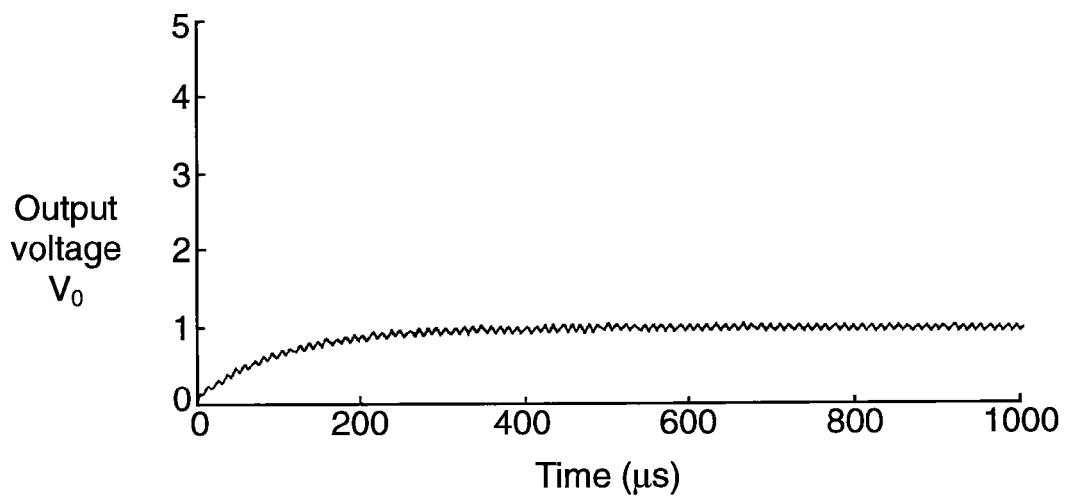
FIG. 25 is a characteristic graph showing a change of output voltage with time when a ratio of an electrostatic capacitance of first detecting electrodes to an electrostatic capacitance of second detecting electrodes in the liquid level sensor according to Embodiment 4 of the present invention is 4:5.
Figure 26:
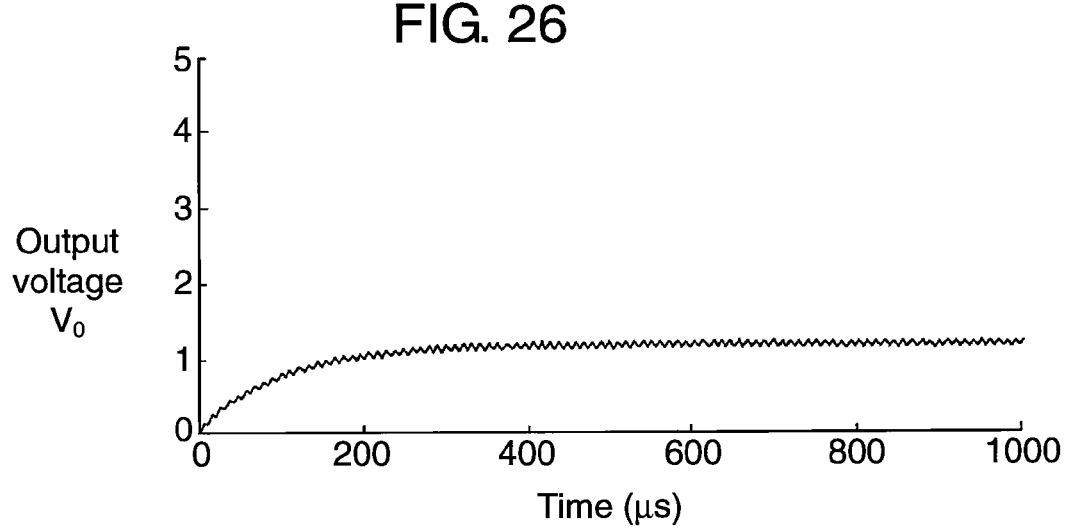
FIG. 26 is a characteristic graph showing a change of output voltage with time when an electrostatic capacitance of second detecting electrodes in the liquid level sensor according to Embodiment 4 of the present invention increases by 5%.
Figure 27:
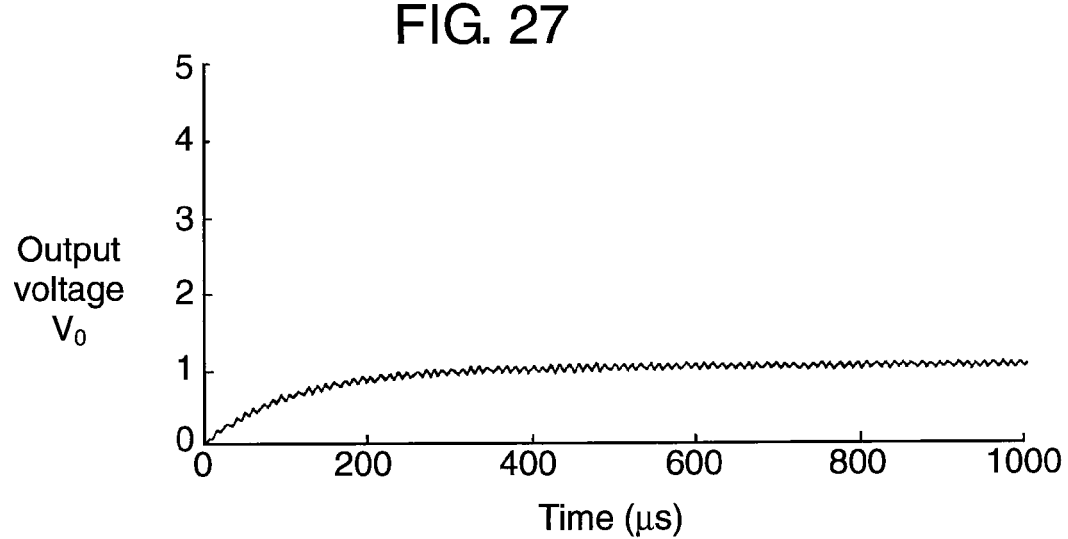
FIG. 27 is a characteristic graph showing a change of output voltage with time when both the electrostatic capacitance of the first detecting electrodes and the electrostatic capacitance of the second detecting electrodes in the liquid level sensor according to Embodiment 4 of the present invention increase by 10%.

FIGS. 25 to 27 are obtained by calculating output voltage $V_O$ obtained when resistance R of fifth resistor 444 and capacitance C of capacitor 446 are set to 500 kΩ and 100 pF, respectively.

FIG. 25 is a characteristic graph showing a change of output voltage $V_O$ with time when a ratio of an electrostatic capacitance of a first detecting electrodes to an electrostatic capacitance of a second detecting electrodes in the liquid level sensor according to Embodiment 4 of the present invention is 4:5. More specifically, FIG. 25 shows a change of output voltage $V_O$ with time when charging time $T_c$ and discharging time $T_d$ are set to 1 μsec and 4 μsec, more specifically, a ratio of $T_c$ and $T_d$, i.e., a ratio of electrostatic capacitance $C_1$ of first detecting electrodes 422 dipped in the liquid to be measured to electrostatic capacitance $\in_L C_2$ of second detecting electrodes 423 is 4:5. In FIG. 25, after 500 μsec have elapsed, output voltage $V_O$ made by superposing a ripple having an amplitude of ±0.04 [V] on a DC component of 1 [V] is obtained. The ripple can be removed by using an appropriate low-pass filter.

FIG. 26 is a characteristic graph showing a change of output voltage $V_O$ with time when an electrostatic capacitance of second detecting electrodes in the liquid level sensor according to Embodiment 4 of the present invention increases by 5%. More specifically, FIG. 26 shows a change of output voltage $V_O$ with time obtained when only charging time $T_c$ increases to 1.25 μsec when dielectric constant $\in_L$ of the liquid to be measured increases by 5% due to deterioration or the like in the state shown in FIG. 25. In FIG. 26, after about 500 μsec have elapsed, output voltage $V_O$ made by superposing a ripple having an amplitude of about ±0.05 [V] on a DC component of 1.24 [V] is obtained.

FIG. 27 is a characteristic graph showing a change of output voltage $V_O$ with time when both the electrostatic capacitance of the first detecting electrodes and the electrostatic capacitance of the second detecting electrodes in the liquid level sensor according to Embodiment 4 of the present invention increase by 10%. More specifically, FIG. 27 shows a change of output voltage $V_O$ with time when discharging time $T_d$ and charging time $T_c$ increase to 1.1 μsec and 4.4 μsec, respectively when both the electrostatic capacitance of first detecting electrodes 422 and the electrostatic capacitance of second detecting electrodes 423 increase by 10% in the state shown in FIG. 25. In FIG. 27, after about 500 μsec have elapsed as in FIG. 25, output voltage $V_O$ made by superposing a ripple having an amplitude of about ±0.04 [V] is obtained.

In this manner, change rates of the electrostatic capacitance of first detecting electrodes 422 and the electrostatic capacitance of second detecting electrodes 423 are made equal to each other to make it possible to measure liquid quality of the liquid to be measured regardless of a temperature.

In the same manner as described above, for times determined by a length of part of third detecting electrode 424 dipped in the liquid to be measured and a length of a part being out of the liquid to be measured, third analog switch 447 and fourth analog switch 448 are alternately opened and closed to charge and discharge capacitor 451. In this manner, a level of the liquid to be measured can be outputted to second output terminal 450 as an analog voltage.

As is apparent from the above description, the liquid level sensor according to Embodiment 4 of the present invention can always output a voltage being in proportion to liquid quality without arranging a complex operational device. Therefore, a highly sensitive liquid level sensor can be easily provided.

Embodiment 5

A liquid level sensor according to Embodiment 5 of the present invention will be described below.

Figure 28:
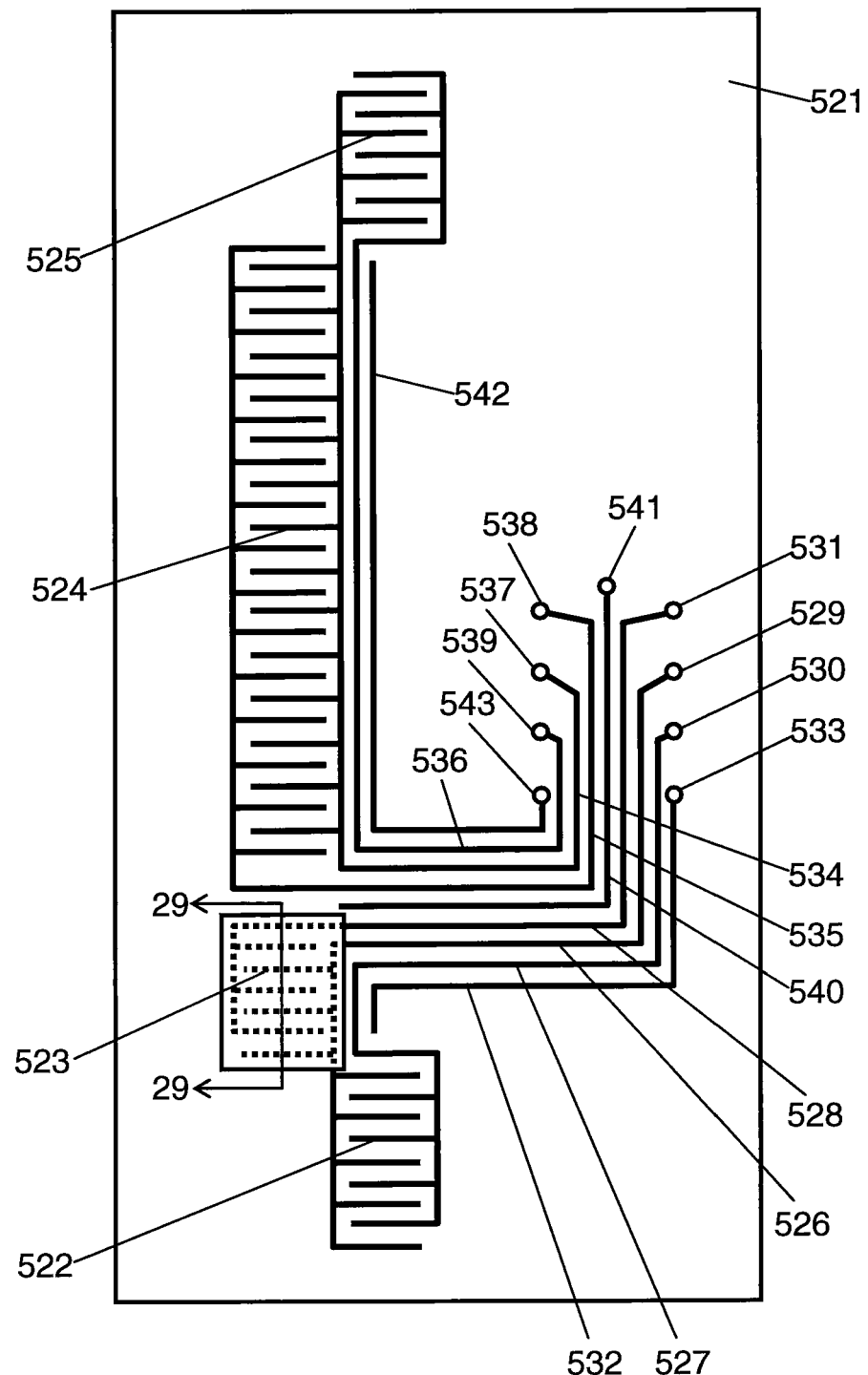
FIG. 28 is a front view of a detecting unit in a liquid level sensor according to Embodiment 5 of the present invention.

FIG. 28 is a front view of a detecting unit in the liquid level sensor according to Embodiment 5 of the present invention. In FIG. 28, a pair of first comb-shaped detecting electrodes 522 made of carbon or the like are arranged on a lower end portion of vertically extending rectangular detecting unit 521 made of a polyimide film or the like. Above first detecting electrodes 522, a pair of second comb-shaped detecting electrodes 523 made of carbon or the like are arranged. A pair of third comb-shaped detecting electrodes 524 are similarly arranged above second detecting electrodes 523, and a pair of fourth comb-shaped detecting electrodes 525 made of carbon or the like are similarly arranged above third detecting electrodes 524. First and second detecting electrodes 522 and 523 are connected to terminals 529, 530, and 531 by common extraction line 526 and extraction lines 527 and 528. First cancel electrode 532 is connected to terminal 533 and arranged along extraction line 527 of first detecting electrode 522. First cancel electrode 532 is arranged throughout the upper end portion of first detecting electrode 522. Third and fourth detecting electrodes 524 and 525 are connected to terminals 537, 538, and 539 by common extraction line 534 and extraction lines 535 and 536. Second cancel electrode 540 is connected to terminal 541 and arranged between extraction line 528 of second detecting electrode 523 and extraction line 535 of third detecting electrode 524. Second cancel electrode 540 is arranged throughout an upper end portion of second detecting electrode 523 and a lower end portion of third detecting electrode 524. Third cancel electrode 542 is connected to terminal 543 and arranged along extraction line 536 of fourth detecting electrode 525. Third cancel electrode 542 is arranged throughout a lower end portion of fourth detecting electrode 525.

Figure 29:
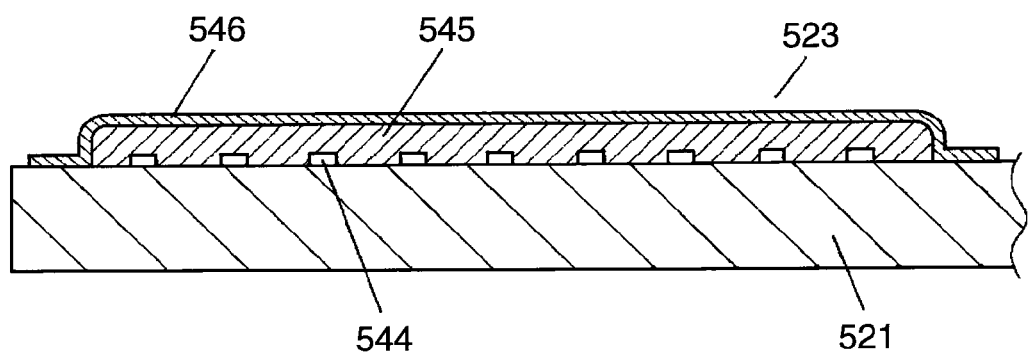
FIG. 29 is a sectional view of a second detecting electrode in FIG. 28.

FIG. 29 is a sectional view of second detecting electrode 523 taken along line 29-29 in FIG. 28. In FIG. 29, second detecting electrode 523 is configured by covering an entire area of opposite electrodes 544 with metal layer 546 through insulator 545. With this configuration, since electric flux lines generated between opposite electrodes 544 do not pass through an liquid to be measured, an electrostatic capacitance between opposite electrodes 544 measured by second detecting electrode 523 is not influenced by a dielectric constant held by the liquid to be measured.

As insulator 545, a liquid to be measured, a solid material which impregnates a liquid to be measured, or a material having substantially the same dielectric-constant-temperature characteristic as that of a liquid to be measured is desirably selected. In this manner, an influence of a change in temperature in liquid quality measurement can be removed.

Figure 30:
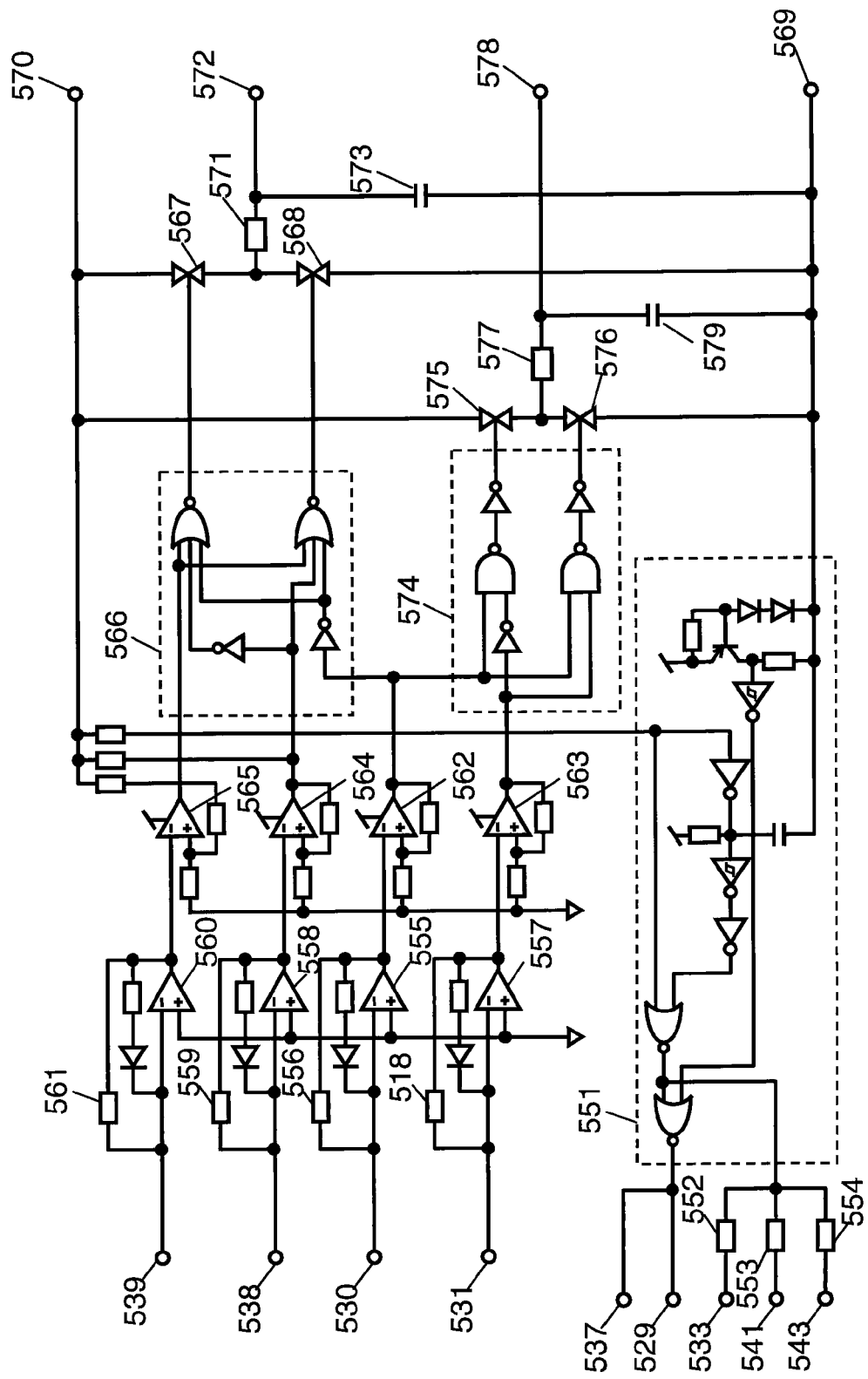
FIG. 30 is a detecting circuit diagram of the liquid level sensor according to Embodiment 5 of the present invention.

FIG. 30 is a detecting circuit diagram of the liquid level sensor according to Embodiment 5 of the present invention. In FIG. 30, pulses from pulse generating circuit 551 are inputted to terminals 529 and 537 of detecting unit 521, and signals obtained by inverting the pulses are inputted to terminals 533, 541, and 543 of detecting unit 521 through level adjusters 552, 553, and 554. In this detecting circuit, signals branched from an input of a NOR gate on the final stage of pulse generating circuit 551 are inputted to terminals 533, 541, and 543 of detecting unit 521.

When the pulses from pulse generating circuit 551 are inputted to terminals 529 and 537 of detecting unit 521, an electric charge accumulated in an electrostatic capacitance by first detecting electrodes 522 and an electric charge accumulated in an electrostatic capacitance between common extraction line 526 and extraction line 527 of first detecting electrode 522 are present between terminals 529 and 530 of detecting unit 521. An electric charge accumulated in an electrostatic capacitance by second detecting electrodes 523 and an electric charge accumulated in an electrostatic capacitance between common extraction line 526 and extraction line 528 of second detecting electrode 523 are present between terminals 529 and 531 of detecting unit 521.

In the same manner as described above, an electric charge accumulated in an electrostatic capacitance by third detecting electrodes 524 and an electric charge accumulated in an electrostatic capacitance between common extraction line 534 and extraction line 535 of third detecting electrode 524 are present between terminals 537 and 538 of detecting unit 521. An electric charge accumulated in an electrostatic capacitance by fourth detecting electrodes 525 and an electric charge accumulated in an electrostatic capacitance between common extraction line 534 and extraction line 536 of fourth detecting electrode 525 are present between terminals 537 and 539 of detecting unit 521.

First cancel electrode 532 is arranged along extraction line 527 of first detecting electrode 522. Second cancel electrode 540 is arranged between extraction line 528 of second detecting electrode 523 and extraction line 535 of third detecting electrode 524.

Third cancel electrode 542 is arranged along extraction line 536 of fourth detecting electrode 525. Signals obtained by inverting pulses from pulse generating circuit 551 are inputted to first cancel electrode 532, second cancel electrode 540, and third cancel electrode 542 through level adjusters 552, 553, and 554. In this manner, electric charges accumulated between extraction line 527 of first detecting electrode 522 and common extraction line 526 of first detecting electrode 522 and second detecting electrode 523 are canceled. Electric charges accumulated between extraction line 528 of second detecting electrode 523 and common extraction line 526 of first detecting electrode 522 and second detecting electrode 523 are canceled. Furthermore, electric charges accumulated between extraction line 535 of third detecting electrode 524 and common extraction line 534 of third detecting electrode 524 and fourth detecting electrode 525 are canceled. Electric charges accumulated between extraction line 536 of fourth detecting electrode 525 and common extraction line 534 of third detecting electrode 524 and fourth detecting electrode 525 are canceled.

With this configuration, electrostatic capacitances measured between terminals 529 and 530, terminals 529 and 531, terminals 537 and 538, and 537 and 539 are only electrostatic capacitances measured by comb-shaped detecting electrodes 522, 523, 524, and 525.

A node voltage between terminal 530 of detecting unit 521 and one end of first resistor 556 is inputted to one terminal of first differential amplifier 555. In the same manner as described above, a node voltage between terminal 531 of detecting unit 521 and one end of second resistor 518, a node voltage between terminal 538 of detecting unit 521 and one end of third resistor 559, and a node voltage between terminal 539 of detecting unit 521 and fourth resistor 561 are inputted to negative terminals of second differential amplifier 557, third differential amplifier 558, and fourth differential amplifier 560, respectively, and a threshold value (not shown) is inputted to positive terminals. In Embodiment 5 of the present invention, the threshold value is set to ½ of the power supply voltage. The other ends of first, second, third, and fourth resistors 556, 518, 559, and 561 are connected to output sides of first, second, third, and fourth differential amplifiers 555, 557, 558, and 560, respectively. Furthermore, a diode and a resistor are connected in series with each other between the input and the output of each of the differential amplifiers.

In this manner, first detecting electrode 522, second detecting electrode 523, third detecting electrode 524, and fourth detecting electrode 525 are connected to first resistor 556 and first differential amplifier 555, second resistor 518 and second differential amplifier 557, third resistor 559 and third differential amplifier 558, and fourth resistor 561 and fourth differential amplifier 560, respectively. At this time, in a state in which all first, third and fourth detecting electrodes 522, 524, and 525 are out of the liquid to be measured, a time constant determined by an inter-electrode capacitance of first detecting electrodes 522 and first resistor 556, a time constant determined by an inter-electrode capacitance of third detecting electrodes 524 and third resistor 559, and a time constant determined by an inter-electrode capacitance of fourth detecting electrodes 525 and fourth resistor 561 are set to be substantially equal to one another.

In a state in which both first detecting electrodes 522 and second detecting electrodes 523 are clipped in the liquid to be measured, a time constant determined by second detecting electrode 523 and second resistor 518 is set to be smaller than a time constant determined by the inter-electrode capacitance of first detecting electrodes 522 and first resistor 556.

An output potential of first differential amplifier 555 is compared with a threshold value from a threshold value generating unit (not shown) in first comparing unit 562. In the same manner as described above, an output potential from second differential amplifier 557, an output potential from third differential amplifier 558, and an output potential from fourth differential amplifier 560 are compared with a threshold value from a threshold value generating unit (not shown) in second comparing unit 563, third comparing unit 564, and fourth comparing unit 565 which are configured by comparators, respectively. In Embodiment 5 of the present invention, the threshold value is set to ¼ of the power supply voltage.

Output signals from first, third, and fourth comparing units 562, 564, and 565 are inputted to logic circuit 566 configured by a logic element and a flip-flop. On the subsequent stage of logic circuit 566, first analog switch 567 and second analog switch 568 which are open/close-controlled by an output signal from logic circuit 566 are arranged between first potential 569 and second potential 570. Fifth resistor 571 has one end connected to a midpoint between first analog switch 567 and second analog switch 568, and the other end connected to output terminal 572. Capacitor 573 has one end connected to first potential 569, and the other end connected between fifth resistor 571 and output terminal 572.

Output signals from first and second comparing units 562 and 563 are inputted to logic circuit 574 configured by a logic element and a flip-flop. On the subsequent stage of logic circuit 574, first analog switch 567 and second analog switch 576 which are open/close-controlled by an output signal from logic circuit 574 are arranged between first potential 569 and second potential 570. Sixth resistor 577 has one end connected to a midpoint between first analog switch 575 and second analog switch 576, and the other end connected to output terminal 578. Capacitor 579 has one end connected to first potential 569, and the other end connected between sixth resistor 577 and output terminal 578.

Connections between terminals of detecting unit 521 and pulse generating circuits 551, resistors 556, 558, 559, and 561, and the like are made in minimum dimensions not to generate a stray capacitance.

A circuit operation of the liquid level sensor according to Embodiment 5 of the present invention will be described below.

FIGS. 31A to 31M are voltage waveform charts of each part in the liquid level sensor according to Embodiment 5 of the present invention. Detecting unit 521 of the liquid level sensor shown in FIG. 28 is dipped in a liquid level sensor such as an engine oil in an oil pan (not shown). At this time, first detecting electrodes 522 and second detecting electrodes 523 are always dipped in the liquid to be measured, and fourth detecting electrodes 525 are always arranged out of the liquid to be measured. Third detecting electrodes 524 cross to the level of the liquid to be measured, and a part dipped in the liquid increases or decreases with rising or falling of the liquid level.

In the liquid level sensor according to Embodiment 5 of the present invention, in an initial state (t0) before power supply is turned on, since electric charges are not present between first, second, third, and fourth detecting electrodes 522, 523, 524, and 525, all node potential between first resistor 556 and first detecting electrode 522, a node potential between second resistor 518 and second detecting electrode 523, a node potential between third resistor 559 and third detecting electrode 524, and a node potential between fourth resistor 561 and fourth detecting electrode 525 are set to first potential 569 ($V_1$).

Figure 31:
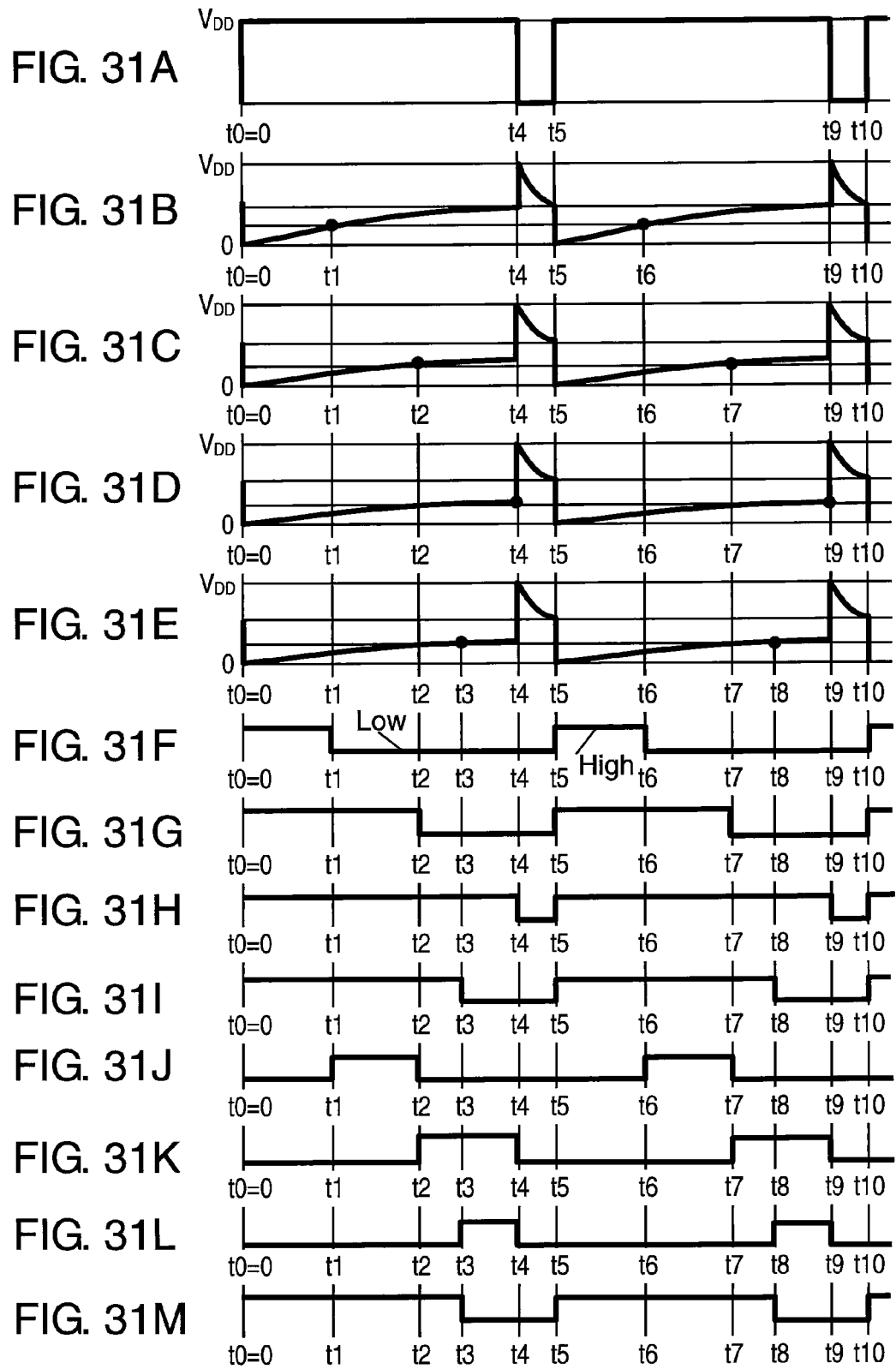
FIG. 31A is a voltage waveform chart of each unit in the liquid level sensor according to Embodiment 5 of the present invention.
FIG. 31B is a voltage waveform chart of each unit in the liquid level sensor according to Embodiment 5 of the present invention.
FIG. 31C is a voltage waveform chart of each unit in the liquid level sensor according to Embodiment 5 of the present invention.
FIG. 31D is a voltage waveform chart of each unit in the liquid level sensor according to Embodiment 5 of the present invention.
FIG. 31E is a voltage waveform chart of each unit in the liquid level sensor according to Embodiment 5 of the present invention.
FIG. 31F is a voltage waveform chart of each unit in the liquid level sensor according to Embodiment 5 of the present invention.
FIG. 31G is a voltage waveform chart of each unit in the liquid level sensor according to Embodiment 5 of the present invention.
FIG. 31H is a voltage waveform chart of each unit in the liquid level sensor according to Embodiment 5 of the present invention.
FIG. 31I is a voltage waveform chart of each unit in the liquid level sensor according to Embodiment 5 of the present invention.
FIG. 31J is a voltage waveform chart of each unit in the liquid level sensor according to Embodiment 5 of the present invention.
FIG. 31K is a voltage waveform chart of each unit in the liquid level sensor according to Embodiment 5 of the present invention.
FIG. 31L is a voltage waveform chart of each unit in the liquid level sensor according to Embodiment 5 of the present invention.
FIG. 31M is a voltage waveform chart of each unit in the liquid level sensor according to Embodiment 5 of the present invention.

When the power supply is turned on (t0), as shown in FIG. 31A, pulses from pulse generating circuit 551 are inputted to terminals 529 and 537 of detecting unit 521. The pulses are differentiated by a differentiating circuit configured by fourth resistor 561, an inter-electrode capacitor of fourth detecting electrodes 525, and fourth differential amplifier 560, and output potential from fourth differential amplifier 560 exponentially increases, as shown in FIG. 31B, from first potential 569 ($V_1$) to second potential 570 ($V_2$) at the time constant determined by fourth resistor 561 and the inter-electrode capacitance of fourth detecting electrodes 525. An output potential from a differentiating circuit configured by third resistor 559, an inter-electrode capacitor of third detecting electrodes 524, and third differential amplifier 558 exponentially increases, as shown in FIG. 31C, from first potential 569 ($V_1$) to second potential 570 ($V_2$) at the time constant determined by third resistor 559 and the inter-electrode capacitor of third detecting electrodes 524. At this time, since a part of third detecting electrodes 524 is in the liquid to be measured, the time constant determined by third resistor 559 and the electrostatic capacitance of third detecting electrodes 524 is larger than the time constant determined by fourth resistor 561 and fourth detecting electrode 525. In the same manner as described above, an output potential from a differentiating circuit configured by first resistor 556, an inter-electrode capacitor of first detecting electrodes 522, and first differential amplifier 555 exponentially increases, as shown in FIG. 31D, from first potential 569 ($V_1$) to second potential 570 ($V_2$) at the time constant determined by first resistor 556 and the inter-electrode capacitance of first detecting electrodes 522. At this time, since first detecting electrodes 522 are always dipped in the liquid to be measured, the time constant determined by first resistor 556 and an electrostatic capacitance of first detecting electrodes 522 is larger than the time constant determined by third resistor 559 and third detecting electrode 524. Furthermore, an output potential from a differentiating circuit configured by second resistor 518, an inter-electrode capacitor of second detecting electrodes 523, and second differential amplifier 557 exponentially increases, as shown in FIG. 31E, from first potential 569 ($V_1$) to second potential 570 ($V_2$) at the time constant determined by second resistor 558 and the inter-electrode capacitance of second detecting electrodes 523. At this time, in a state in which both first detecting electrodes 522 and second detecting electrodes 523 are dipped in the liquid to be measured, the time constant determined by second detecting electrode 523 and second resistor 518 is smaller than the time constant determined by the inter-electrode capacitance of first detecting electrodes 522 and first resistor 556.

When an output potential from fourth differential amplifier 560 reaches threshold voltage $V_{th}$ determined by a threshold value generating unit (not shown), an output from fourth comparing unit 565 configured by a comparator shifts from high to low (t1) as shown in FIG. 31F. In the same manner as described above, when an output potential from third differential amplifier 558 reaches threshold voltage $V_{th}$ determined by a threshold value generating unit (not shown), an output from third comparing unit 564 configured by a comparator shifts from high to low (t2) as shown in FIG. 31G. When an output potential from second differential amplifier 557 reaches threshold voltage $V_{th}$ determined by a threshold value generating unit (not shown), an output from second comparing unit 563 configured by a comparator shifts from high to low (t3) as shown in FIG. 31I. Furthermore, when an output potential from first differential amplifier 555 reaches threshold voltage $V_{th}$ determined by a threshold value generating unit (not shown), an output from first comparing unit 562 configured by a comparator shifts from high to low as shown in FIG. 31H, pulse generation from pulse generating circuit 551 is stopped. For this reason, output voltages from first differential amplifier 555, second differential amplifier 557, third differential amplifier 558, and fourth differential amplifier 560 increase to second potential ($V_1$) (t4).

Thereafter, since diodes connected between inputs and outputs of first differential amplifier 555, second differential amplifier 557, third differential amplifier 558, and fourth differential amplifier 560 are turned on, output voltages from the differential amplifiers sharply decrease to reach threshold potentials given to positive inputs of the differential amplifiers, the outputs from the differential amplifiers return to first potential 569 ($V_1$). At the same time, each of outputs from first, second, third, and fourth comparing units 562, 563, 564, and 565 shifts from low to high as shown in FIGS. 31I, 31H, 31G, and 31F, and pulses are generated from pulse generating circuit 551 and inputted to terminals 530 and 538 of detecting unit 521 as shown in FIG. 31A (t5).

Thereafter, output potentials from first differential amplifier 555, second differential amplifier 557, third differential amplifier 558, and fourth differential amplifier 560 exponentially increase again from first potential 569 (t1) to second potential 570 (t2), as shown in FIGS. 31D, 31E, 31C, and 31B, at time constants determined by first resistor 556 and the inter-electrode capacitance of first detecting electrodes 522, second resistor 518 and the inter-electrode capacitance of second detecting electrodes 523, third resistor 559 and the inter-electrode capacitance of third detecting electrodes 524, and fourth resistor 561 and the inter-electrode capacitance of fourth detecting electrodes 525. Subsequently, the same operation as that in a zone of t0 to t5 is repeated.

Output signals from first, third, and fourth comparing units 562, 564, and 565 are inputted to logic circuit 566 configured by a logic element and a flip-flop, a pulse signal having a pulse width from a falling edge of a pulse shown in FIG. 31F to a falling edge of a pulse shown in FIG. 31G is outputted to first analog switch 567 as shown in FIG. 31J, and a pulse signal having a pulse width from the falling edge of the pulse shown in FIG. 31G to a falling edge of a pulse shown in FIG. 31H is outputted to second analog switch 568 as shown in FIG. 31K.

In this case, when a signal inputted to first analog switch 567 is at high, first analog switch 567 is "closed". When the signal is at low, first analog switch 567 is "opened". When a signal inputted to second analog switch 568 is at high, second analog switch 568 is "closed". When the signal is at low, second analog switch 568 is "opened". In this manner, for times t1 to t2 and times t6 to t7, first analog switch 567 is "closed", and second analog switch 568 is "opened". For this reason, capacitor 573 is charged from second potential 570 through fifth resistor 571. For times t2 to t4 and times t7 to t9, first analog switch 567 is "opened", and second analog switch 568 is "closed". For this reason, an electric charge accumulated in capacitor 573 is discharged to first potential 569 ($V_1$) through fifth resistor 571.

For times t0 to t1 and times t4 to t5 or the like, since both first analog switch 567 and second analog switch 568 are "opened", an electric charge accumulated in capacitor 573 is stored. In this manner, first analog switch 567 and second analog switch 568 are alternately opened and closed for times determined by a length of a part of third detecting electrodes 524 dipped in the liquid to be measured and a length of a part being out of the liquid to be measured to charge and discharge capacitor 573, so that a liquid level of the liquid to be measured can be outputted to output terminal 572 as an analog voltage.

Figure 32:
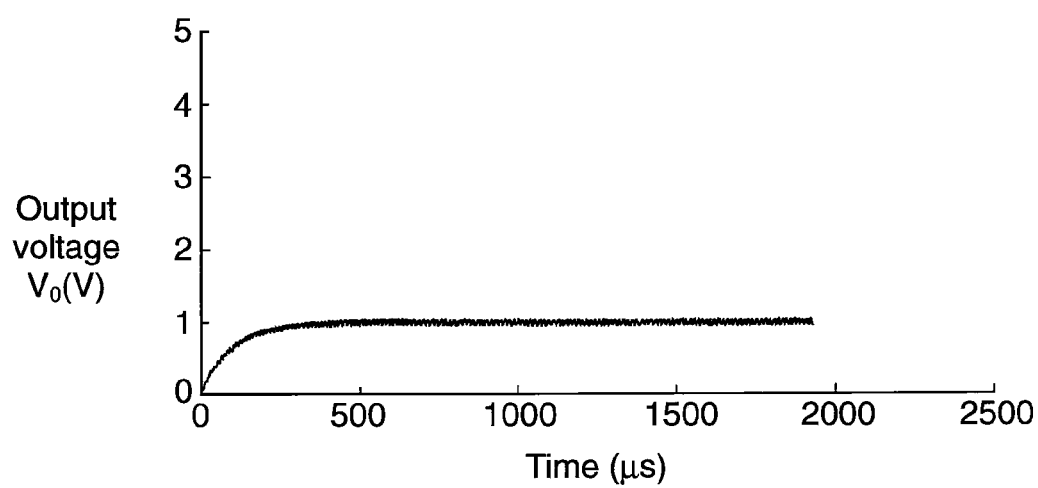
FIG. 32 is a characteristic graph showing a change of output voltage with time when a ratio of a length of a part of a second detecting electrode dipped in a liquid to be measured to a length of a part being out of the liquid to be measured is 1:4 in the liquid level sensor according to Embodiment 5 of the present invention.
Figure 33:
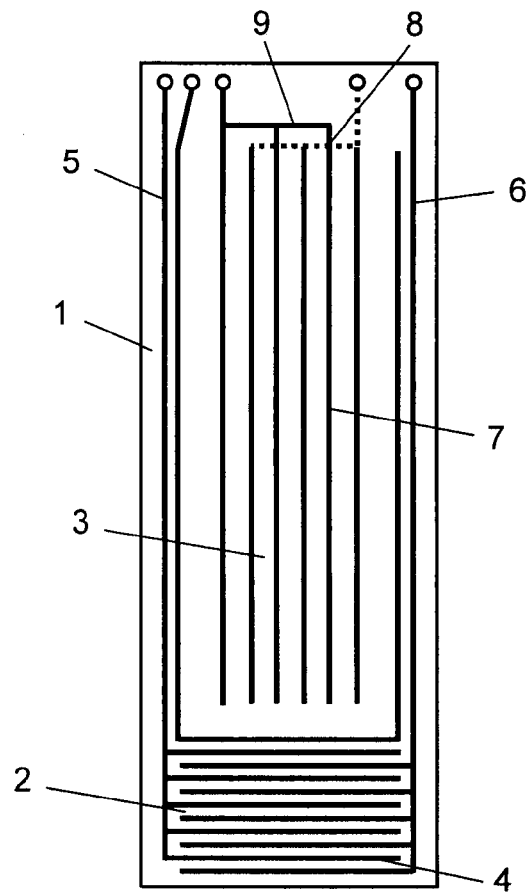
FIG. 33 is a front view of a detecting unit of a conventional liquid level sensor.
Figure 34:
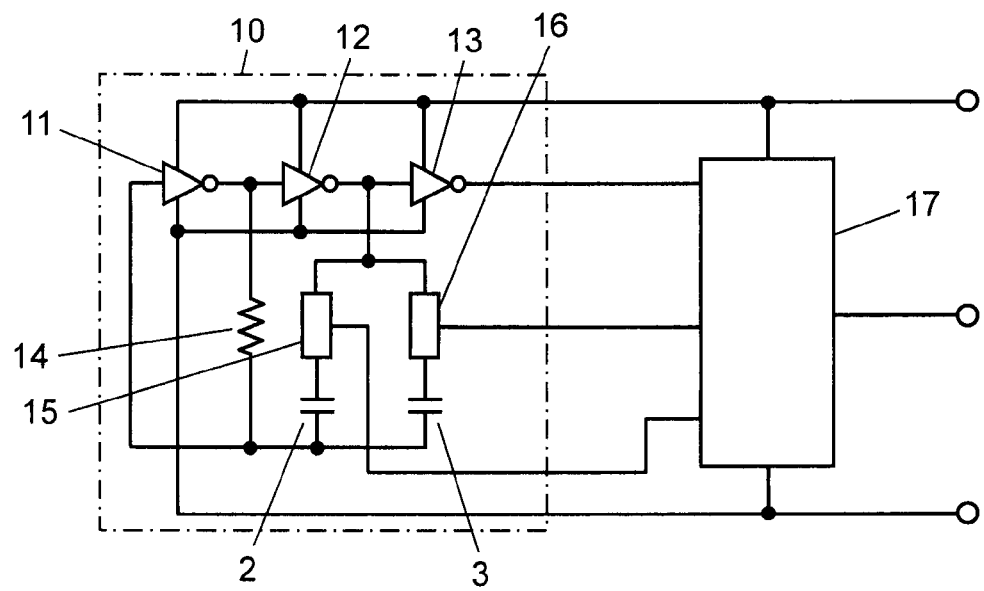
FIG. 34 is a detecting circuit diagram of the conventional liquid level sensor.

FIG. 32 is a characteristic graph showing a change of output voltage $V_O$ with time when a ratio of a length of a part of the second detecting electrode dipped in a liquid to be measured to a length of a part being out of the liquid to be measured is 1:4 in the liquid level sensor according to Embodiment 5 of the present invention. More specifically, the characteristic graph is obtained by simulating analog voltage $V_O$ outputted across both ends of capacitor 573 when resistance R of fifth resistor 571 and a capacitance C of capacitor 573 are set to 500 kΩ and 100 pF, respectively, when charging time $T_c$ and discharging time $T_d$ are set to 1 µsec and 4 µsec, respectively, and when a ratio of $T_c$ to $T_d$ and a ratio of a length of a part of third detecting electrodes 524 dipped in the liquid to be measured to a length of a part being out of the liquid to be measured are 1:4.

As is apparent from FIG. 32, after about 500 µsec have elapsed, output voltage $V_O$ made by superposing a ripple having an amplitude of about ±0.04 [V] on a DC component of 1 [V] is obtained. Since the ripple is removed by a low-pass filter, a DC voltage expressing a level of the liquid to be measured is outputted to output terminal 572 after a predetermined period of time has elapsed since the power supply is turned on.

Output signals from first and second comparing units 562 and 563 are inputted to logic circuit 574 configured by a logic element and a flip-flop, a pulse signal having a pulse width from a falling edge of a pulse shown in FIG. 31I to a falling edge of a pulse shown in FIG. 31H is outputted to first analog switch 575 as shown in FIG. 31L, and a pulse signal having a pulse width from the falling edge of the pulse shown in FIG. 31H to a falling edge of a pulse shown in FIG. 31I is outputted to second analog switch 576 as shown in FIG. 31M.

In this case, when a signal inputted to each analog switch is at high, the analog switch is "closed". When the signal is at low, the analog switch is "opened". In this manner, for times t3 to t4 and times t8 to t9, first analog switch 575 is "closed", and second analog switch 576 is "opened". Therefore, capacitor 579 is charged from second potential 570 through sixth resistor 577. For times t0 to t3 and times t5 to t8, first analog switch 575 is "opened", and second analog switch 576 is "closed". For this reason, an electric charge accumulated in capacitor 579 is discharged to first potential 569 ($V_1$) through sixth resistor 577.

In this manner, an operation of charging capacitor 579 for a time being in proportion to a difference between an electrostatic capacitance measured by first detecting electrodes 522 always dipped in the liquid to be measured and influenced by a dielectric constant held by the liquid to be measured and an electrostatic capacitance measured by second detecting electrodes 523 which are not influenced by the dielectric constant held by the liquid to be measured and an operation of discharging an electric charge charged in capacitor 579 for a time being in proportion to an electrostatic capacitance measured by first detecting electrodes 522 are repeated to make it possible to output a voltage being in proportion to liquid quality of the liquid to be measured to first output terminal 578.

A role of a cancel electrode arranged in the liquid level sensor according to Embodiment 5 of the present invention will be further described.

In the detecting unit of the liquid level sensor according to Embodiment 5 of the present invention shown in FIG. 28, when first cancel electrode 532 is not arranged, a position (liquid level) where third detecting electrodes 524 cross to the level of the liquid to be measured changes, and a position where extraction line 528 on the level of the liquid to be measured and extraction line 527 of first detecting electrode 522 cross each other also changes. For this reason, an electrostatic capacitance generated between extraction line 528 and extraction line 527 of first detecting electrode 522 changes. In this manner, the falling edge of the pulse shown in FIG. 31H changes, and an output voltage value expressing a liquid level has an error.

When second cancel electrode 540 is not arranged, a position (liquid level) where third detecting electrodes 524 cross to the level of the liquid to be measured changes, and a position where common extraction line 526 on the level of the liquid to be measured and extraction line 528 of second detecting electrode 523 cross each other also changes. For this reason, an electrostatic capacitance generated between common extraction line 526 and extraction line 528 of second detecting electrode 523 changes. In this manner, the falling edge of the pulse shown in FIG. 31J changes, and a reference to measure liquid quality changes. For this reason, and an output voltage value expressing the liquid quality has an error. At the same time, a position (liquid level) where third detecting electrodes 524 cross to the level of the liquid to be measured changes. Since a position where common extraction line 534 on the level of the liquid to be measured and extraction line 535 of third detecting electrode 524 cross each other also changes, an electrostatic capacitance generated between common extraction line 534 and extraction line 535 of third detecting electrode 524 changes. In this manner, the falling edge of the pulse shown in FIG. 31J and the falling edge of the pulse shown in FIG. 31G change, and an output voltage value expressing the liquid level has an error.

In the same manner as described above, when third cancel electrode 542 is not arranged, a position (liquid level) where third detecting electrodes 524 cross to the level of the liquid to be measured changes. Since a position where common extraction line 534 on the level of the liquid to be measured and extraction line 536 of fourth detecting electrode 525 cross each other also changes, an electrostatic capacitance generated between common extraction line 534 and extraction line 536 of fourth detecting electrode 525 changes. In this manner, the falling edge of the pulse shown in FIG. 31F changes, and an output voltage value expressing the liquid level has an error.

In contrast to this, in the liquid level sensor according to Embodiment 5 of the present invention, first cancel electrode 532 is arranged along extraction line 527 of first detecting electrode 522, second cancel electrode 540 is arranged between extraction line 528 of second detecting electrode 523 and extraction line 535 of third detecting electrode 524, and third cancel electrode 542 is arranged along extraction line 536 of fourth detecting electrode 525. Signals obtained by inverting pulses from pulse generating circuit 551 are inputted through level adjusters 552, 553, and 554 to cancel electric charges accumulated between extraction lines and a common extraction line of the detecting electrodes. In this manner, electrostatic capacitances measured between terminals 529 and 530, between terminals 529 and 531, between terminals 537 and 538, terminals 537 and 539 are only electrostatic capacitances measured by comb-shaped detecting electrodes 522, 523, 524, and 525.

For this reason, an electrostatic capacitance of the liquid to be measured detected by the detecting electrodes is not influenced by a level of the liquid to be measured. As a result, an output voltage value which accurately expresses a liquid level or liquid quality can be obtained.

As is apparent from the above description, since the liquid level sensor according to Embodiment 5 of the present invention can output a voltage which is accurately proportional to a liquid level or liquid quality without arranging a complex operational device, a highly sensitive sensor can be easily provided.

INDUSTRIAL APPLICABILITY

The liquid level sensor according to the present invention can always automatically output a voltage which is in proportion to a liquid level without arranging a complex operational device even though a dielectric constant of a liquid to be measured or a temperature changes. In this manner, the present invention can advantageously easily provide a highly sensitive sensor and is useful as a liquid level sensor which detects a liquid level of an engine oil or a fuel for an automobile, a construction machine, and the like.

REFERENCE MARKS IN THE DRAWINGS

| | |
|---|---|
| 21, 221, 321, 421, 521: | Detecting unit |
| 22, 222, 322, 422, 522: | First detecting electrode |
| 23, 223, 323, 423, 523: | Second detecting electrode |
| 24, 224, 324, 524: | Third detecting electrode |
| 325, 525: | Fourth detecting electrode |
| 30, 253, 334, 431: | First potential |
| 34, 253, 339: | Second potential |
| 31, 236, 335, 432: | First resistor |
| 32, 242, 336, 433: | Second resistor |
| 33, 243, 337: | Third resistor |
| 43, 254, 338: | Fourth resistor |
| 351, 444: | Fifth resistor |
| 35, 246, 340, 436: | First comparing unit |
| 38, 247, 343, 437: | Second comparing unit |
| 39, 248, 344: | Third comparing unit |
| 345: | Fourth comparing unit |
| 40, 249: | Logic circuit |
| 346, 440: | First logic circuit |
| 347: | Second logic circuit |
| 348: | Third logic circuit |
| 41, 250, 349, 442: | First analog switch |
| 42, 251, 350, 443: | Second analog switch |
| 44, 255, 352: | Output terminal |
| 445: | First output terminal |
| 45, 256, 353, 446: | Capacitor |
| 235: | Pulse generating circuit |
| 237: | First differential amplifier |
| 244: | Second differential amplifier |
| 245: | Third differential amplifier |
| 331, 445: | Electrode |
| 332, 456: | Insulator |
| 333, 457: | Metal layer |
| 526, 534: | Common extraction line |
| 527, 528, 535, 536: | Extraction line |
| 532: | First cancel electrode |
| 540: | Second cancel electrode |
| 542: | Third cancel electrode |

The invention claimed is:

1. A liquid level sensor comprising:
   a detecting unit including
      a first detecting electrode being always in a liquid to be measured,
      a second detecting electrode which measures a level of the liquid to be measured, and
      a third detecting electrode being always out of the liquid to be measured; and
   an electronic circuit, wherein
   the electronic circuit repeats an operation of charging for a time being in proportion to a ratio of a length of a part of the second detecting electrode dipped in the liquid to be measured to a total length of the second detecting electrode and an operation of discharging the charged electric charge for a time being in proportion to a ratio of a length of a part of the second detecting electrode being out of the liquid to be measured to the total length of the second detecting electrode.

2. The liquid level sensor according to claim 1, wherein the first detecting electrode has one end connected to a first potential and the other end electrically connected to a second potential through a first resistor, the second detecting electrode has one end connected to the first potential and the other end electrically connected to the second potential through a second resistor, the third detecting electrode has one end connected to the first potential and the other end electrically connected to the second potential through a third resistor, the electronic circuit includes:

a first comparing unit which receives a first midpoint potential between the first resistor and the first detecting electrode and compares the first midpoint potential with a threshold value;

a second comparing unit which receives a second midpoint potential between the second resistor and the second detecting electrode and compares the second midpoint potential with the threshold value;

a third comparing unit which receives a third midpoint potential between the third resistor and the third detecting electrode and compares the third midpoint potential with the threshold value;

a logic circuit which receives output signals outputted from the first comparing unit, the second comparing unit, and the third comparing unit;

a first analog switch and a second analog switch which are open/close-controlled based on an output signal from the logic circuit;

a fourth resistor has one end connected to a midpoint between the first analog switch and the second analog switch and the other end connected to an output terminal; and a capacitor has one end connected to the first potential and the other end connected between the fourth resistor and the output terminal, and the capacitor is charged with an electric charge when the first analog switch is "closed" and the second analog switch is "opened", and the electric charge of the capacitor is discharged when the first analog switch is "opened" and the second analog switch is "closed".

3. The liquid level sensor according to claim 2, further comprising:

a common extraction line of the first detecting electrode, the second detecting electrode, and the third detecting electrode;

a pulse generating circuit which inputs a pulse to the common extraction line;

an extraction line of the first detecting electrode; and a first cancel electrode arranged in the same direction as that of the extraction line of the first detecting electrode, wherein a signal obtained by inverting the pulse is inputted to the first cancel electrode to cancel electric charges accumulated between the extraction line of the first detecting electrode and the first detecting electrode and between the second detecting electrode and the common extraction line of the third detecting electrode.

4. The liquid level sensor according to claim 1, wherein the first detecting electrode has one end connected to an output of the pulse generating circuit and the other end connected to one end of the first resistor and is always arranged in the liquid to be measured, the second detecting electrode has one end connected to an output of the pulse generating circuit and the other end connected to one end of the second resistor and is used to measure a level of the liquid to be measured;

the third detecting electrode has one end connected to an output of the pulse generating circuit and the other end connected to one end of the third resistor and is arranged out of the liquid to be measured;

the electronic circuit includes:

a first differential amplifier which has an output connected to the other end of the first resistor and compares a first node potential determined by the first detecting electrode and the first resistor with a first threshold value;

a second differential amplifier which has an output connected to the other end of the second resistor and compares a second node potential determined by the second detecting electrode and the second resistor with the first threshold value;

a third differential amplifier which has an output connected to the other end of the third resistor and compares a third node potential determined by the third detecting electrode and the third resistor with the first threshold value;

a first comparing unit which compares an output signal from the first differential amplifier with a second threshold value;

a second comparing unit which compares an output signal from the second differential amplifier with the second threshold value;

a third comparing unit which compares an output signal from the third differential amplifier with the second threshold value;

a logic circuit which receives output signals from the first comparing unit, the second comparing unit, and the third comparing unit;

a first analog switch and a second analog switch which are open/close-controlled by an output signal from the logic circuit;

a fourth resistor which has one end connected to a midpoint between the first analog switch and the second analog switch and the other end connected to an output terminal; and a capacitor which has one end connected to the first potential and the other end connected between the fourth resistor and the output terminal, the capacitor is charged when the second analog switch is "opened" and the first analog switch is "closed", and the electric charge of the capacitor is discharged when the second analog switch is "closed" and the first analog switch is "opened".

5. The liquid level sensor according to claim 4, further comprising a fourth detecting electrode which measures an electrostatic capacitance between electrodes while being not influenced by a dielectric constant held by the liquid to be measured, the electronic circuit stops a charge and performs only a discharge when a time constant related to an electrostatic capacitance measured by the first detecting electrodes becomes smaller than a time constant related to an electrostatic capacitance measured by the fourth detecting electrodes, and stops the discharge and performs only the charge when a time constant related to an electrostatic capacitance measured by the third detecting electrodes becomes larger than a time constant related to an electrostatic capacitance measured by the fourth detecting electrodes.

6. The liquid level sensor according to claim 5, wherein the fourth detecting electrode
is covered with a metal layer through an insulator.

7. The liquid level sensor according to claim 1, comprising:
a first time constant circuit including a first resistor and the first detecting electrode;
a second time constant circuit including a second resistor and the second detecting electrode;
a third time constant circuit including a third resistor and the third detecting electrode; and
a fourth time constant circuit including a fourth resistor and the fourth detecting electrode,
the electronic circuit includes:
a first comparing unit which compares an output potential from the first time constant circuit with a threshold value;
a second comparing unit which compares an output potential from the second time constant circuit with the threshold value;
a third comparing unit which compares an output potential from the third time constant circuit with the threshold value;
a fourth comparing unit which compares an output potential from the fourth time constant circuit with the threshold value;
a first logic circuit which receives output signals from the first comparing unit, the second comparing unit, and the third comparing unit;
a second logic circuit which receives output signals from the first comparing unit, the third comparing unit, and the fourth comparing unit;
a third logic circuit which receives output signals from the first logic circuit and the second logic circuit;
a first analog switch and a second analog switch which are open/close-controlled by an output signal from the third logic circuit;
a fifth resistor which has one end connected to a midpoint between the first analog switch and the second analog switch and the other end connected to an output terminal and
a capacitor which has one end connected to the first potential and the other end connected between the fifth resistor and the output terminal,
charges the capacitor when the first analog switch is "closed" and the second analog switch is "opened" and discharges the capacitor when the first analog switch is "opened" and the second analog switch is "closed" to output a voltage being in proportion to a level of the liquid to be measured,
stops the charge and performs only the discharge when a time constant determined by an electrostatic capacitance measured by the first detecting electrodes and the first resistor becomes smaller than a time constant determined by an electrostatic capacitance measured by the fourth detecting electrodes and the fourth resistor, and
stops the discharge and performs only the charge when a time constant determined by an electrostatic capacitance measured by the third detecting electrodes and the third resistor becomes larger than a time constant determined by an electrostatic capacitance measured by the fourth detecting electrodes and the fourth resistor.

* * * * *